(12) United States Patent
Kanematu

(10) Patent No.: US 7,130,066 B1
(45) Date of Patent: Oct. 31, 2006

(54) APPARATUS FOR PERFORMING A SERVICE IN COOPERATION WITH ANOTHER APPARATUS ON A NETWORK

(75) Inventor: Shinichi Kanematu, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/388,600

(22) Filed: Sep. 2, 1999

(30) Foreign Application Priority Data

Sep. 4, 1998 (JP) .................................. 10-250758

(51) Int. Cl.
*G06F 15/00* (2006.01)
*G03G 15/00* (2006.01)

(52) U.S. Cl. ..................... 358/1.15; 358/435; 358/438; 358/439; 358/1.14; 399/8

(58) Field of Classification Search ............... 358/1.15, 358/1.14, 435, 438, 439; 705/56; 399/80, 399/8; 707/9, 10; 713/200, 202; 379/100.02, 379/100.03, 100.05
See application file for complete search history.

(56) References Cited

U.S. PATENT DOCUMENTS

| | | | | |
|---|---|---|---|---|
| 5,031,214 A | * | 7/1991 | Dziewit et al. ............. 713/176 |
| 5,555,307 A | * | 9/1996 | Le Corre et al. ........... 380/243 |
| 5,627,658 A | * | 5/1997 | Connors et al. ............ 358/407 |
| 5,764,890 A | * | 6/1998 | Glasser et al. .............. 713/202 |
| 5,771,101 A | * | 6/1998 | Bramall ...................... 358/405 |
| 5,774,879 A | * | 6/1998 | Custy et al. .................. 705/35 |
| 5,784,664 A | * | 7/1998 | Nakamura et al. ............. 399/8 |
| 5,946,457 A | * | 8/1999 | Nakai et al. ............... 358/1.13 |
| 6,088,119 A | * | 7/2000 | Manchala et al. ......... 358/1.14 |
| 6,108,103 A | * | 8/2000 | Kurozasa .................... 358/405 |
| 6,115,739 A | * | 9/2000 | Ogawa et al. .............. 709/215 |
| 6,163,383 A | * | 12/2000 | Ota et al. .................... 358/1.1 |
| 6,172,762 B1 | * | 1/2001 | Uchiyama .................. 358/1.14 |
| 6,490,049 B1 | * | 12/2002 | Cunnagin et al. .......... 358/1.13 |
| 6,567,178 B1 | * | 5/2003 | Tashima .................... 358/1.15 |
| 6,628,413 B1 | * | 9/2003 | Lee ........................... 358/1.15 |

\* cited by examiner

*Primary Examiner*—Douglas Q. Tran
*Assistant Examiner*—Chan S. Park
(74) *Attorney, Agent, or Firm*—Fitzpatrick, Cella, Harper & Scinto

(57) ABSTRACT

A communication system that efficiently and accurately manages various devices on a network includes a local device, which performs a user authentication process by using user information (a user ID and a password) that is inputted by a user at an operation unit and information that was registered in advance. The local device transmits, to a remote device, the inputted user information together with an operating request that is issued to the remote device by the user. The remote device performs the user authentication process by using the user information received from the local device and the information that was registered in advance.

24 Claims, 71 Drawing Sheets

ENLARGE/REDUCE SETTING SUB SCREEN

ADDRESS BOOK SCREEN

SEARCH RESULT EXAMPLE

DETAILED ADDRESS (NEW)

10-KEY PAD

DETAILED ADDRESS (PERSON)

DETAILED ADDRESS (DATABASE)

DETAILED ADDRESS (GROUP)

CHECK TIME SUB SCREEN (WEEKLY)

FIG. 57   CHECK TIME SUB SCREEN (MONTHLY)

ERROR SCREEN

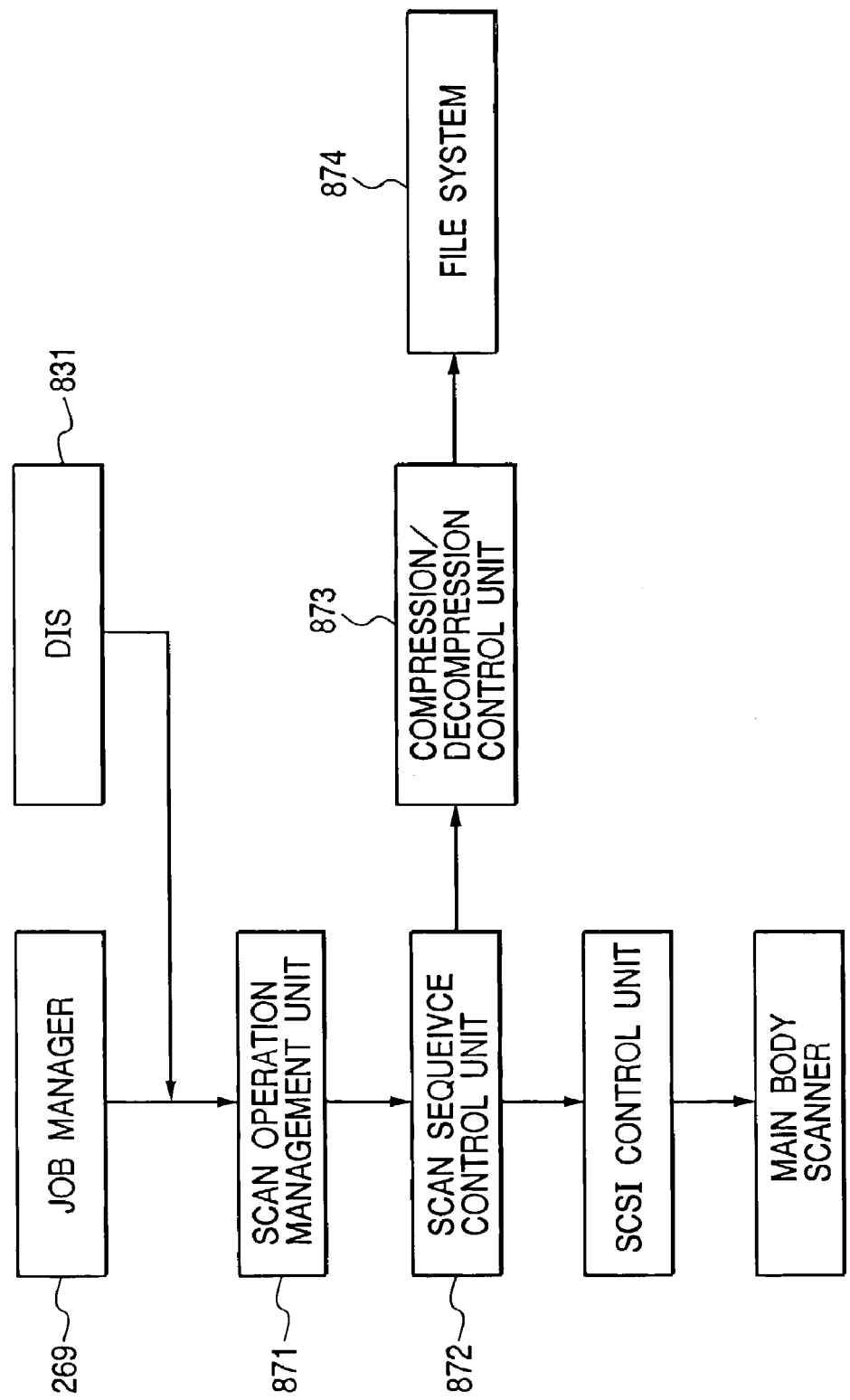

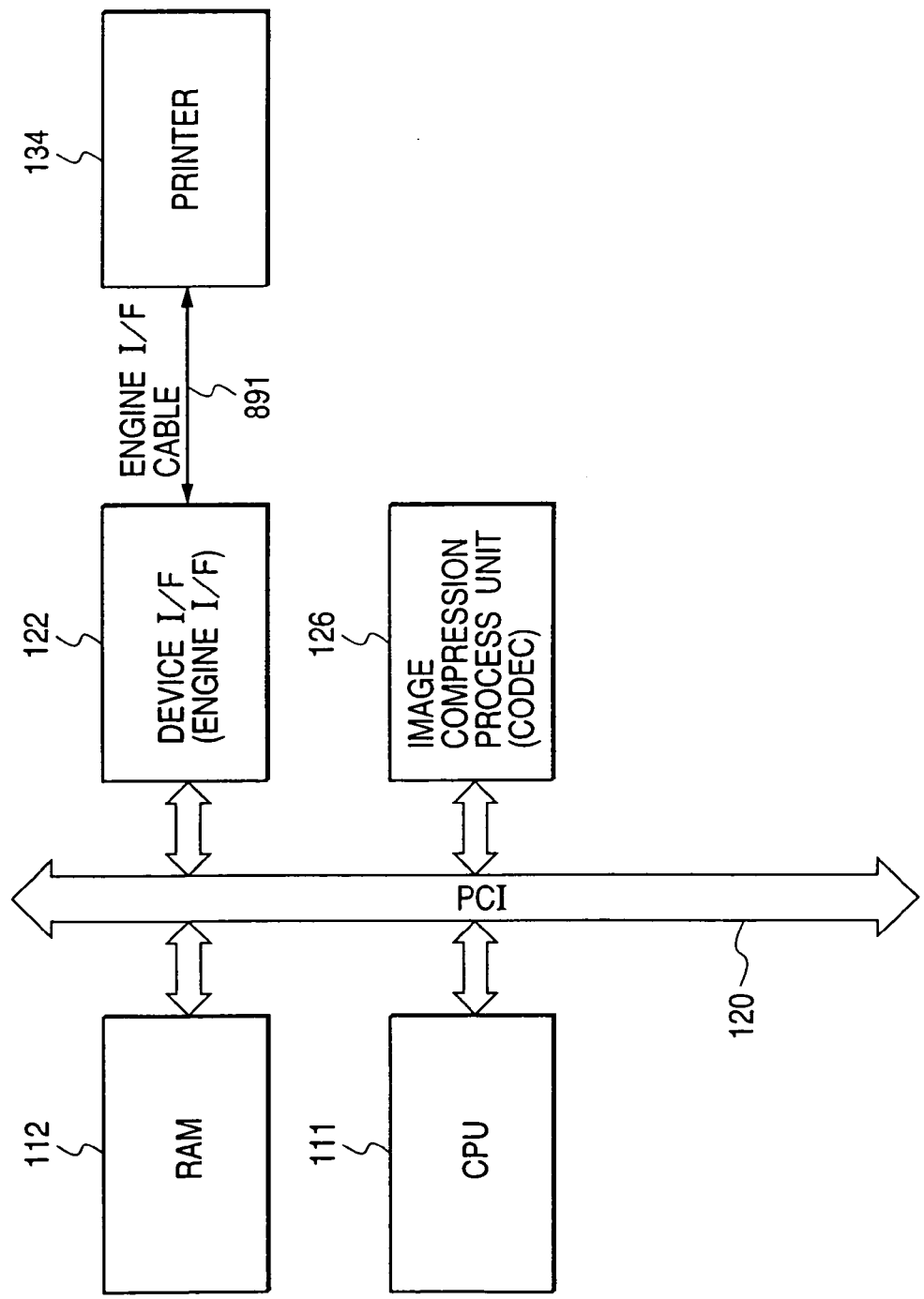

FIG. 71

USER REGISTRATION TABLE 902

| ID NUMBER | PASSWORD | USER'S NAME | ADDITIONAL INFORMATION |
|---|---|---|---|
| 010331-0100 | xxxxxxx | Keith | EXTENSION 100-1523 |
| 010331-0101 | xxxxxxx | Michael | . . . |
| . . . | . . . | . . . | . . . |
| 020224-0113 | xxxxxxx | Mary | DEVELOPMENT DIVISION |
| . . . | . . . | . . . | . . . |
| . . . | . . . | . . . | . . . |

921 922 923 924

APPARATUS FOR PERFORMING A SERVICE IN COOPERATION WITH ANOTHER APPARATUS ON A NETWORK

BACKGROUND OF THE INVENTION

1. Field of the Invention

The present invention relates to a communication apparatus, an information processing apparatus, a communication system and a communication method, all of which are applied to a system wherein a plurality of users share various apparatuses connected to a network, and a storage medium on which are stored computer-readable processing steps for implementing the communication method.

2. Related Background Art

Conventionally, apparatuses such as copiers, printers, scanners and facsimile machines, which read and form images, are most often employed independently.

However, as one consequence of the continued development of computers and networks, the use has increased the number of arrangements, such as the one described above, wherein various types of apparatuses are connected together in a network.

As one example of such formations, a system has become popular with which, by combining a function provided by an apparatus readily available to a user (hereinafter referred to as a logical apparatus) and a function provided by an apparatus connected to a network (hereinafter referred to as a printer), a series of meaningful processes can be performed.

With this system, the performance of the following example operations is possible. Such as when to copy a document a user employs a local apparatus (a scanner) to scan the document, and to print the document the user transmits the obtained image data across a network to a remote apparatus (a printer). Or when a user employs a local apparatus (a terminal, such as a personal computer) to extract image data from a computer or a database at a distant location on a network, and uses another local apparatus (a printer) to print the thus obtained image data.

When in the above described system a remote apparatus (e.g., a copier) on the network is shared by a plurality of designated users, the unlimited use of the copier by a user other than the designated users must be prevented, and the status of the employment of the copier by each authorized user must be recorded.

Therefore, a user who desires to use the copier must first enter a password using the operating section of a terminal (a local apparatus), or must enter his or her user information by employing a management card on which the user information is magnetically recorded. Then, the terminal performs a verification process to authenticate the user. When the user has been authenticated the terminal accepts an entry from the operating section, requests that the copier (a remote apparatus) on the network perform an operation desired by the user, and at the same time, updates the user's operating record information (information concerning the employment status of the copier, etc.). Therefore, the copier (the remote apparatus) performs an operation in accordance with the request transmitted by the user's terminal (the local apparatus).

However, as is described above, while a local apparatus may perform a verification process to authenticate a user, in response to an operation request received across a network, a remote apparatus does not perform a verification process. Instead, it simply accepts the operation request.

Therefore, once the authentication of a user has been performed by a specific local apparatus, the user is permitted to use all the remote apparatuses on the network, i.e., the user may use a remote apparatus the use of which is prohibited. Thus, a problem exists relative to the management and the security of apparatuses.

SUMMARY OF THE INVENTION

To resolve the above problem, it is one objective of the present invention to provide a communication apparatus, an information processing apparatus, a communication system and a communication method whereby various apparatuses connected to a network can be efficiently and exactly managed, and a storage medium on which are stored computer readable and executable steps for implementing such a management process.

It is one more objective of the present invention to provide a communication apparatus that can efficiently and accurately manage various apparatuses connected to a network.

It is another objective of the present invention to provide a communication system wherein, when an immediately available local apparatus and another apparatus that is accessible across a network are employed to perform a service, the service is available only to an authorized user whose right to use the apparatuses has been authenticated.

It is an additional objective of the present invention to provide a communication system wherein, when a service is requested for which an immediately available local apparatus and another apparatus that is accessible across a network are used, the performance of a user authentication process can be improved.

It is a further objective of the present invention to provide a communication system wherein, when the scanner function of an immediately available local apparatus and the printer function of another apparatus accessible across a network are employed to perform a copy service, the service is available only to an authorized user whose right to use the apparatuses has been authenticated.

It is one further objective of the present invention to provide a communication system wherein, when the scanner function of an immediately available local apparatus and the printer function of another apparatus accessible across a network are employed to perform a service, the performance of a user authentication process can be improved.

It is yet one more objective of the present invention to provide a communication system wherein, when the scanner function of an immediately available local apparatus and the storage function of another apparatus accessible across a network are employed to perform a storage service, the service is available only to an authorized user whose right to use the apparatuses has been authenticated.

It is yet another objective of the present invention to provide a communication system wherein, when the scanner function of an immediately available local apparatus and the storage function of another apparatus accessible across a network are employed to perform a storage service, the performance of a user authentication process can be improved.

It is yet an additional objective of the present invention to provide a communication system wherein, when the scanner function of an immediately available local apparatus and the facsimile function of another apparatus accessible across a network are employed to perform a facsimile transmission service, the service is available only to an authorized user whose right to use the apparatuses has been authenticated.

It is yet a further objective of the present invention to provide a communication system wherein, when the scanner function of an immediately available local apparatus and the facsimile function of another apparatus accessible across a network are employed to perform a facsimile transmission service, the performance of a user authentication process can be improved.

To achieve the above objectives, according to the present invention, an apparatus, which performs a service in association with a different apparatus accessible across a network, comprises:

registration means for registering in advance predetermined information for a user who is authorized to use the apparatus;

input means for use by the user to enter the user information and a first operating instruction request for the different apparatus;

first authentication means for employing the predetermined information registered by the registration means and the user information entered by the user at the input means to determine whether the user is an authorized user;

transmission means for, based on the results obtained by the authentication means, transmitting to the different apparatus a second operating instruction and the user information that are entered at the input means;

second authentication means for obtaining from the different apparatus the results of an authentication process, performed for the user information received from the transmission means, to determine whether the user is authorized to use the different apparatus; and determination means for employing the results obtained by the second authentication means to determine whether the user is to be permitted to use the service.

Furthermore, to achieve the above objectives, according to the present invention, an apparatus that performs a service in cooperation with a different apparatus accessible across a network, comprises:

registration means for registering, in advance, predetermined information for a user who is permitted to use the apparatus;

reception means for receiving user information and an operating instruction request for the apparatus, both of which are entered by a user at the different apparatus on the network;

authentication means for employing the information registered by the registration means and the user information received by the reception means to determine whether the user is an authorized user; and determination means for employing the results obtained by the authentication means to determine whether the operating instruction request received by the reception means is to be accepted.

The other objectives and features of the present invention will become apparent during the explanation given for the following specifications while referring to the accompanying drawings.

BRIEF DESCRIPTION OF THE DRAWINGS

FIG. 64 is a diagram for explaining the software structure of the scanning operation;

FIG. 66 is a block diagram illustrating the arrangement of the devices employed for the printing operation performed by the image processing apparatus;

FIG. 71 is a diagram for explaining a user registration table used for the user authentication process;

FIG. 72 is a flowchart for explaining the user authentication processing performed in response to a log-on;

DETAILED DESCRIPTION OF THE PREFERRED EMBODIMENT

The preferred embodiment of the present invention will now be described while referring to the accompanying drawings.

Figure 1:
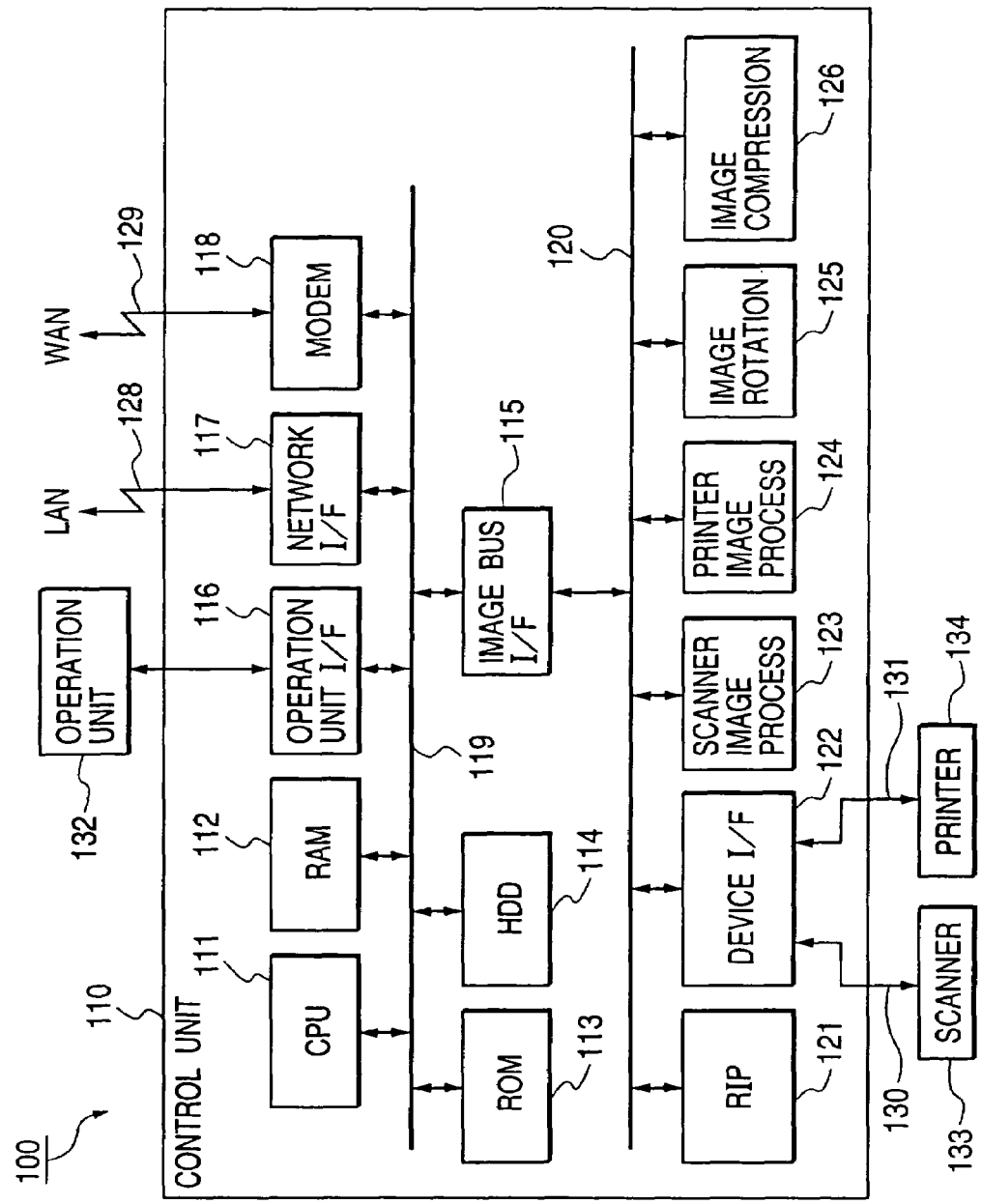
FIG. 1 is a block diagram illustrating the hardware arrangement of an image processing apparatus according to the present invention.

FIG. 1 is a diagram illustrating the hardware arrangement of an image processing apparatus 100 according to the present invention.

As shown in FIG. 1, the image processing apparatus 100 comprises a control unit 110, for the input and the output of image information and device information, an operation unit 132, a scanner 133, which is an image input device, and a printer 134, which is an image output device, all of which are connected to the control unit 110. The control unit 110 is connected both to a LAN (Local Area Network) 128 and to a WAN (Wide Area Network) 129 by a public telephone line.

The control unit 110 comprises: a CPU 111, for providing overall control for the image processing apparatus 100; a RAM 112, which includes a system work memory for controlling various operations performed by the CPU 111, and an image memory, for temporarily storing image data; a ROM (boot ROM) 113, which is used for storing a boot program for the image processing apparatus 100; an HDD (Hard Disk Drive) 114, used for storing image data and software for the apparatus 100; an operation unit I/F 116, which functions as an interface for the operation unit (UI) 132; a network I/F 117, for the input and the output of information via the LAN 128; and a modem 118, for the input and the output of information via the WAN 129. All of these components are connected together by a system bus 119.

With this arrangement, the operation unit I/F 116 outputs image data to the operation unit 132 for the display on the display section of the operation unit 132, which will be described later, or transmits to the CPU 111 information entered at the operation unit 132 by a user.

In addition to the above described arrangement, the control unit 110 further comprises: a raster image processor (RIP) 121, for developing a PDL record to provide a bit map image; a device I/F 122, which functions as an interface for the scanner 133 and the printer 134; a scanner image processor 123, for correcting, processing or editing image data entered by the scanner 133; a printer image processor 124, for converting and smoothing image data; an image rotation processor 125, for rotating image data; and an image compression processor 126, for compressing or decompressing multi-valued image data using the JPEG method, and binary image data using the JBIG, MMR or MH method. These components are connected together by an image bus 120.

With this arrangement, the device I/F 122 permits the scanner 133 and the printer 134 to communicate with the control unit 110, so that synchronization of image data is changed to asynchronization or vice versa.

In the control unit 110, data are exchanged between the system bus 119 and the image bus 120 via an image bus I/F 115.

The image bus I/F 115 is a bus bridge that performs the high speed transmission of image data and that changes the data structure. The image bus 120 is constituted by a PCI (Peripheral Communication Interface) bus or an IEEE1394 bus.

The hardware arrangement of the essential portion of the image processing apparatus 100 will now be specifically described.

{Image Input/Output Section: Scanner 133 and Printer 134}

Figure 2:
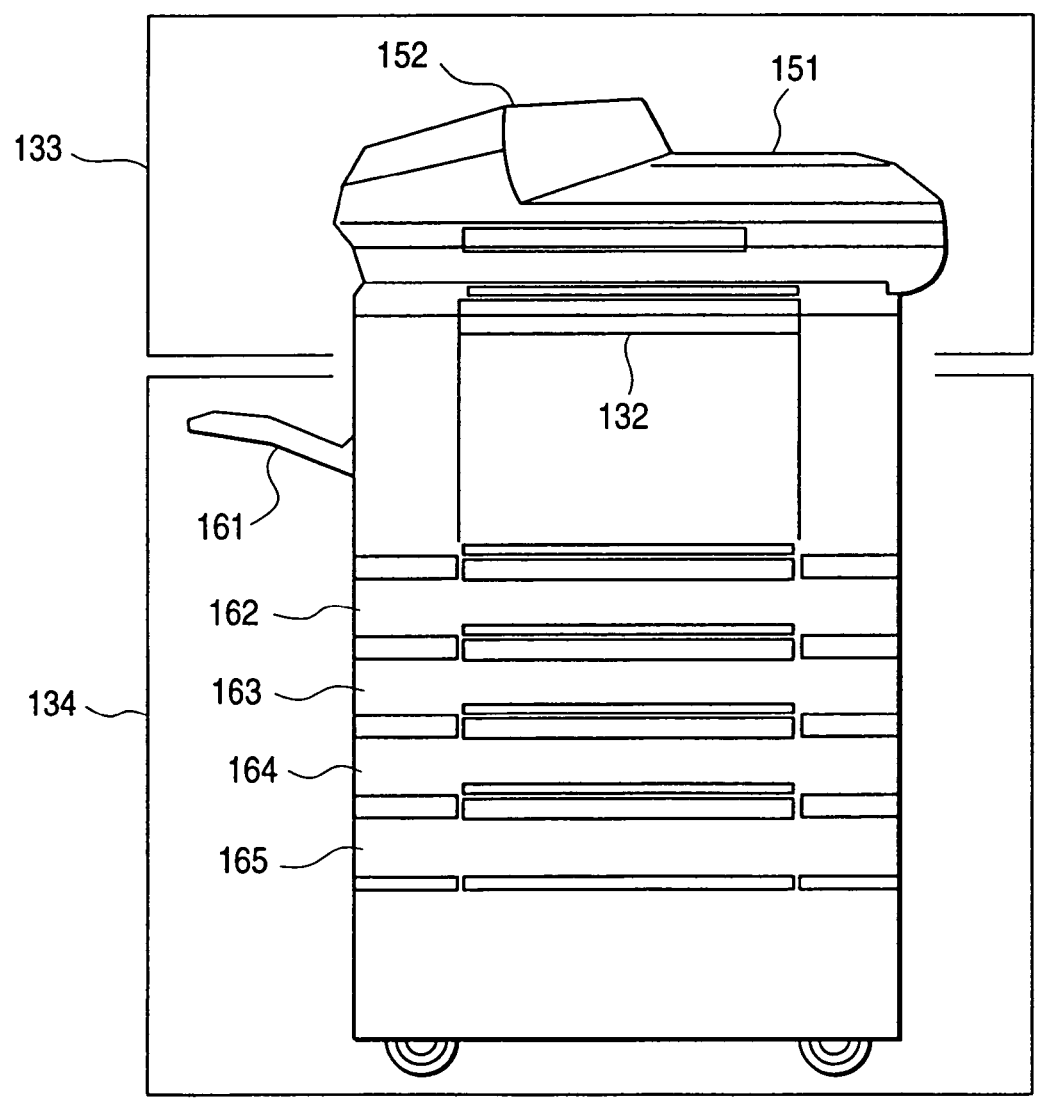
FIG. 2 is a diagram showing the external appearance of a scanner and a printer, image input/output devices for the image processing apparatus.

FIG. 2 is a diagram illustrating the external appearance of the scanner 133 and the printer 134, which are image input/output devices.

When using the scanner 133, which is an image input device, first, a user places a document on a tray 152 of a document feeder 151. Then, to start the reading of the document, the user enters an instruction at the operation unit 132. This instruction is transmitted by the CPU 111 to the scanner 133 (see arrows 130 in FIG. 1). Subsequently, the feeder 151 feeds individual sheets of the document into the scanner 133.

In the scanner 133, an image on the document sheet is irradiated (not shown) and scanned by a CCD line sensor (not shown), and the scanned data are converted into electric signals representing raster image data. The raster image data for the document sheet, which are obtained by the scanner 133, are transmitted to the device I/F 122 (see the arrows 130 in FIG. 1).

The arrows 130 in FIG. 1 represent the flow of the transmission of data or instructions between the device I/F 122 and the scanner 133.

For the printer 134, which is an image output device, a plurality of paper supply levels are provided to enable the selection of different paper sizes, or a different paper direction, and corresponding paper cassettes 162, 163, 164 and 165 are provided. A paper discharge tray 161 is used to hold printed sheets.

The thus structured printer 134 is activated when an instruction is received from the CPU 111 (see arrows 131 in FIG. 1). The printer 134 receives the raster image data from the CPU 111, and employs (converts) the data to form an image on a supplied sheet. For this process, electrophotography, using a photosensitive drum or a photosensitive belt, or the ink-jet printing method, for the direct printing of an image by the ejection of ink from arrays of tiny nozzles, is employed.

The arrows 131 in FIG. 1 represent the flow of the transmission of data or instructions between the device I/F 122 and the printer 134.

{Operation Unit 132}

Figure 3:
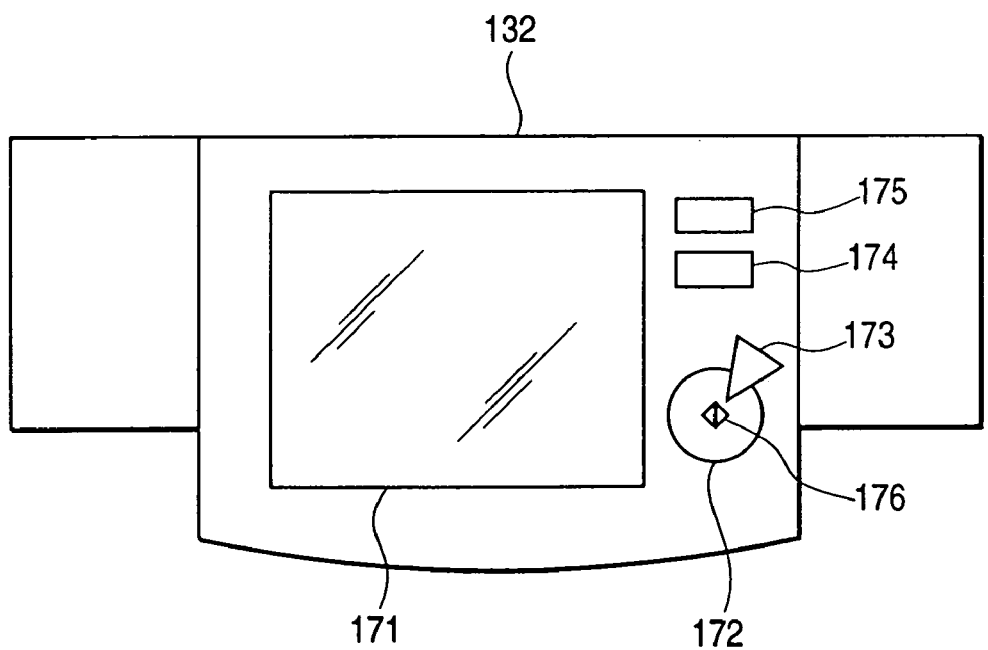
FIG. 3 is a diagram showing the external appearance of an operation unit in the image processing apparatus.

As shown in FIG. 3, an LCD display device 171, a start key 172, a stop key 173, an ID key 174, a reset key 175 and an LED 176 are provided for the operation unit 132.

For the LCD display device 171, a touch panel sheet is attached to an LCD. A screen for the performance of various operations by the apparatus 100 is displayed on the LCD, and when a key on the display is depressed, that positional information is transmitted to the CPU 111.

The start key 172 is used to initiate the scanning of a document image. An LED 176, which consists of green and red LEDs, is located in the center of the start key 172, and the color of the LED that is turned on is used to notify a user that use of the start key 172 is enabled or disabled.

The stop key 173 is used to halt a currently running operation.

The ID key 174 is used by a user to enter his or her ID (user ID).

The set key 175 is used to initialize various setups entered at the operation unit 132.

{Scanner Image Processor 123}

Figure 4:
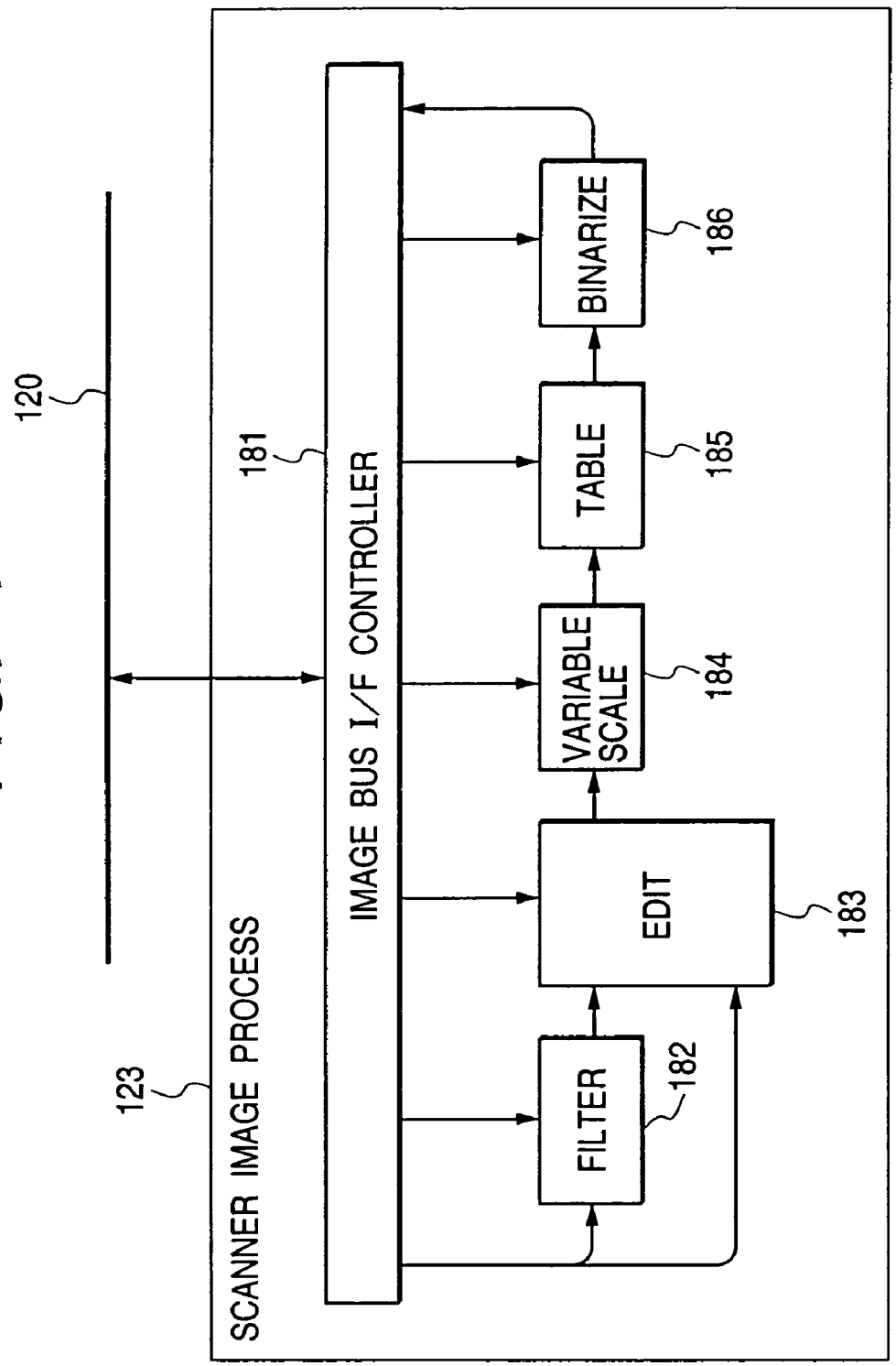
FIG. 4 is a block diagram illustrating the arrangement of a scanner image processor in the image processing apparatus.

In the scanner image processor 123, as shown in FIG. 4, a filter unit 182, an editing unit 183, a variable scale unit 184, a table 185 and a binarization unit 186 are connected to an image bus I/F 181.

The image bus I/F 181 is connected to the image bus 120, and has as one function the control of the bus access sequence, and has as another function the control of the individual devices of the scanner image processor 123 and the generation of an operating timing.

The filter unit 182 employs a spatial filter to perform convolution calculations for image data read by the scanner 133.

The editing unit 183 employs the image data read by the scanner 133 to identify a closed area defined by a marker pen, and performs image processing, such as shading, dotting or negative/positive inversion, for image data in the closed area.

The variable scale unit 184 performs interpolation for the primary scanning direction of the raster image and enlarges or reduces an image in order to change the resolution of image data read by the scanner 133. The scale in the secondary scanning direction is changed by altering the scanning speed of the CCD (image reading line sensor) in the scanner 133.

The table 185 is used to convert image data (luminance data) read by the scanner 133 into density data.

When the image data read by the scanner 133 is multi-valued gray scale image data, the binarization unit 186 employs an error diffusion process or a screen process to binarize the image data.

The image data that have been processed by the above individual sections are transmitted via the image bus I/F 181 to the image bus 120.

{Printer Image Processor 124}

Figure 5:
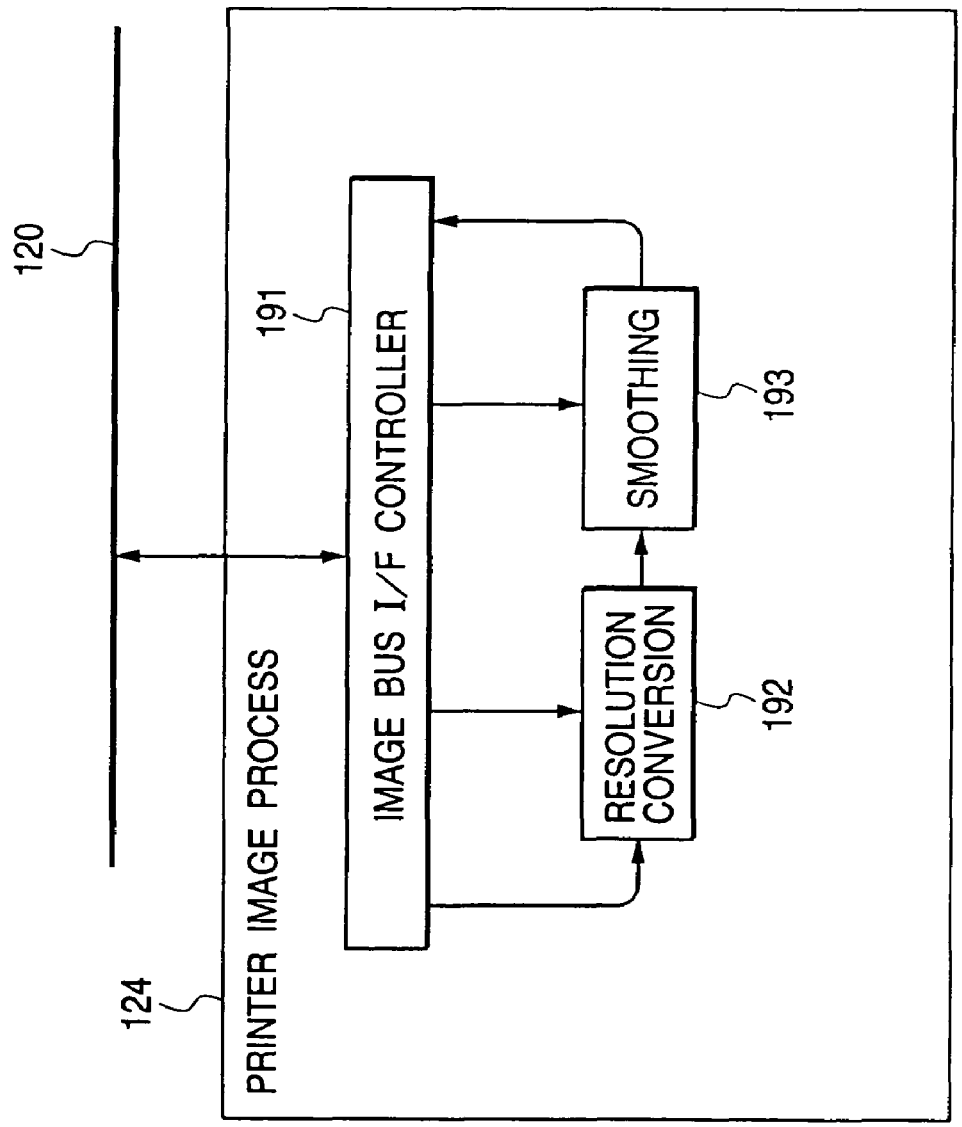
FIG. 5 is a block diagram illustrating the arrangement of a printer image processor in the image processing apparatus.

As shown in FIG. 5, in the printer image processor 124, a resolution converter 192 and a smoothing unit 193 are connected to an image bus I/F controller 191.

The image bus I/F controller 191, which is connected to the image bus 120, has as one function the control of the bus access sequence, and has as another function the control of the individual devices in the printer image processor 124 and the generation of an operating timing.

The resolution converter 192 receives image data from the network I/F 117 or the WAN 129, and converts them to provide a resolution that can be used by the printer 134.

The smoothing unit 193 removes jaggies (stairstepped or saw-toothed effects that appear at a monotone border in an image) for the image data that have been processed by the resolution converter 192, and provides an image with smooth edges.

{Image Compression Processor 126}

Figure 6:
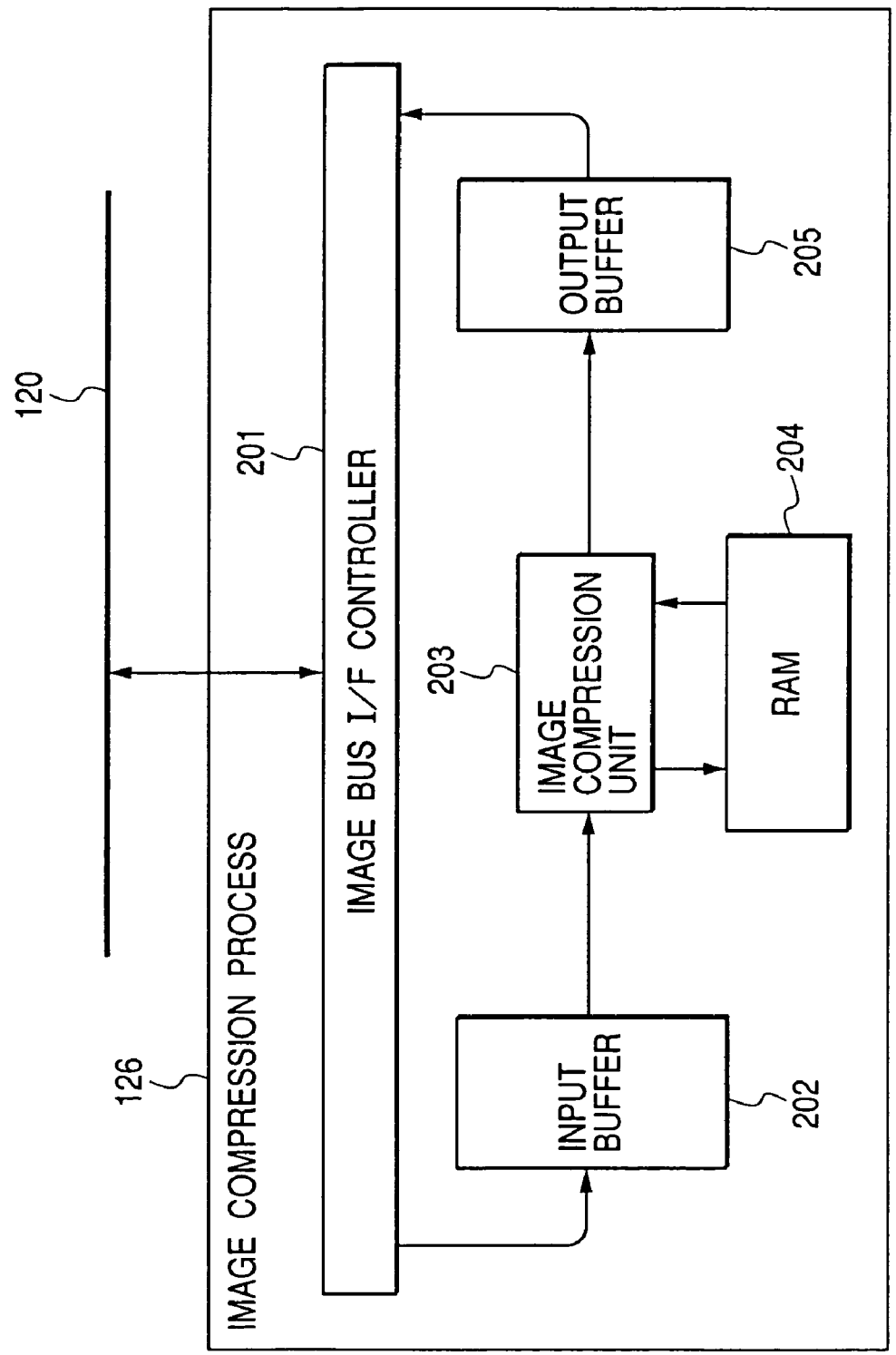
FIG. 6 is a block diagram illustrating the arrangement of an image compression processor in the image processing apparatus.

As shown in FIG. 6, the image compression processor 126 comprises: an input buffer 202; an image compression unit 203, for receiving the output of the input buffer 202; a RAM 204, which is connected to the image compression unit 203; and an output buffer 205, for receiving the output of the image compression unit 203. The input buffer 202 and the output buffer 205 are connected to an image bus I/F controller 201.

The image bus I/F controller 201, which is connected to the image bus 120, has as one function the control of the bus access sequence, and has as another function the control of the timing for the exchange of data with the input buffer 202 and the output buffer 205 and the setting of a mode for the image compression processor 126.

In the following manner, the image compression unit 203 compresses image data received from the input buffer 202.

First, the CPU 111 sets up, via the image bus 120, image compression control for the image bus controller I/F 201. Using this setup, the image bus I/F controller 201 performs for the image compression unit 203 the setup required for image compression, i.e., designates a compression method, such as MMR compression or JBIG compression.

After completing these setups, the CPU 111 permits the image bus I/F controller 201 to receive image data. In accordance with the permission granted to receive image data, the image bus I/F controller 201 receives image data from the RAM 204 from other devices via the image bus 120.

The image data received by the image bus I/F controller 201 are temporarily stored in the input buffer 202, and, in accordance with a request for image data that is issued by the image compression unit 203, are output at a constant speed to the image compression unit 203.

At this time, the input buffer 202 determines whether image data can be transmitted between the image bus I/F controller 201 and the image compression unit 203. If the reading of image data from the image bus 120 and the output (the writing) of image data to the image compression unit 203 are disabled, the input buffer 202 halts the transmission of data (this control is hereinafter called "handshaking").

Upon receiving image data from the input buffer 202, the image compression unit 203 temporarily stores the image data in the RAM 204, and compresses the image data in accordance with the setup of the image bus I/F controller 201.

The image data are temporarily stored in the RAM 204 because data for several lines are required, depending on the type of image compression process, and because data for the first line can not be compressed until data for several lines have been prepared.

The image data compressed by the image compression unit 203 are immediately transmitted to the output buffer 205.

The output buffer 205, as well as the input buffer 202, performs handshaking, and transmits the compressed image data from the image compression unit 203 to the image bus I/F controller 201.

The image bus I/F controller 201 transmits the received image data to the RAM 112 or to the individual devices via the image bus 120.

The series of processes described above is repeated so long as the CPU 111 permits the image bus I/F controller 201 to transmit image data (until the processing of image data for necessary pages is completed), or until the image compression unit 203 issues a stop request because an error occurred during the compression.

In the above explanation, the image compression processor 126 compresses image data; however, it can also decompress compressed image data.

{Image Rotation Processor 125}

Figure 7:
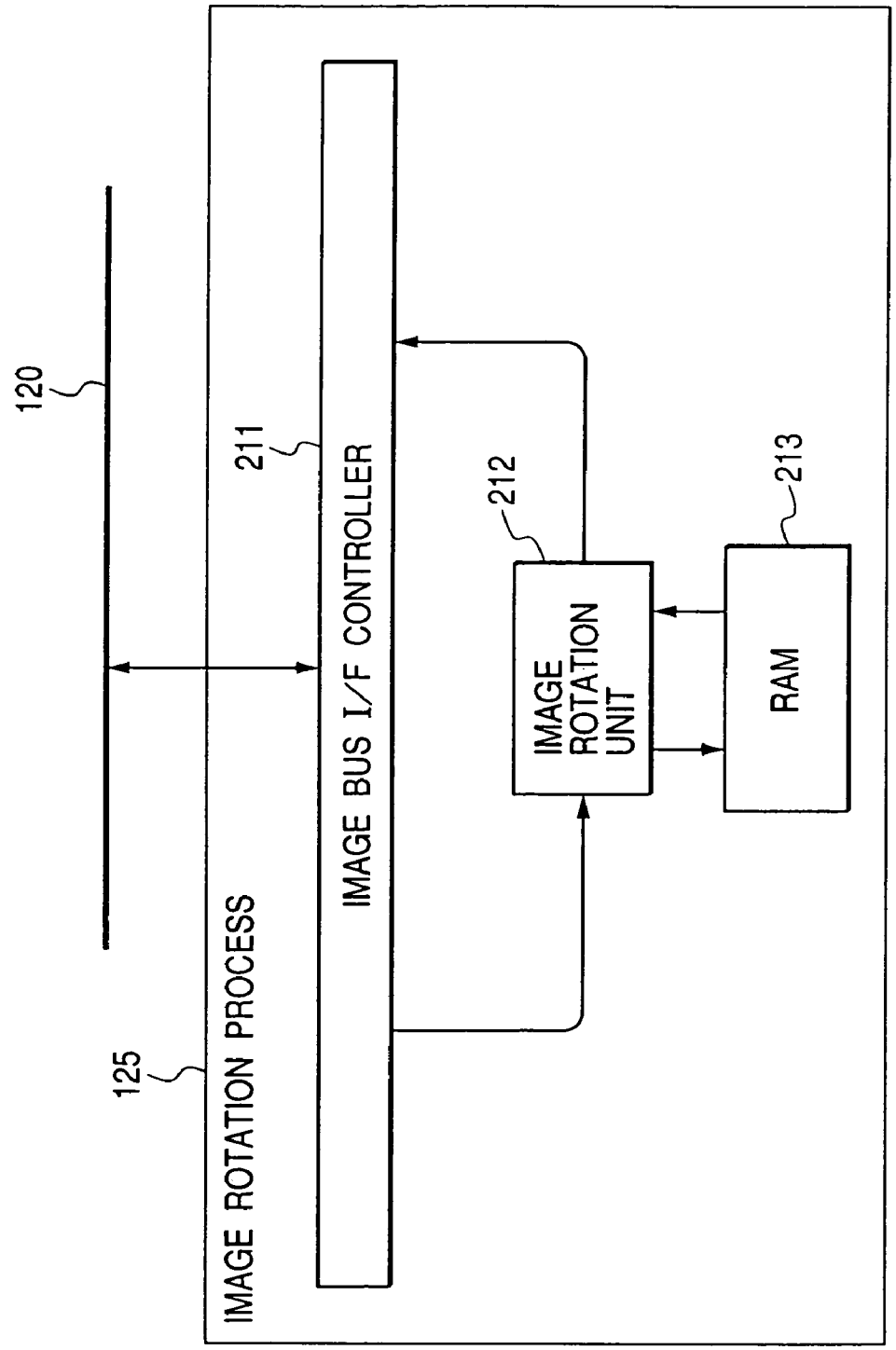
FIG. 7 is a block diagram illustrating the arrangement of an image rotation processor in the image processing apparatus.

As shown in FIG. 7, the image rotation processor 125 comprises an image rotation unit 212 and a RAM 213 connected to the image rotation unit 212. The image rotation unit 212 is connected to an image bus I/F controller 211.

The image bus I/F controller 211, which is connected to the image bus 120, has as one function the control of the bus access sequence, and has as another function the setting of a mode for the image rotation unit 212 and the controlling of an operating timing for the transmission of image data to the image rotation unit 212.

In the following manner, the image rotation unit 212 performs the rotation of an image using the image data received from the image bus I/F controller 211.

First, the CPU 211 designates image rotation control for the image bus I/F controller 211 via the image bus 120. In accordance with this setup, the image bus I/F controller 211 performs, for the image rotation unit 212, setups required for image rotation, for example, the designation of an image size, a rotation direction and a rotation angle.

Following the completion of these designations, the CPU 111 permits the image bus I/F controller 211 to transmit image data. In accordance with this permission, the image bus I/F controller 211 receives image data from the RAM 204 and the individual devices via the image bus 120.

Assume that the image data to be transmitted are 32-bit data for a binary image, that the image rotation unit 212 performs the image rotation process for each block of 32×32 bits, and that image data for each 32 bits are transmitted to the image bus 120.

Figure 8:
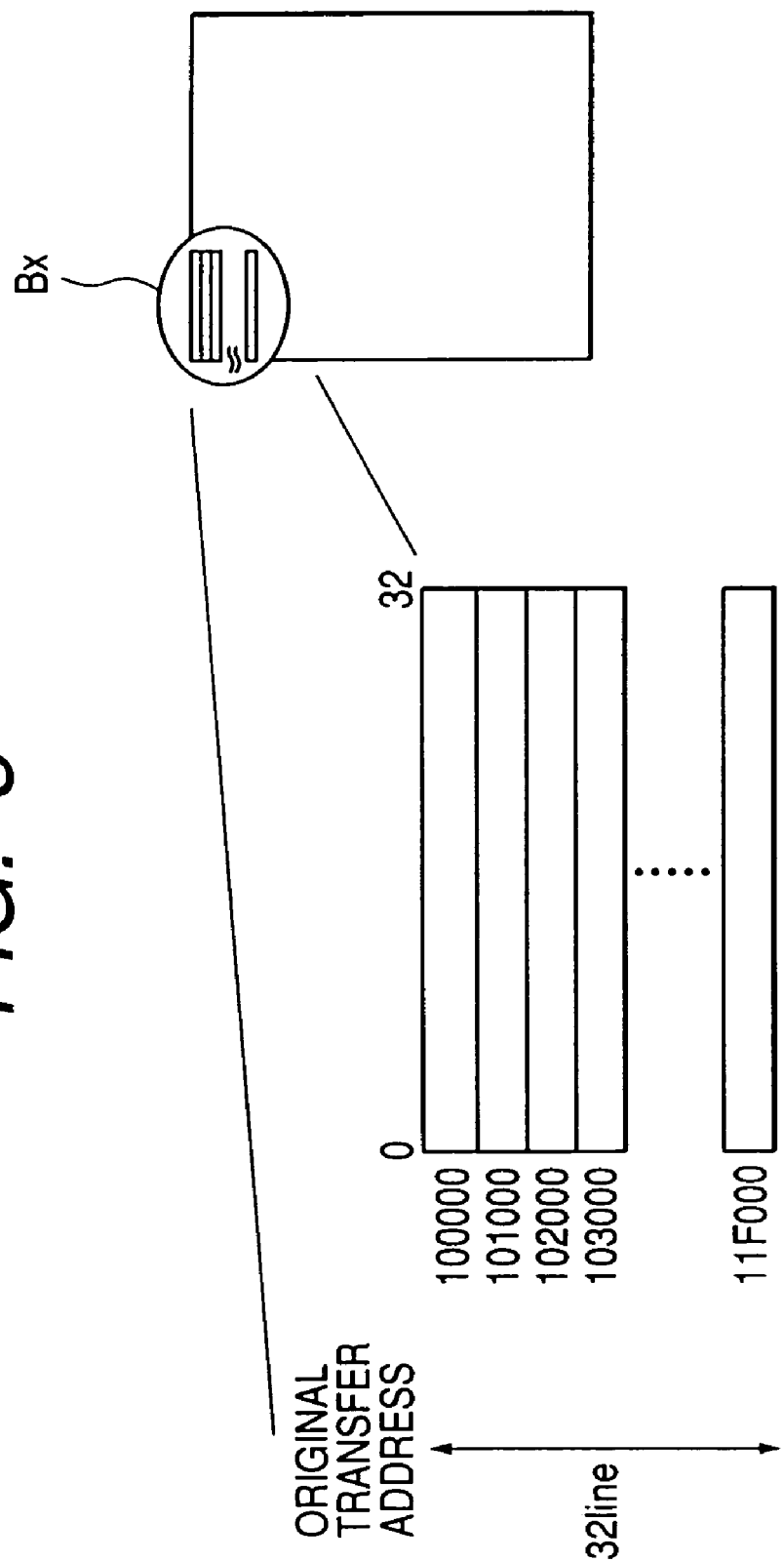
FIG. 8 is a diagram for explaining the transmission of data to the image rotation processor.

In this case, as shown in FIG. 8, the transmission of 32 bits of data from the image bus I/F controller 211 to the image rotation unit 212 is performed 32 times at discontinuous addresses (discontinuous addressing), so that the image rotation unit 212 obtains data $B_X$ for one block for image rotation.

Figure 9:
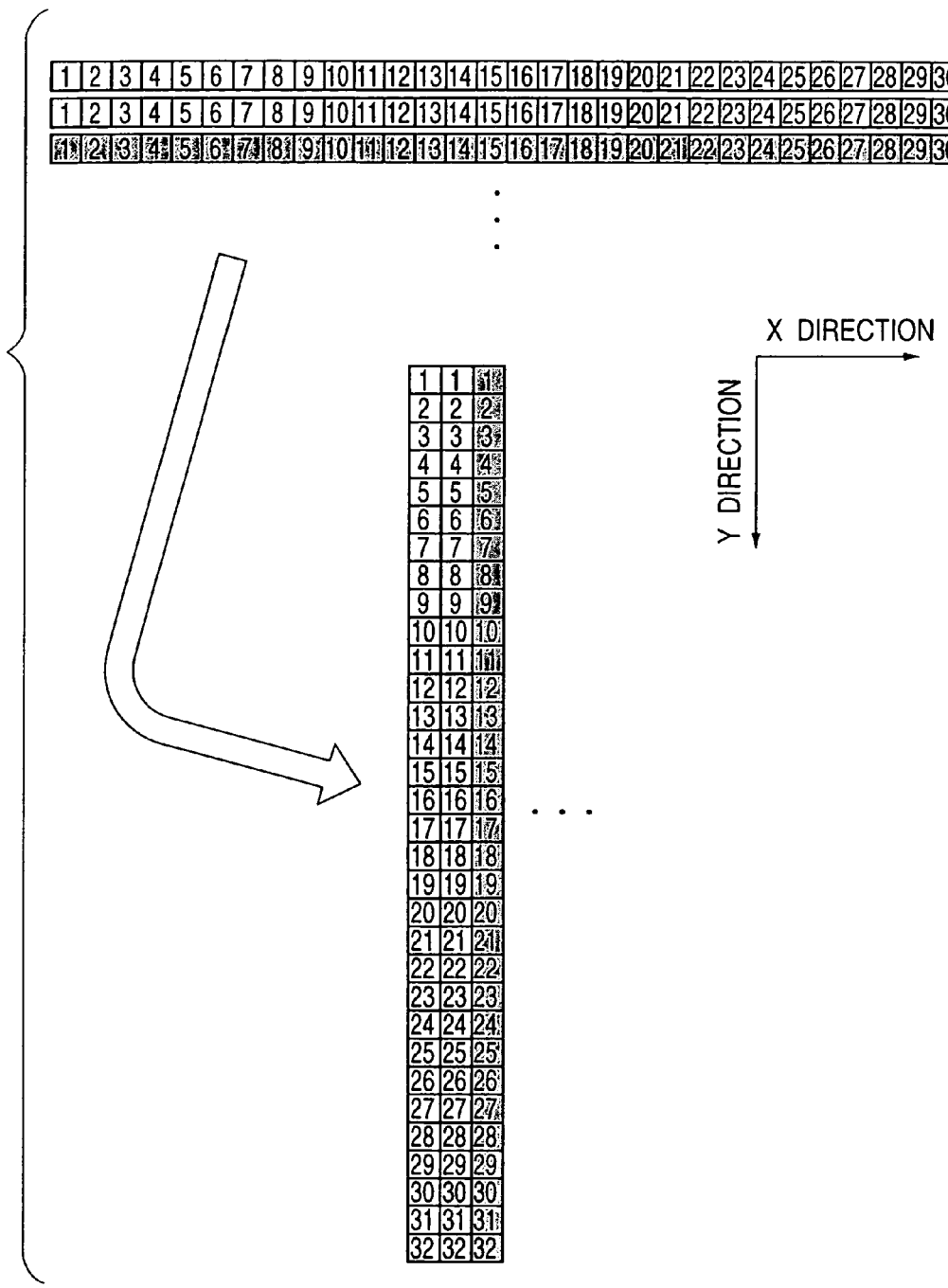
FIG. 9 is a diagram for explaining the image rotation process performed by the image rotation processor.

The image rotation unit 212 writes the received image data in the RAM 213, so that when read, the image data are rotated at a desired angle, as shown in FIG. 9. Specifically, for the counterclockwise rotation direction of 90 degrees, for example, the first received 32-bit data are written in the Y direction. Therefore, to read the 32-bit data from the RAM 213, the data are read in the X direction, so that an image is rotated.

When 32×32 bits of image data have been written in the RAM 213 (image rotation has been completed), the image rotation unit 212 reads the image data from the RAM 213 in the above described manner, and transmits them to the image bus I/F controller 211.

Through continuous addressing, the image bus I/F controller 211 transmits the received image data to the RAM 112 or to individual devices via the image bus 120.

The series of processes described above is repeated so long as the CPU 111 permits the image bus I/F controller 211 to transmit image data (until the processing of image data for necessary pages has been completed).

{Device I/F 122}

Figure 10:
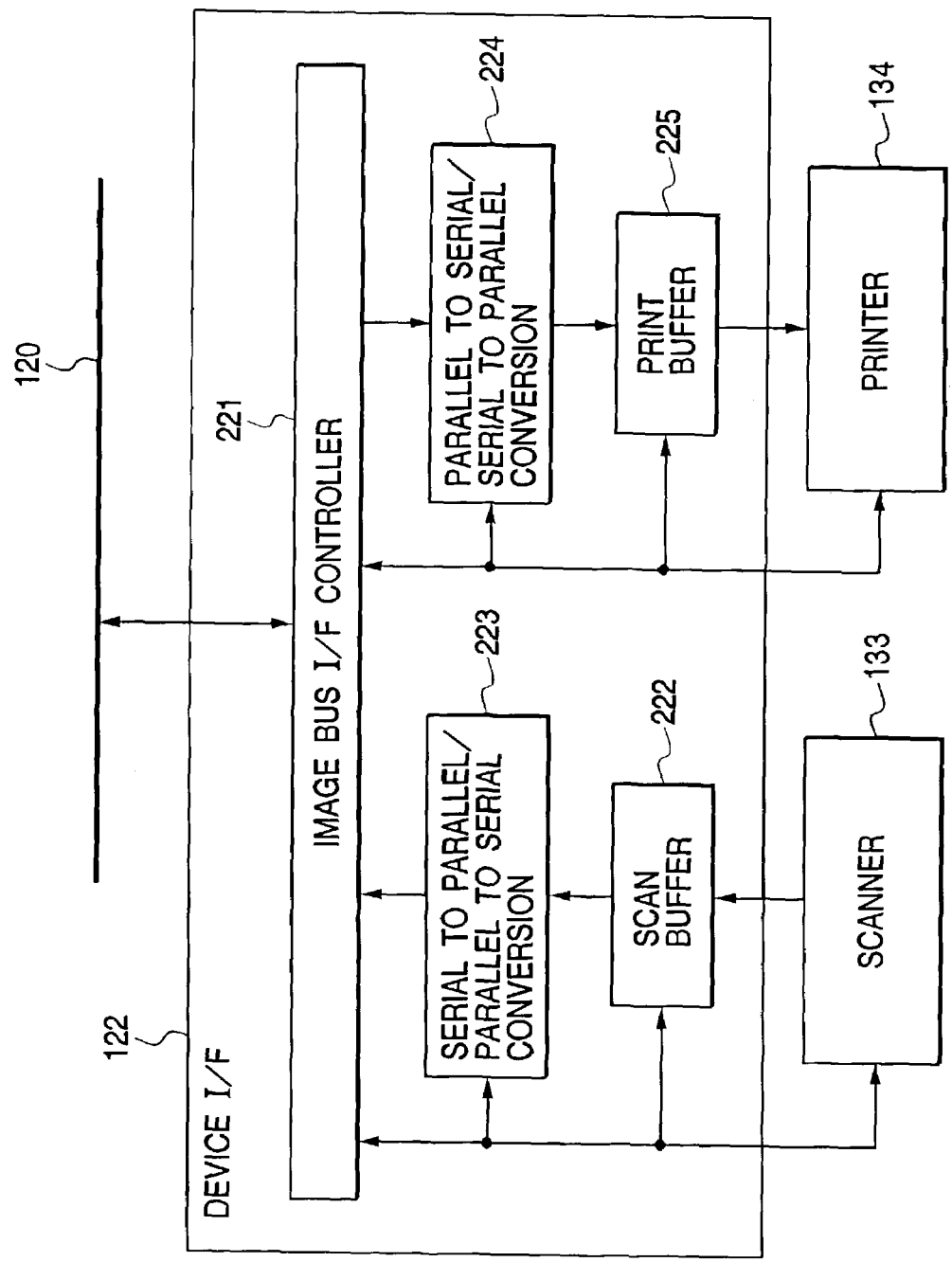
FIG. 10 is a block diagram showing the structure of a device I/F in the image processing apparatus.

As shown in FIG. 10, the device I/F 122 comprises: a serial to parallel/parallel to serial converter (hereinafter referred to simply as a converter) 223 and a scan buffer 222, both of which receive the output of the scanner 133, and a parallel to serial/serial to parallel converter (hereinafter referred to simply as a converter) 224 and a print buffer 225, both of which receive the output of the printer 134. The converters 223 and 224 are connected to an image bus I/F controller 221.

The image bus I/F controller 221, which is connected to the image bus 120, has a function for the control of the bus access sequence, a function for the control of the individual devices in the device I/F 122 and the generation of an operating timing, and a function for the generation of a control signal for the scanner 133 and the printer 134.

The scan buffer 222 is used to temporarily hold image data received from the scanner 133, and to output the image data in synchronization with the operating timing for the image bus 120.

The converter 223 arranges image data received from the scan buffer 222 in a predetermined order, or separates the image data and rearranges them so that they have a width that is suitable for transmission to the image bus 120.

The converter 224 separates the image data received from the image bus 120, or rearranges them, so that they have a width that can be stored in the print buffer 225.

In the print buffer 225, the image data obtained by the converter 224 are stored temporarily, and are synchronously outputted to the printer 134.

While an image is being scanned by the scanner 133, the following processing is performed by the device I/F 122.

First, in synchronization with a timing signal output by the scanner 133, the image data transmitted by the scanner 133 are temporarily stored in the scan buffer 222.

At this time, if a PCI bus, for example, is employed as the image bus 120, and 32 bits or more of image data are stored in the scan buffer 222, 32 bits of image data are transmitted to the converter 223 in a first-in and first-out manner. The converter 223 performs the above described conversion for the received 32 bits of image data, and transmits the resultant image data via the image bus I/F controller 221 to the image bus 120.

If an IEEE1394 bus is employed as the image bus 120, image data stored in the scan buffer 222 are transmitted to the converter 223 in a first-in and first-out manner. The converter 223 converts the received image data into serial data as is described above, and transmits the serial data via the image bus I/F controller 221 to the image bus 120.

While an image is being printed by the printer 134, the following processing is performed by the device I/F 122.

When, for example, a PCI bus is employed as the image bus 120, 32 bits of image data are transmitted from the image bus 120 to the image bus I/F controller 221. The image bus I/F controller 221 then transmits the received image data to the converter 224.

The converter 224 converts the received image data into image data that correspond to the number of data bits input for the printer 134, and temporarily stores them in the print buffer 225.

If an IEEE1394 bus is employed as the image bus 120, serial image data are transmitted from the image bus 120 to the image bus I/F controller 221. The image bus I/F controller 221 then transmits the received image data to the converter 224.

The converter 224 converts the received image data into image data that correspond to the number of data bits input for the printer 134, and temporarily stores them in the print buffer 225.

The image data that are stored in the print buffer 225 are transmitted to the printer 134 in a first-in and first-out manner in synchronization with a timing signal output by the printer 134.

The hardware arrangement of the essential portion of the image processing apparatus 100 has been explained.

The software arrangement of the image processing apparatus will now be described.

{Overall System Configuration}

Figure 11:
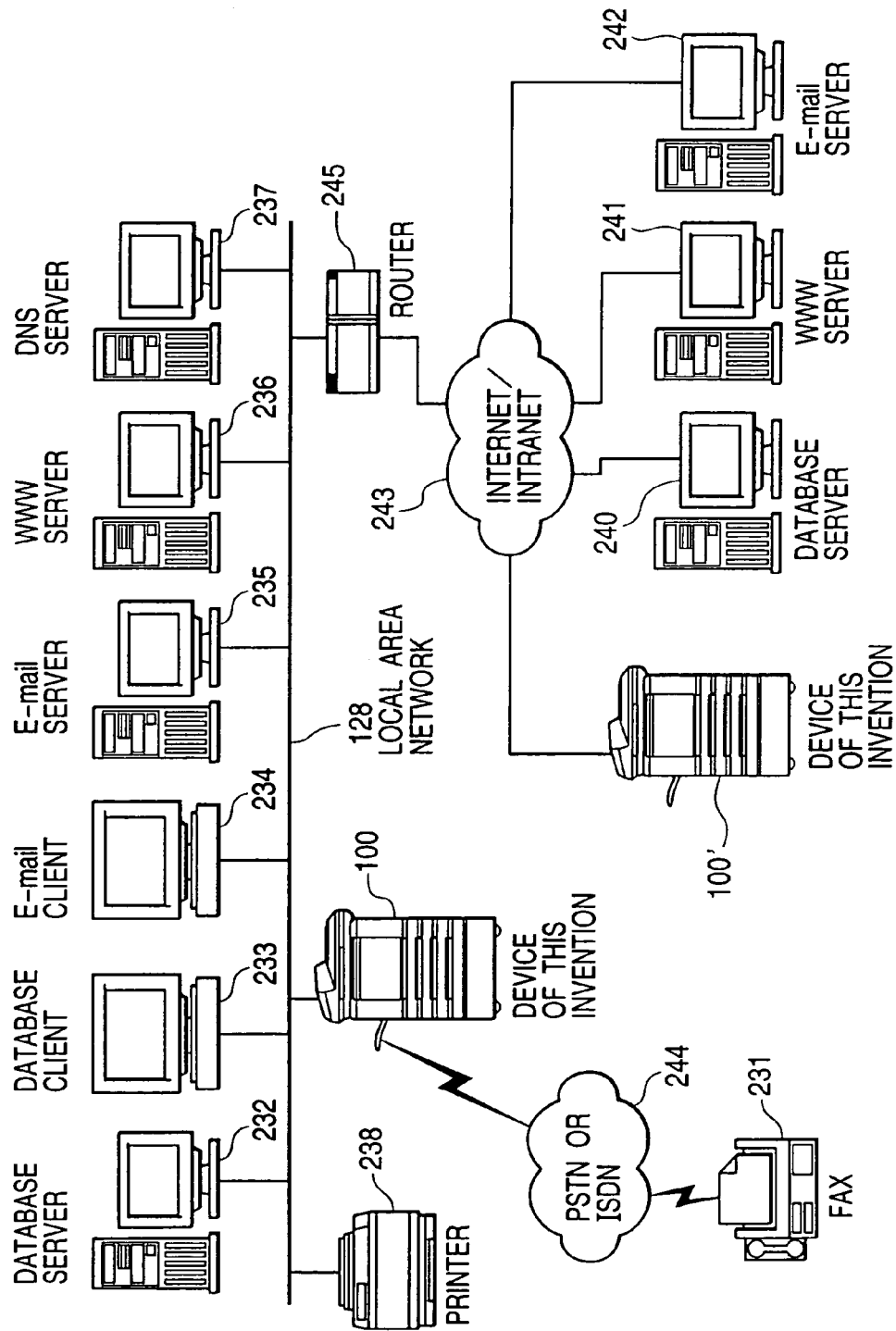
FIG. 11 is a diagram for explaining a network system, including the image processing apparatus.

FIG. 11 is a diagram showing the location of the image processing apparatus 100 in a network system.

As is described above, the image processing apparatus 100 comprises the scanner 133 and the printer 134, and can read image data from the scanner 133 and transmit them to the LAN 128, or can receive image data via the LAN 128 and print them using the printer 134.

Furthermore, the image processing apparatus 100 can employ facsimile (FAX) transmission means (not shown) to transmit image data that are read by the scanner 133 via a PSTN or ISDN 244 to a facsimile machine (FAX) 231, and can employ the printer 134 to print image data received via the PSTN or the ISDN 244.

In addition to the image processing apparatus, a database server 232, a database client 233, an E-mail client 234, an E-mail server, a WWW (World Wide Web) server 236, a DNS (Domain Name System) server 237, a printer 238 and a router 245 are connected to the LAN 128.

Further, an image processing apparatus 100' having the same structure as the image processing apparatus 100, a database server 240, a WWW server 241 and an E-mail server 242 are connected to the router 245.

The database server 232 manages, as a database, image data (data for a binary image or a multi-valued image) that are read by the image processing apparatus 100 (specifically, by the scanner 133).

The database client 233, which is a client of the database server 232, can read and search through image data managed by the database server 232.

The E-mail server 235 can receive, as information attached to an E-mail, image data read by the image processing apparatus 100 (specifically, by the scanner 133).

The E-mail client 234, which is a client of the E-mail server 235, can receive and read E-mail transmitted to the E-mail server 235, or can transmit E-mail.

The WWW server 236 provides an HTML (Hyper Text Markup Language) document for the LAN 128. The HTML document provided by the WWW server 236 can be printed by the image processing apparatus 100 (specifically, by the printer 134).

The router 245 is used to link the LAN 128 with the Internet/Intranet 243.

The image processing apparatus 100', the database server 240, the WWW server 241 and the E-mail server 242, all of which are connected via the Internet/Intranet 243 to the router 245, have the same respective functions as have the image processing apparatus 100, the database server 232, the WWW server 236 and the E-mail server 235.

The image processing apparatus 100 can exchange data with the facsimile machine 231, and also with the printer 238 via the LAN 128. Therefore, the image processing apparatus 100 can also employ the printer 238 to print image data that it has read.

{Overall Software Configuration}

Figure 12:
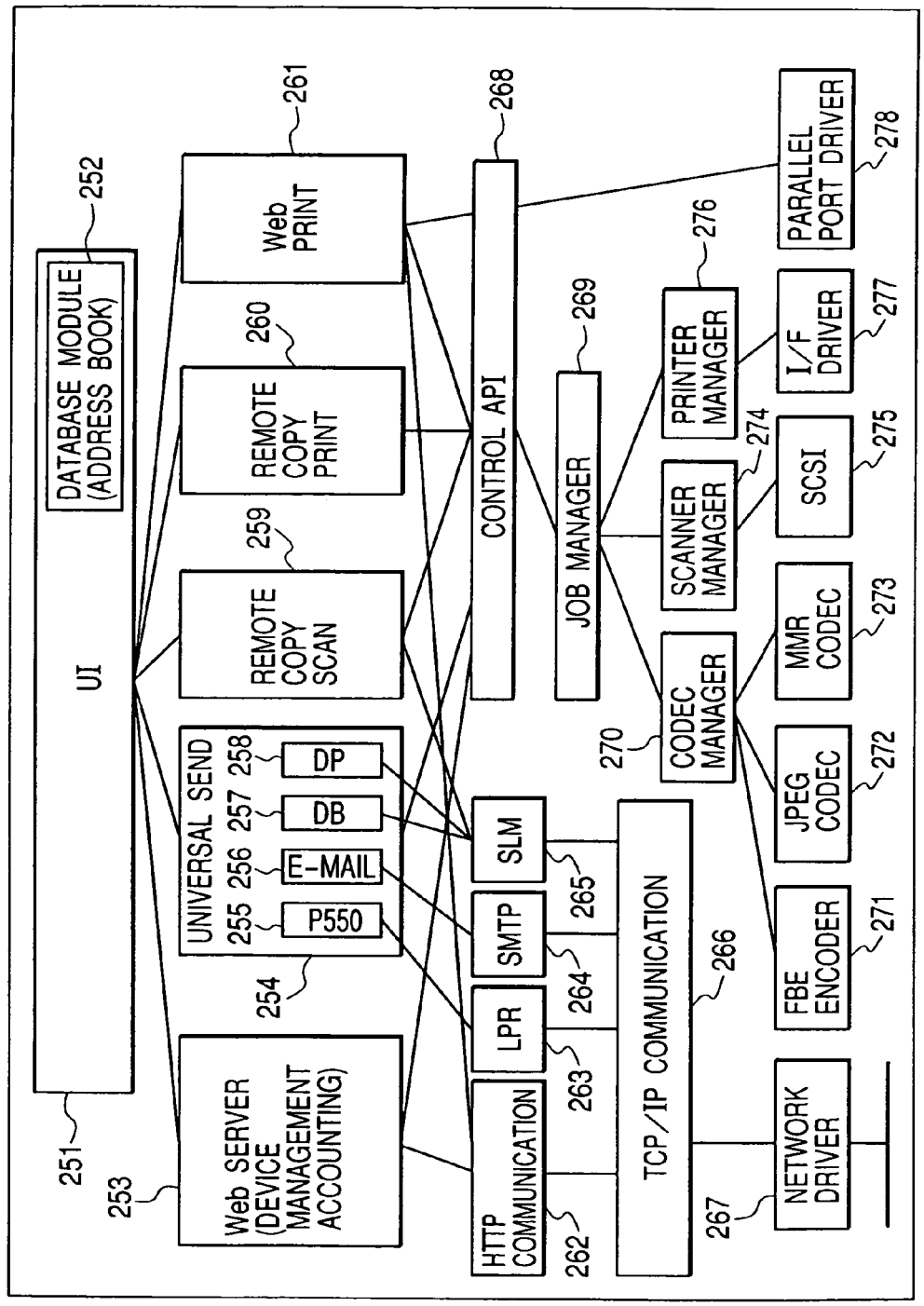
FIG. 12 is a diagram for explaining the function (module) of the image processing apparatus performed by software.

FIG. 12 is a block diagram illustrating the functions (modules) of the image processing apparatus 100 which are implemented by software.

A user interface (UI) module 251 manages a user interface, and intercedes with the apparatus 100 when an operator enters commands for various operations and setups at the operation unit 132.

In accordance with the manipulation performed at the operation unit 132 (the entry of an instruction by an operator), to request a process or to set data the UI module 251 transmits the input information to individual modules that will be described later.

A database module 252 manages an address book, i.e., data transmission destinations or communication destinations. The UI module 251 adds data to, deletes data in, and extracts data from the address book that is managed by the database module 252. The UI module 251 employs the address book when, in accordance with an instruction entered at the operation unit 132, information for a data transmission destination or a communication destination is transmitted to the individual modules that will be described later.

A web server (Device Management, Accounting) module 253 is employed to provide management information for the apparatus 100 in response to a request from a Web client (not shown). The management information is read by a control API module 268, which will be described later, and is transmitted to the Web client via an HTTP communication module 262, a TCP/IP communication module 266 and a network driver 267, which will be described later.

A data distribution (Universal Send) module 254, which controls the distribution of data, in accordance with an instruction entered by an operator, distributes (transmits) data to a communication (output) destination specified in the instruction. When an operator employs the scanner 133 (the scanner function) of the apparatus 100 to instruct the generation of distributed data, the universal send module 254 permits the control API module 268 to activate the apparatus 100 for the generation of distributed data.

A printer (P550) module 255 is executed when a printer (e.g., the printer 238) is designated an output destination by the universal send module 254.

An E-mail module 256 is executed when an E-mail address is designated a communication destination by the universal send module 254.

A database (DB) module 257 is executed when a database (the database server 232) is designated an output destination by the universal send module 254.

A DP module 258 is executed when an apparatus (the image processing apparatus 100') that corresponds to the apparatus 100 is designated an output destination by the universal send module 254.

A remote copy scan module 259 employs the scanner 133 (scanner function) of the apparatus 100 to perform the copy function, as is performed independently by the apparatus 100, while designating, as an output destination, another apparatus (e.g., the image processing apparatus 100') connected to the network.

A remote copy print module 260 employs the printer 134 (printer function) of the apparatus 100 to perform the printing function, as is performed independently by the apparatus 100, while designating, as an input destination, another apparatus (e.g., the image processing apparatus 100') connected to the network.

A Web print module 261 reads and prints information found on various home pages on the Internet or the Intranet.

An HTTP communication module 262 is used when the apparatus 100 performs communication using HTTP, and provides communication for the Web server module 253 and the Web print module 261 using a TCP/IP communication module 266 that will be described later.

An LPR (Line Printer Daemon) module 263 provides communication for the printer module 255 in the universal send module 254 using the TCP/IP communication module 266 that will be described later.

An SMTP (Simple Mail Transfer Protocol) module 264 provides communication for the E-Mail module 256 in the universal send module 254 using the TCP/IP communication module 266.

An SLM (Salutation-Manager or Smart Link Manager) module 265 employs the TCP/IP communication module 266 to provide communication for the DB module 257 and the DP module 258 in the universal send module 254, the remote copy scan module 259, and the remote scan print module 260.

The TCP/IP communication module 266 employs a network driver 267, which will be described later, to provide network communication for the various modules described above.

The network driver 267 controls a portion that is physically connected to the network.

The control API module 268 provides, for an upstream module, such as the universal send module 254, an interface with a downstream module, such as a job manager module 269 that will be described later. Therefore, the dependency between the upstream and the downstream modules is reduced and the diversity of each module is enhanced.

The job manager module 269 interprets a process instruction received from each of the above modules through the control API module 268, and transmits an instruction to individual modules that will be described later. The job manager module 269 collectively manages the hardware processing performed in the apparatus 100.

A codec manager module 270 controls various data compression and decompression processes as instructed by the job manager module 269.

An FBE encoder 271 compresses, in accordance with an FBE format, data that are read during the scanning process by the job manager module 269 and a scanner manager module 274.

A JPEG compression/decompression unit (codec manager) 272 employs the JPEG method to compress the data read during the scanning process performed by the job manager module 269 and the scanner manager module 274, and to develop (decompress) print data during the printing process performed by the printer manager module 276. An MMR compression/decompression unit (MMR codec) 273 employs the MMR method to compress data read during the scanning process performed by the job manager module 269 and the scanner manager module 274, and to develop (decompress) print data during the printing process performed by the printer manager module 276.

The scanner manager module 274 controls the scanning process instructed by the job manager module 269.

A SCSI driver 275 communicates with the scanner manager module 274 and with the scanner 133 that is internally connected to the apparatus 100.

The printer manager module 276 controls a printing process instructed by the job manager module 269.

An I/F (engine I/F) driver 277 serves as an I/F between the printer manager module 276 and the printer 134 (printing unit).

A parallel port driver 278 provides an I/F when the Web print module 261 outputs data via the parallel port to an output device (not shown).

{Application}

Figure 13:
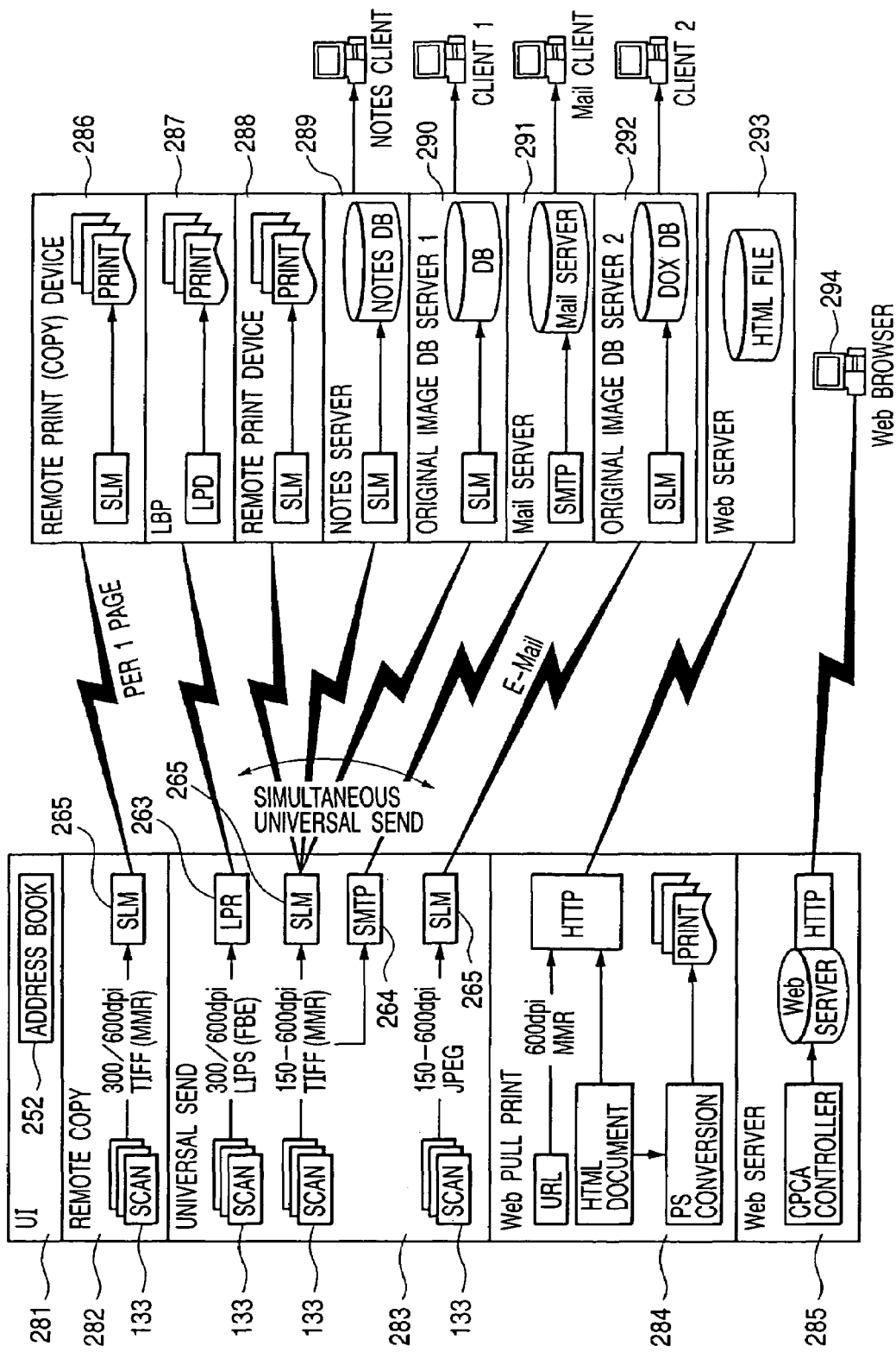
FIG. 13 is a diagram for explaining an application installed in the image processing apparatus.

FIG. 13 is a diagram showing various applications installed in the image processing apparatus 100, in particular, applications concerning data distribution.

An application 281 (UI) is an application for the operation unit 132 explained while referring to FIG. 3.

An application 282 (Remote Copy) is an application for a remote copy transmission side (the remote copy scan module 259 in FIG. 12).

An application 283 (Universal Send) is an application for a simultaneous distribution side (the universal send module 254 in FIG. 12).

An application 284 (Web Pull Print) is an application for the Web print module 261 in FIG. 12.

An application 285 (Web Server) is an application for the Web server module 253 in FIG. 12.

An application 286 (Remote Print(Copy) Device) is an application for a remote copy reception side (the remote copy print module 260 in FIG. 12).

An application 287 (LBP) is an application that controls a general-purpose printer which prints image data that are simultaneously distributed by the application 283.

An application 288 (Remote Print Device) is an application for a remote print reception side (the remote copy print module 260 in FIG. 12).

An application 289 (Notes Server) is an application that controls the Notes Server which stores, in a database, image data that are simultaneously distributed by the application 283.

An application 290 (Original Image DB Server1) is an application for storing, in a database, binary image data that are simultaneously distributed by the application 283.

An application 291 (Mail Server) is an application that controls the Mail Server which stores, in a file, image data that are simultaneously distributed by the application 283.

An application 292 (Original Image DB Server2) is an application for storing, in a database, multi-valued image data that are simultaneously distributed by the application 283.

An application 293 (Web Server) is an application for the Web Server that includes information contents.

A Web browser 294 in FIG. 13 accesses a Web server in the application 285 (the Web server module 253 in FIG. 12).

A detailed explanation will now be given for the main applications among the above applications 281 to 293.

<Application 281 (UI)>

The UI (user interface) and the address book 252 have been described above, but a more specific explanation will be given for the address book 252 for which the UI module 251 (see FIG. 12) performs the addition, the deletion and the extraction of data.

The address book 252 is stored in a nonvolatile memory (e.g., on a hard disk) provided for the image processing apparatus 100, and the contents of the address book 252 are data for the features of various devices connected to the network.

For example, the following data are described in the address book 252.

the official name of a device and its alias
    the network address of a device
    a network protocol available for a device
    a document format available for a device
    a compression method (type) available for a device
    an image resolution available for a device
    an available paper size and paper cassette level information if an object device is a printer
    the name of a folder for the storage of a document if an object device is a server (computer)

The following applications can identify the feature of a distribution destination by examining the various data items stored in the address book 252.

application 282 (Remote Copy)
    application 283 (Universal Send)
    application 284 (Web Pull Print)
    application 285 (Web Server)

As is described above, the address book 252 can be edited, and also can be referred to directly. Further, the data stored in the computer of the server on the network can be downloaded and employed as data that are to be entered in the address book 252.

<Application 282 (Remote Copy)>

The application 282 refers to the address book 252 to identify a resolution available for a device (e.g., the printer 238) that is designated as a distribution destination. In accordance with the results obtained, the application 282 employs the MMR method to compress image data (binary image data) read by the scanner 133. The compressed image data are formatted in accordance with the TIFF (Tagged Image File Format), and are transmitted by the SLM module 265 to a printer on the network (e.g., the printer 283).

It should be noted that "SLM" is one type of network protocol that includes device control information called "Salutation Manager" or "Smart Link Manager".

<Application 283 (Universal Send)>

The application 283, unlike the application 282 (Remote Copy), can simultaneously transmit, to a plurality of distribution destinations, image data that are obtained through the scanning of one image by the scanner 133. Further, the image data can be transmitted not only to the printer but also directly to a so-called server computer.

An example distribution process in accordance with the type of distribution destination device will be explained.

Assume that it is determined from data in the address book 252 that a distribution destination device can process the LPR (Line Printer Daemon), which is a network printer protocol, and an LIPS, which is a printer control command. First, the resolution available for the device that is designated a distribution destination is obtained from the address book 252. In accordance with the results obtained, the image data read by the scanner 133 are compressed using the FBE (First Binary Encoding) method. The compressed image data are then LIPS coded, and the resultant image data are transmitted to the destination by the LPR module 263 (in accordance with the LPR that is a network printer protocol).

If it is determined from data in the address book 252 that the destination device is a server device for which the SLM can be used for communication, the server address and the designated folder in the server are identified. Then, as does the application 282, the application 283 employs the MMR method to compress image data (binary image data) obtained by the scanner 133. The compressed image data are formatted in accordance with the TIFF (Tagged Image File Format), and the resultant data are stored by the SLM module 265 in a specific folder in the server device on the network.

If it is determined from data in the address book 252 that the destination device is a server device that can process image data compressed using the JPEG method (multi-valued image data), the server address and the designated folder in the server are identified by referring to the address book 252. Then, in the same manner as that used for the binary image data, the multi-valued image data read by the scanner 133 are compressed using the JPEG method. The compressed image data are then formatted in accordance with the TIFF, and the resultant data are stored by the SLM module 265 in a specific folder in the server device on the network.

If it is determined from data in the address book 252 that the destination device is a device on the E-mail server side, a mail address is obtained from the address book 252. Then, binary image data read by the scanner 133 are compressed using the MMR method. Thereafter, the compressed image data are formatted in accordance with the TIFF, and the resultant image data are transmitted to the E-mail server by the SMTP module 264. The application 291 (Mail Server) is employed for any further transmission of the data by the E-mail server.

This completes the explanation of the software arrangement for the image processing apparatus 100.

An explanation will now be given for screens on the LCD display device 171 of the operation unit 132 of the image processing apparatus 100, the manipulation of devices on the screens, and the accompanying processing.

{Operation Screen}

The functions available with the image processing apparatus 100 are assigned to six primary functional categories: a copy function (Copy), a transmission function (Send), a printing function (Retrieve), a task function (Tasks), an information management function (Management) and a setup function (Configuration). These functions correspond to six main tabs that are displayed at the top of an operation screen 301 shown in FIG. 14: "COPY" 302, "SEND" 303, "RETRIEVE" 304, "TASKS" 305, "MGMT" 306, and "CONFIG" 307.

Therefore, when a user selects one of the main tabs 302 to 307 that corresponds to a desired function, the operation screen 301 is changed to a screen for a corresponding category. If the switching to a screen for another category is not permitted, i.e., if the execution of another function is not permitted, the display colors of the main tabs 302 to 307 are changed and there is no further reaction to the depression of any of the main tabs.

The copy function "COPY" includes a function for employing the scanner 133 of the apparatus 100 and the printer 134 to copy data contained in a document (hereinafter referred to as document data), and a function (hereinafter also referred to as a remote copy function) for employing the scanner 133 and the printer 238 (remote printer) on the network to copy document data.

The transmission function "SEND" transmits document data read by the scanner 133 to the E-mail server 235, the printer 238, the facsimile machine 231, the file transmitter (FTP) and the database server 232. At this time, a plurality of addresses can be designated.

The printing function "RETRIEVE" externally obtains document data, and prints them using the printer 134 of the apparatus 100. The WWW, E-mail, file transmission, and the facsimile machine 231 can be employed as means for obtaining the document data.

The task function "TASKS" generates and manages a task for the automatic processing of document data externally received via the facsimile machine 231 or the Internet, and for periodically executing the above printing function.

The information management function "MGMT" manages a job address book, a book mark, and document account information.

The setup function "CONFIG" sets the configuration of the apparatus 100 (the network or the timer).

{ID Input Screen}

Figure 15:
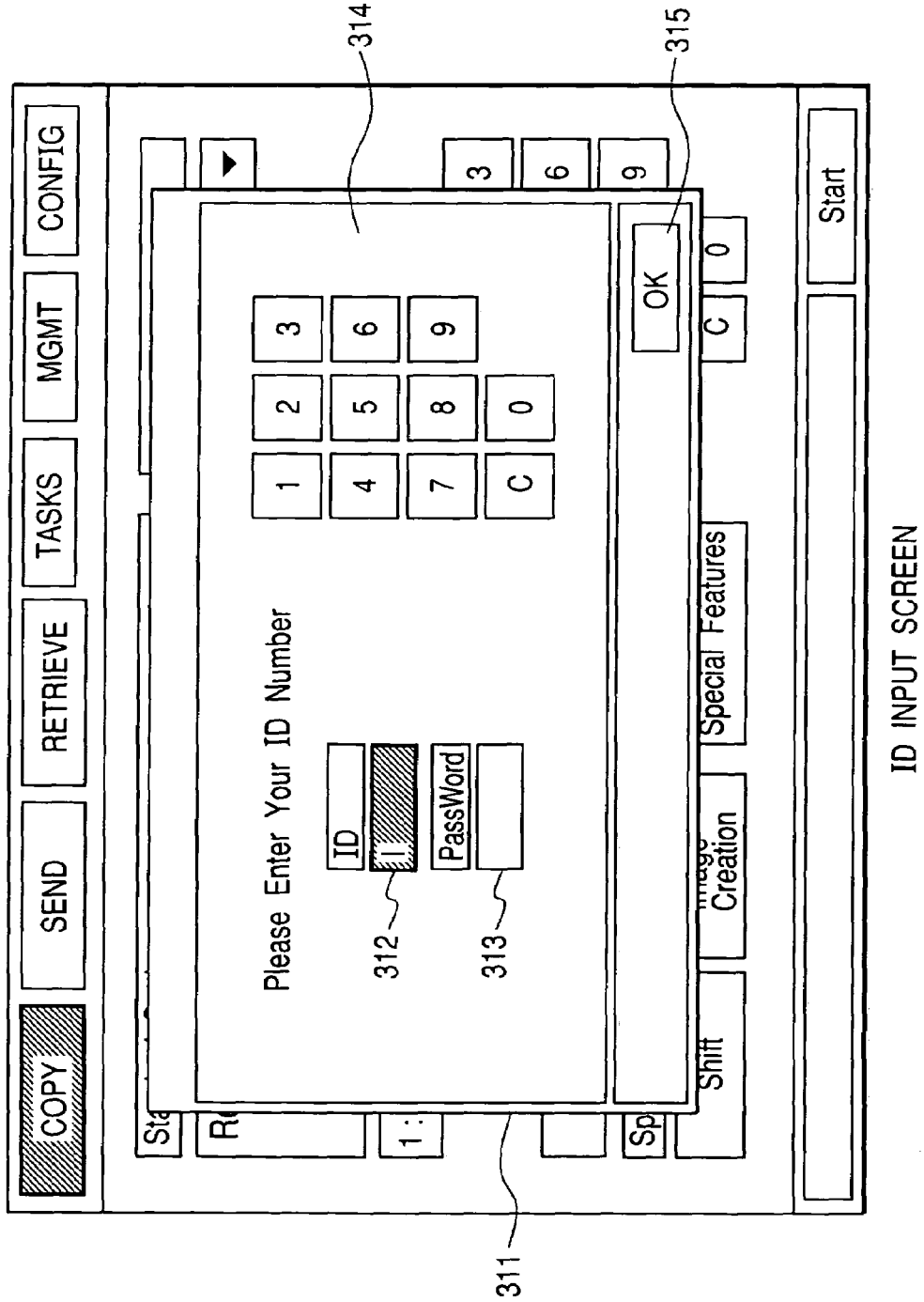
FIG. 15 is a diagram for explaining an ID input screen displayed by the LCD display device.

Immediately after the image processing apparatus 100 is powered on, or when an ID key is depressed, the ID input screen 311 shown in FIG. 15 is displayed.

The ID input screen 311 includes an ID input box 312, a password input box 313, a number key box 314 and an OK button 315.

Figure 14:
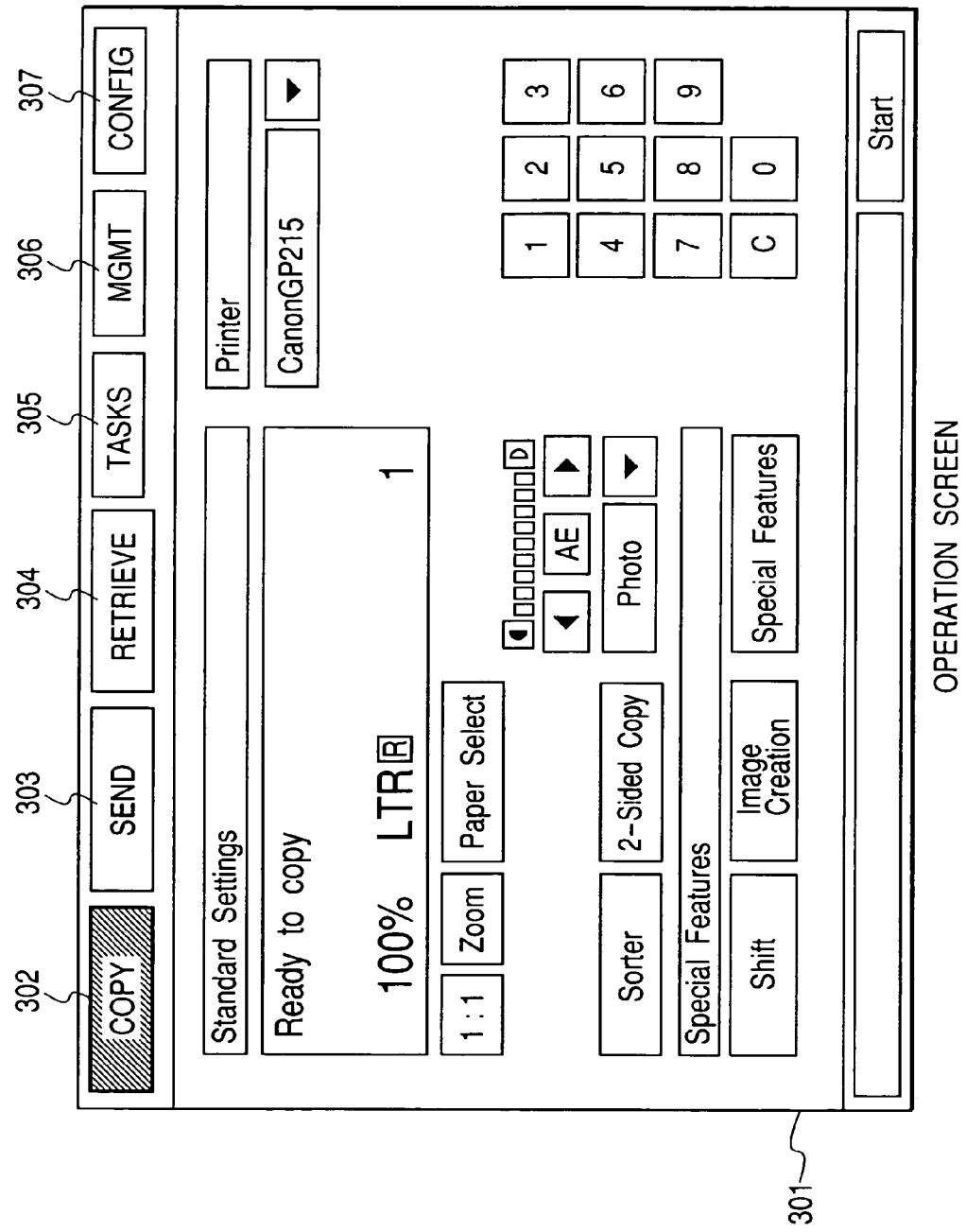
FIG. 14 is a diagram for explaining an operating screen displayed by the LCD display device of the operation unit.

First, a user employs the number keys 314 to enter a correct user ID and a password in the ID input box 312 and the password input box 313, and depresses the OK button 315. Then, the operation screen 301 in FIG. 14 is displayed to enable the manipulation of devices on that screen.

The ID input box 312 and the password input box 313 can be switched by directly designating a desired area to input.

{COPY Screen}

Figure 16:
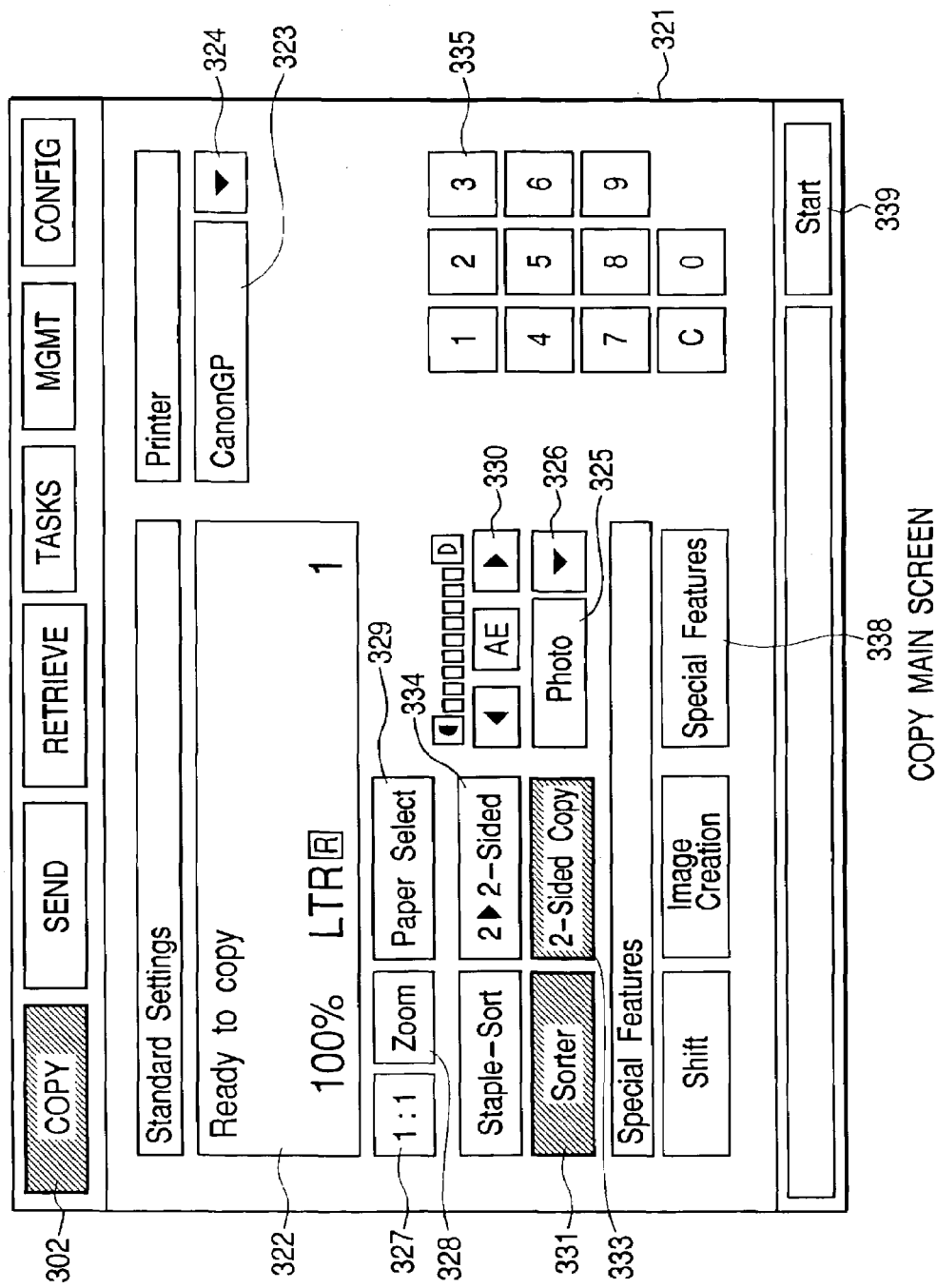
FIG. 16 is a diagram for explaining a COPY main screen displayed by the LCD display device.

FIG. 16 is a diagram showing the COPY main screen 321 that is displayed upon the depression of the main tab "COPY" 302.

The COPY main screen 321 includes a printer select button 324, a printer display box 323, an image quality select button 326, an image quality display box 325, a copy parameter display box 322, scale setting buttons 327 and 328, a paper select button 329, a sorter setting button 331, a double-sided copy setting button 333, a density indicator and a density setting button 330, and a number key box 335.

Figure 17:
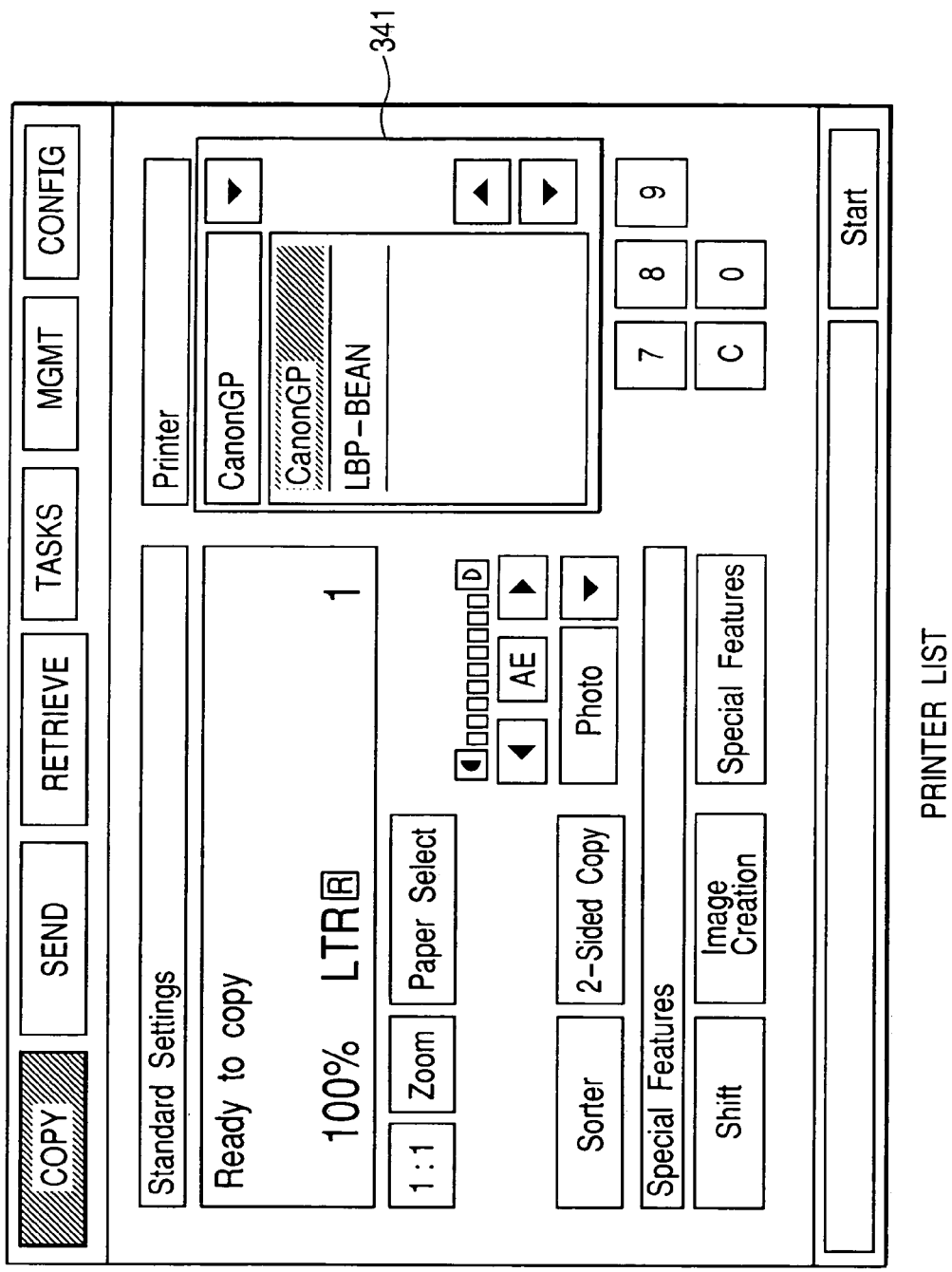
FIG. 17 is a diagram for explaining a printer name list sub-screen of the COPY main screen.

When, for example, the printer select button 324 is selected, as shown in FIG. 17, a list 341 of available printers (the printer 134 of the apparatus 100 and the printer 238 on the network) is displayed as a pull-down menu. When a desired printer is selected from the printer list 341, the printer list 341 disappears, and as shown in FIG. 16, the selected printer name is displayed in the printer display box 323.

Figure 18:
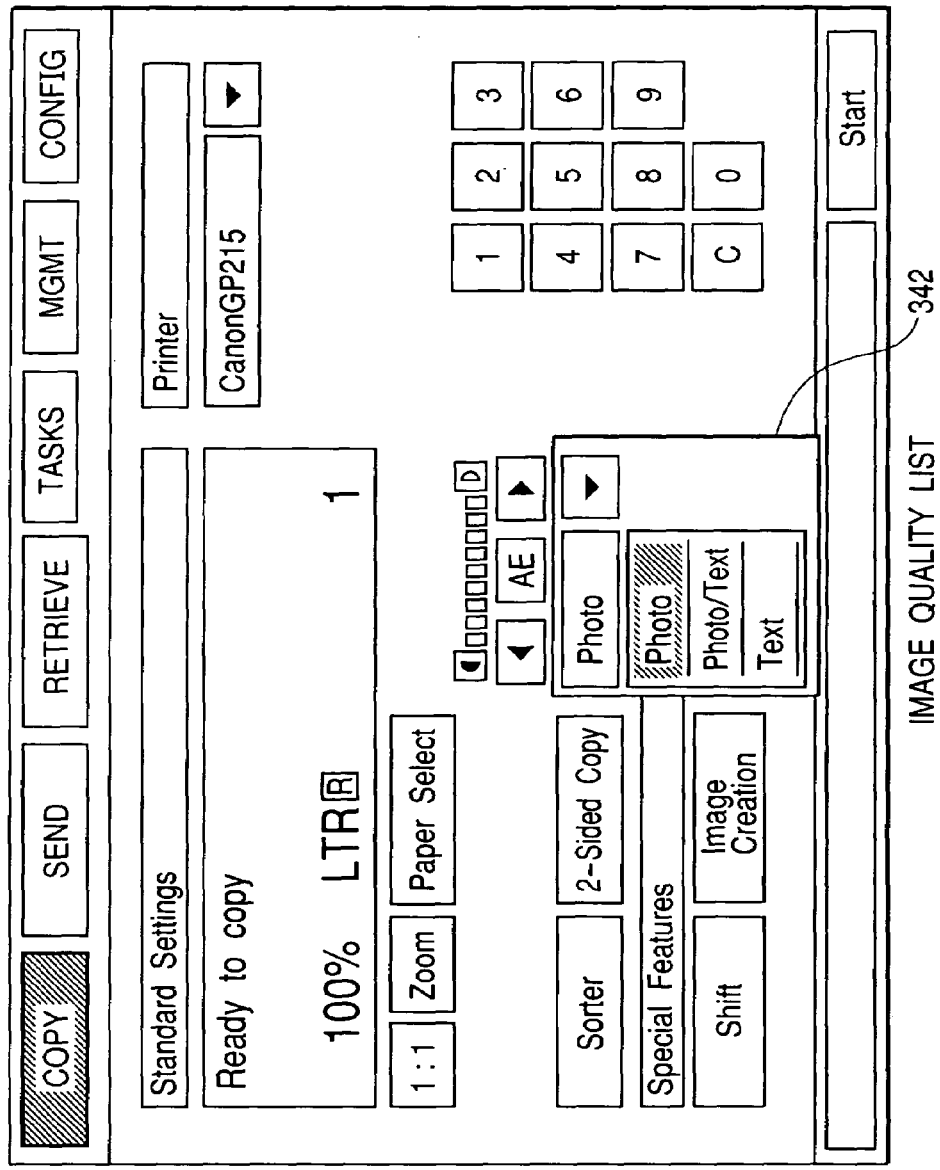
FIG. 18 is a diagram for explaining an image quality list sub-screen of the COPY main screen.

If the image quality setup button 326 is selected, as shown in FIG. 18 an image quality list 342 is displayed as a pull-down menu. When a desired image quality is selected from the image quality list 342, the image quality list 342 disappears, and as shown in FIG. 16, the selected image quality is displayed in the image quality display box 325.

Figure 19:
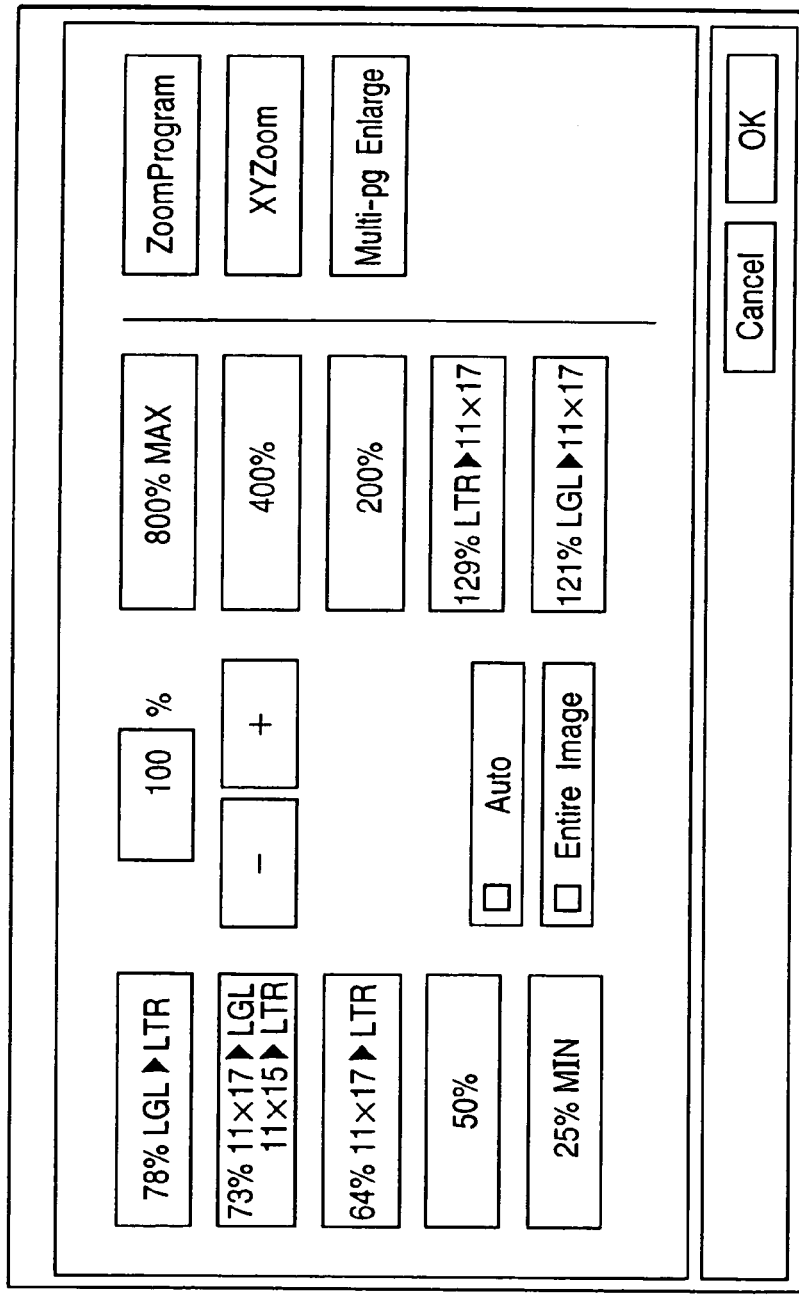
FIG. 19 is a diagram for explaining an enlarge/reduce setting sub-screen of the COPY main screen.
Figure 20:
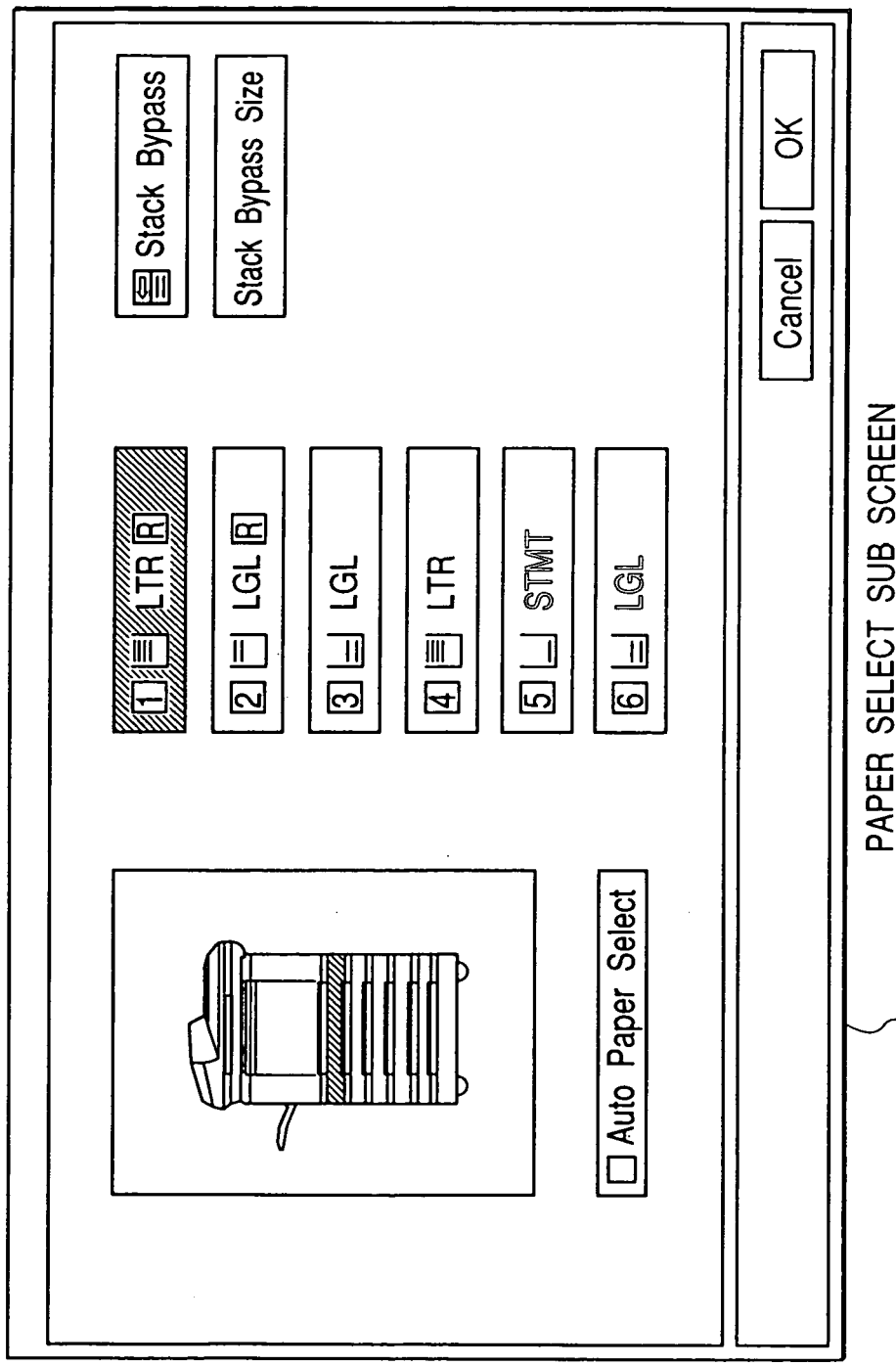
FIG. 20 is a diagram for explaining a paper selection sub-screen of the COPY main screen.
Figure 21:
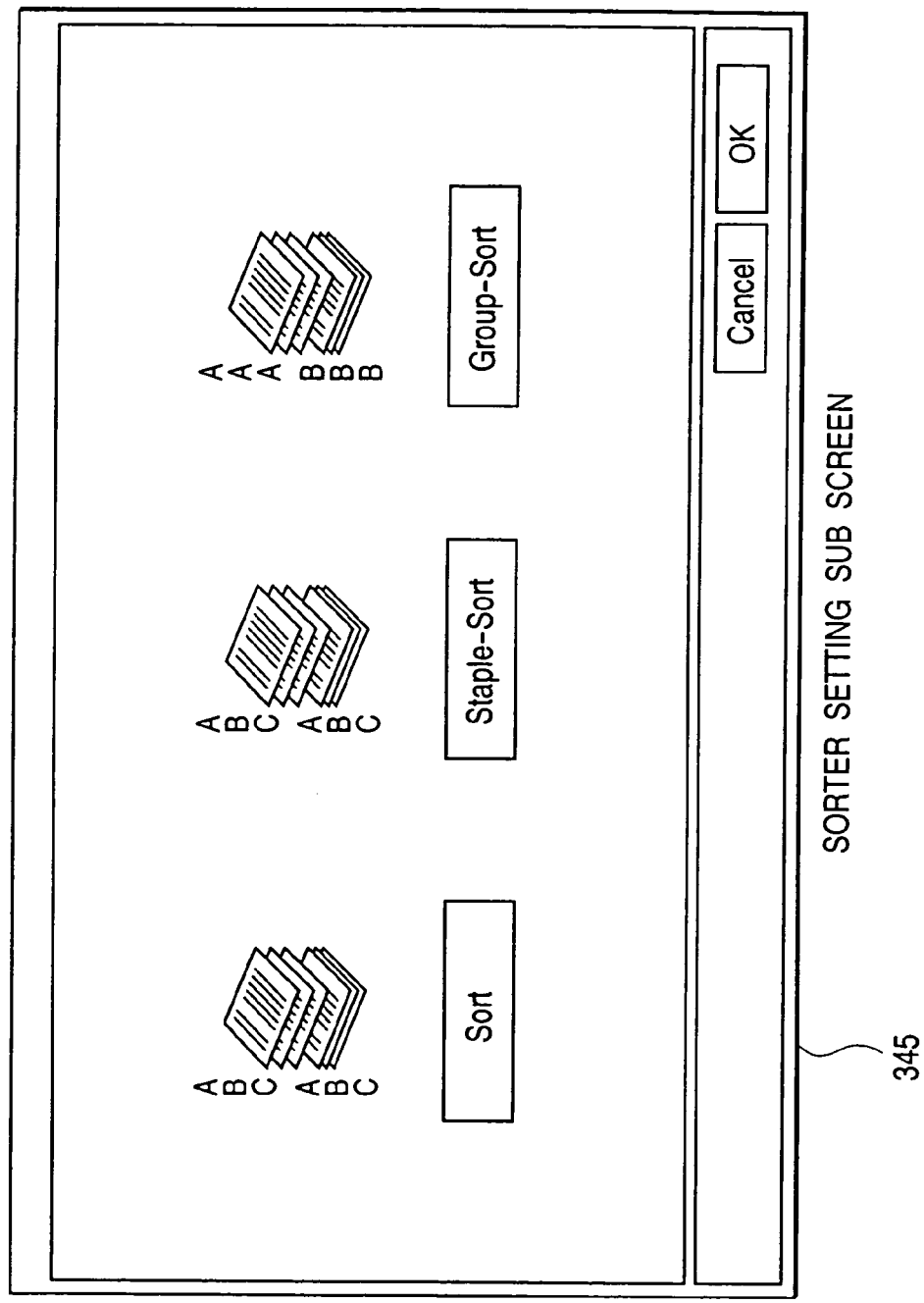
FIG. 21 is a diagram for explaining a sorter setting sub-screen of the COPY main screen.
Figure 22:
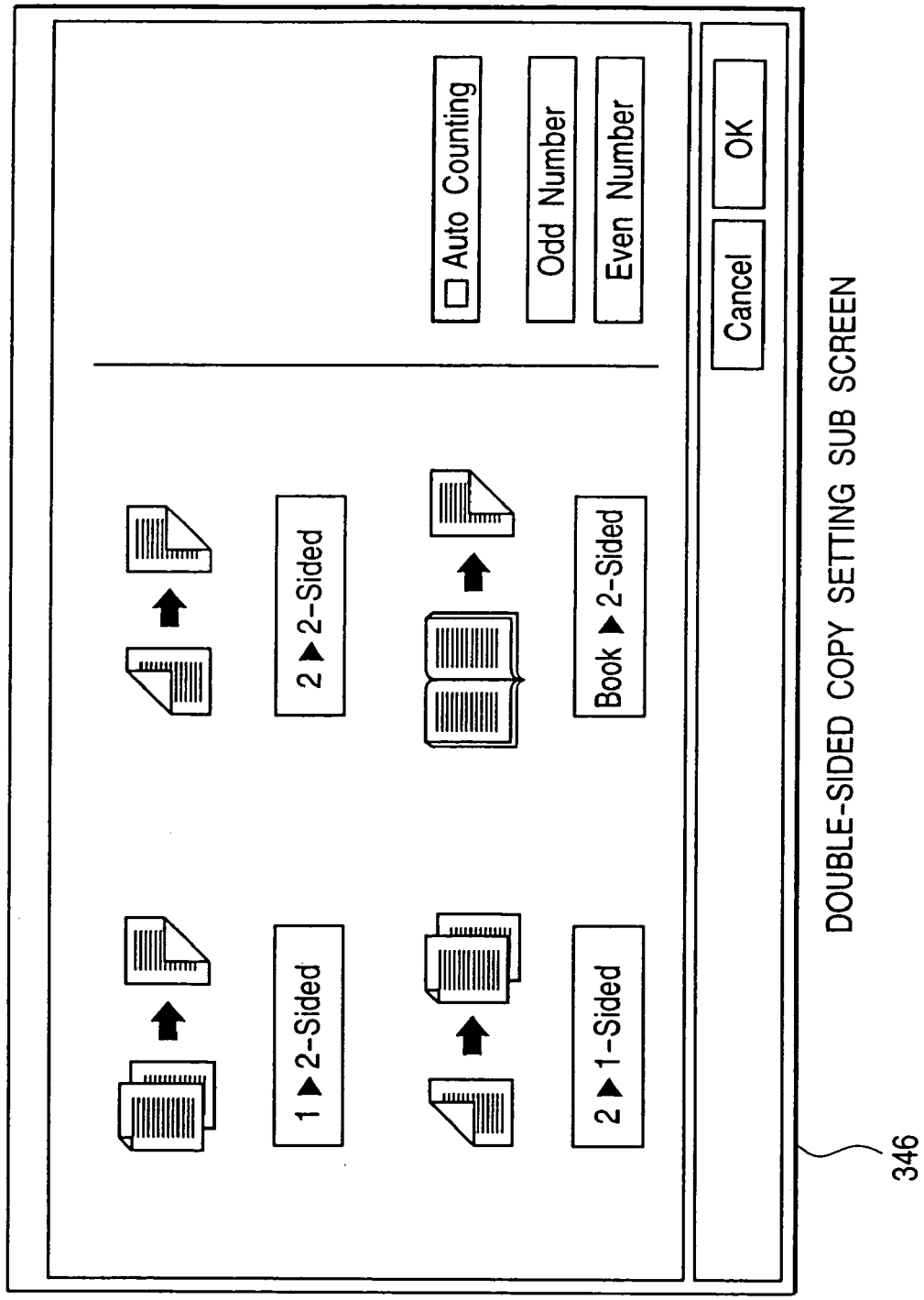
FIG. 22 is a diagram for explaining a double-sided copy setting sub-screen of the COPY main screen.

If the scale setting button 327 or 328, the paper select button 329, the sorter setting button 331 and the double-sided copy setting button 333 are depressed as needed, corresponding sub-screens are displayed. That is, upon the depression of the scale setting button 327 or 328, the enlarge/reduce setting sub-screen 343 in FIG. 19 is displayed; upon the depression of the paper select button 329, the paper select sub-screen 344 in FIG. 20 is displayed; upon the depression of the sorter setting button 331, the sorter setting sub-screen 345 in FIG. 21 is displayed; and upon the depression of the double-sided copy setting button 333, the double-sided copy setting sub-screen 346 in FIG. 22 is displayed. The individual parameters for the corresponding sub-screens can thereafter be set. Furthermore, upon the depression of the density indicator and density setting button 330, the density can be designated.

As is described above, the user sets the various parameters, returns the screen to the COPY main screen 321 in FIG. 16, and depresses a start button 339. Thus, the scanner 133 is activated to read document data, and the document data are transmitted to a selected printer, which prints a copy in accordance with the various designated parameters that are displayed on the COPY main screen 321 in FIG. 16.

{SEND Screen}

Figure 23:
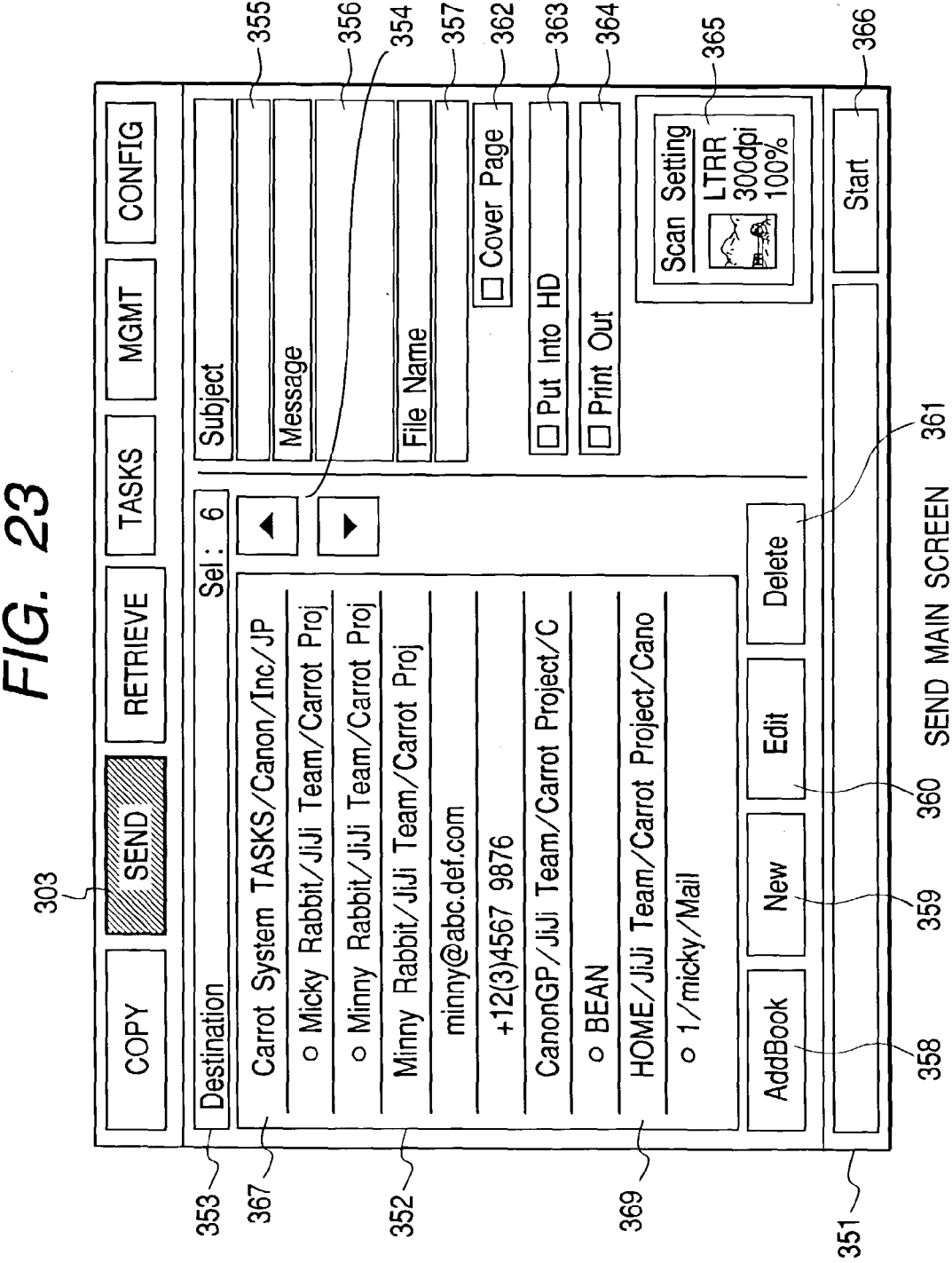
FIG. 23 is a diagram for explaining a SEND main screen displayed by the LCD display device.

FIG. 23 is a diagram showing the SEND main screen 351 that is displayed upon the depression of the main tab "SEND" 303.

The SEND main screen 351 includes an address display box 352, a detailed address count display box 353, an address scroll button 354, an address book button (AddBook) 358, a new button (New) 359, an edit button (Edit) 360, a delete button (Delete) 361, a subject input box (Subject) 355, a message input box (Message) 356, a file name input box (File Name) 357, a cover page check button (Cover Page) 362, an HD check button (Put Into HD) 363, a print out check button (Print Out) 364, and a scanner check button (Scan Setting) 365.

Figure 24:
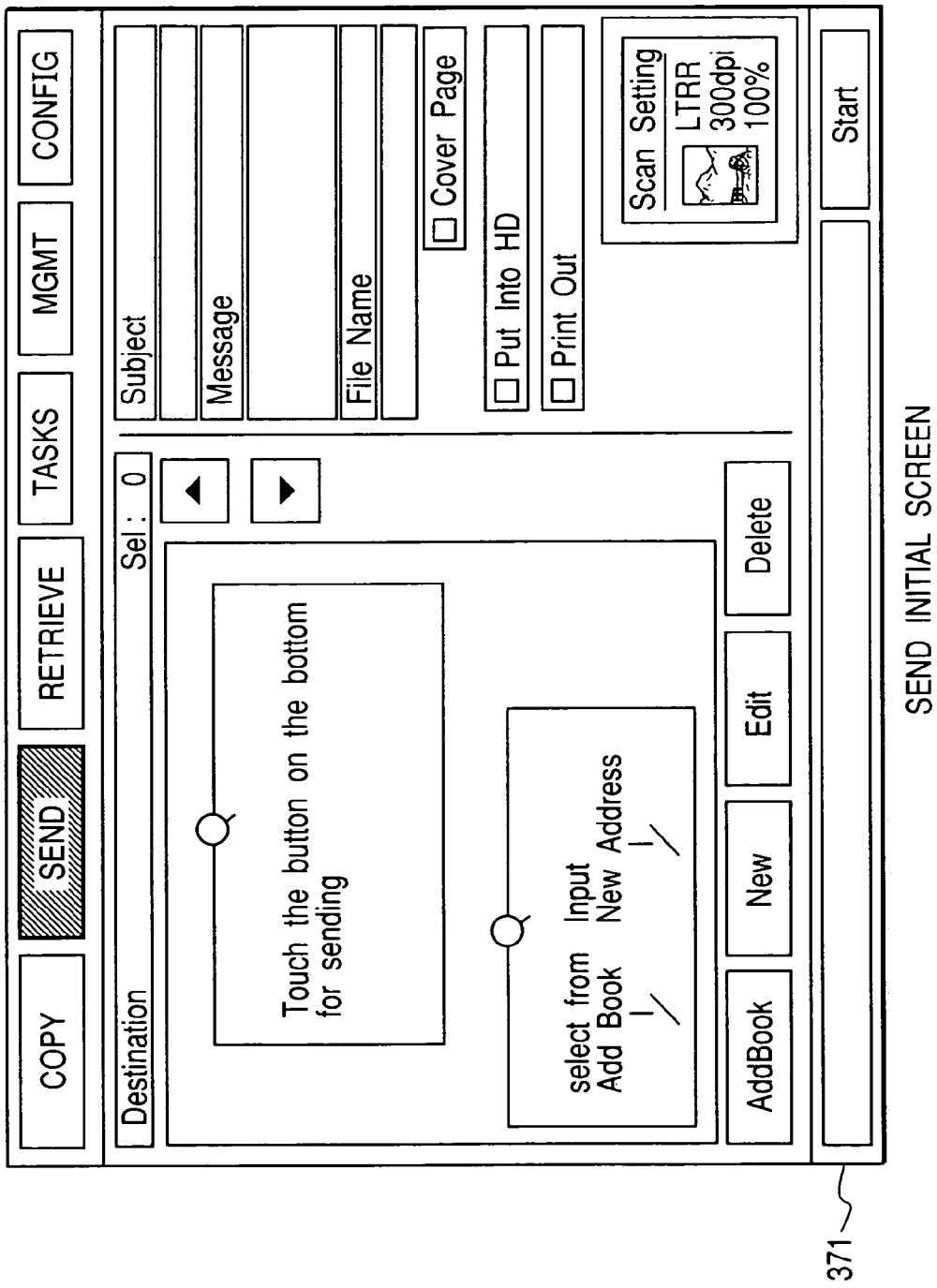
FIG. 24 is a diagram for explaining a SEND initial screen displayed by the LCD display device.

At the time of initialization, including resetting, the SEND initial screen 371 in FIG. 24 is displayed. On the SEND initial screen 371, operating instructions are displayed but no address is shown in the address display box 352.

When the address book button 358 is depressed, as shown in FIG. 23 a list of input addresses is displayed in the address display box 352, a process which will be described in detail later. When the new button 359 is depressed, a new address can be added, another process which will also be described in detail later. The new address is displayed at the end of the list.

The number of addresses that are currently entered is displayed in the detailed address count display box 353.

To delete a specific address from the list of currently entered addresses, the address must be selected in the address display box 352, and the delete button 361 depressed. The selected address then is deleted.

Figure 25:
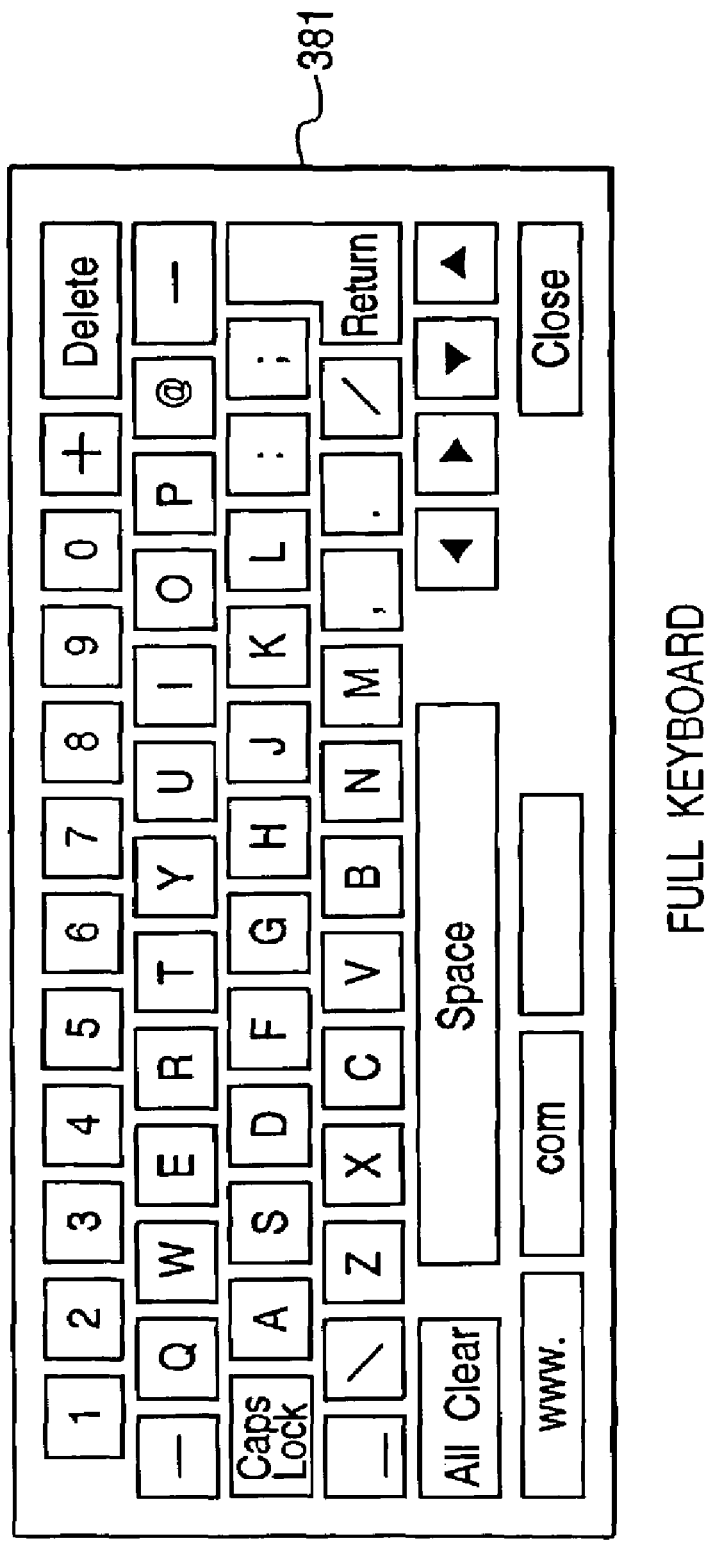
FIG. 25 is a diagram for explaining a full keyboard on each screen displayed by the LCD display device.

For the subject input box 355, the message input box 356 and the file name input box 357, the full keyboard 381 shown in FIG. 25 is displayed upon the selection of one of these boxes to enable the input of a corresponding entry.

As is described above, the user selects the address, inputs a message for the address, and designates the transmission method that is to be used. Then, the user depresses the start button 366 on the SEND main screen 351 in FIG. 23, so that the scanner 133 is activated and reads the document data. The designated transmission method then transmits the document data to the selected address.

{Address Book Sub-Screen}

Figure 26:
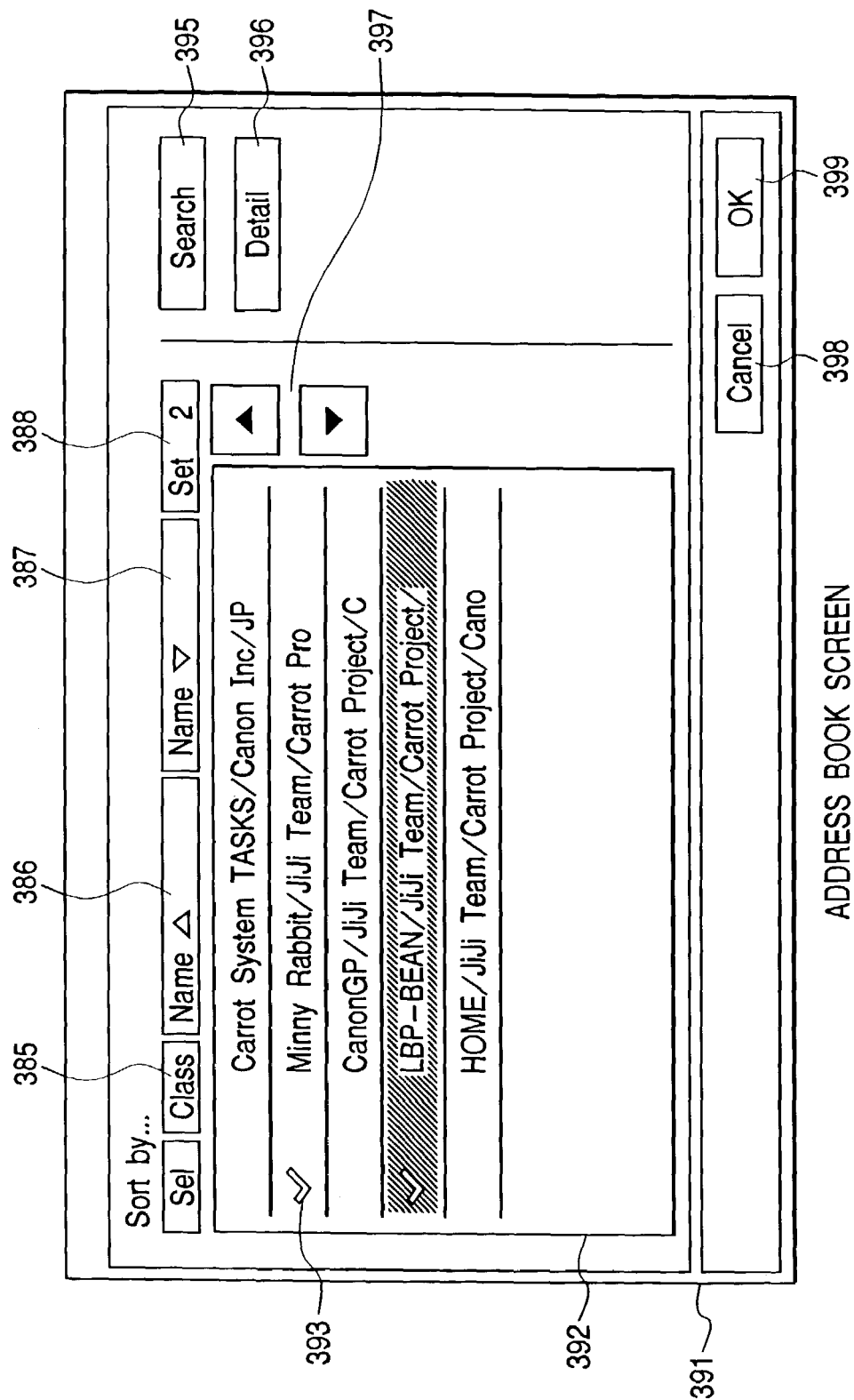
FIG. 26 is a diagram for explaining an address book screen of the SEND main screen.

When the address book button 358 is depressed on the SEND main screen 351 in FIG. 23, the address book sub-screen 391 in FIG. 26 is displayed.

By depressing an OK button 399, an address having a select check mark 393 in an address book display box 392 on the address book sub-screen 391 is added to the address display box 352 of the SEND main screen 351.

Upon the depression of one of the sorting set buttons 385 to 387, the addresses (items) in the address book display box 392 are sorted by class, alphabetically by name in the ascending order, or alphabetically by name in the descending order.

Figure 27:
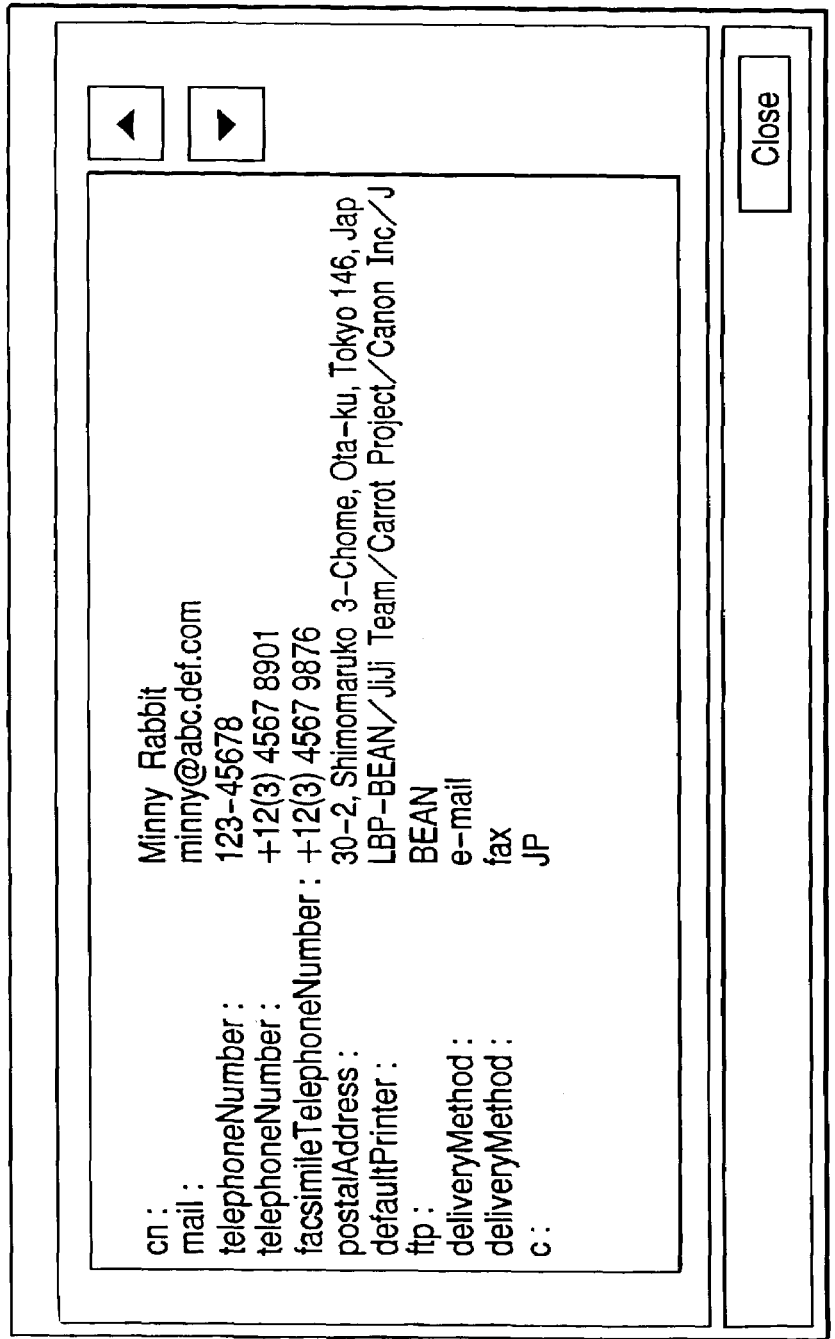
FIG. 27 is a diagram for explaining a detailed information screen on the address book screen.

If a detailed information button (Detail) 396 is depressed while one of the items in the address book display box 392 is selected, the detailed information screen 401 in FIG. 27 is displayed.

On the detailed information screen 401, all the information obtained from the address book 252 is displayed for the selected item.

To close the address book sub-screen 391, the OK button 399 or a cancel button 398 must be depressed. Thereafter, the address book sub-screen 391 will be closed and the SEND main screen 351 displayed.

{Search Sub-Screen}

Figure 28:
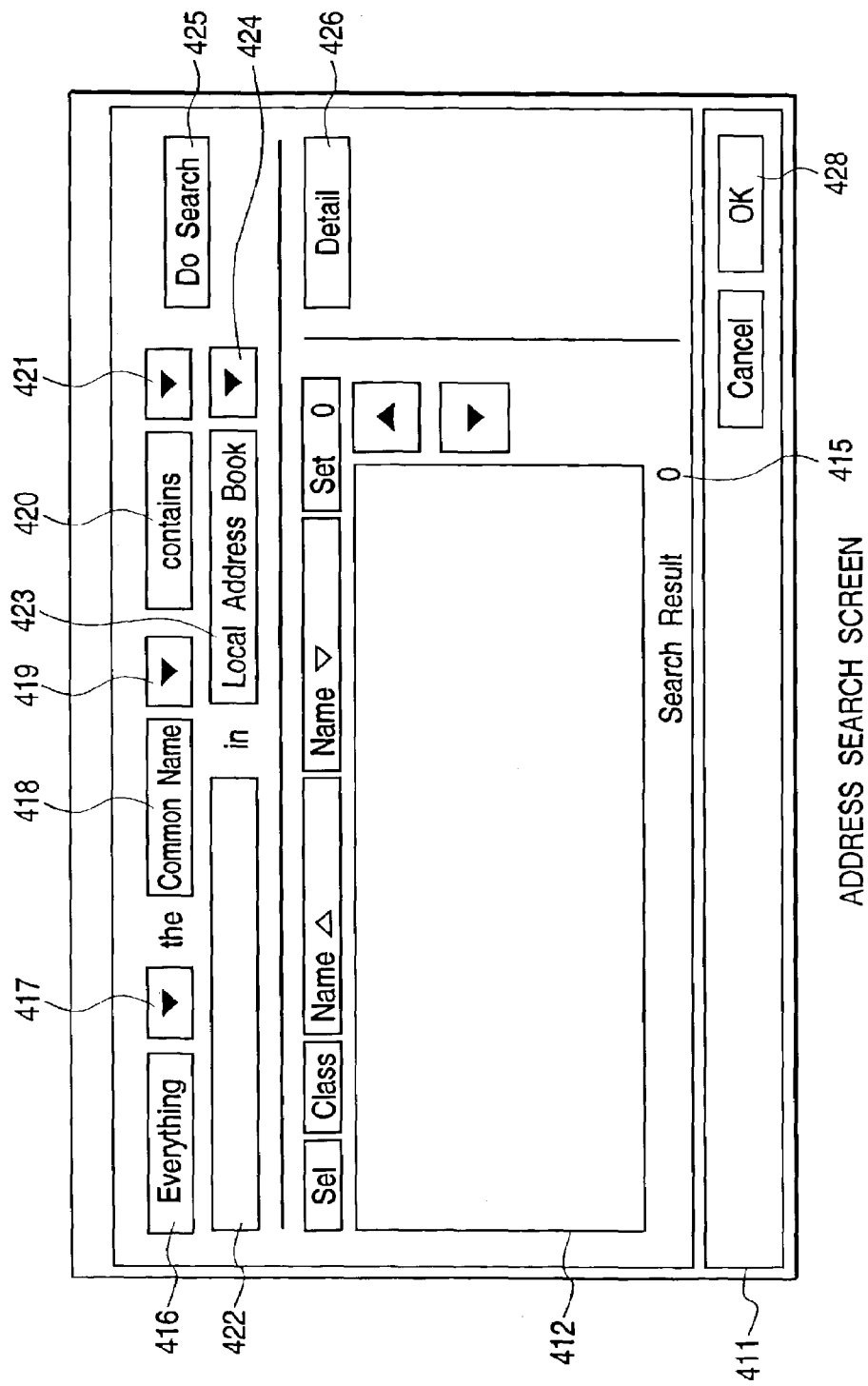
FIG. 28 is a diagram for explaining an address search screen on the address book screen.

When a search button (Search) 395 is depressed on the address book sub-screen 391 in FIG. 26, the search sub-screen (address search screen) 411 in FIG. 28 is displayed.

The search sub-screen 411 is used to perform a search of the address book 252 (a local address book) and an external address server to obtain an address. The upper portion on the screen is a search condition setting portion.

Figure 29:
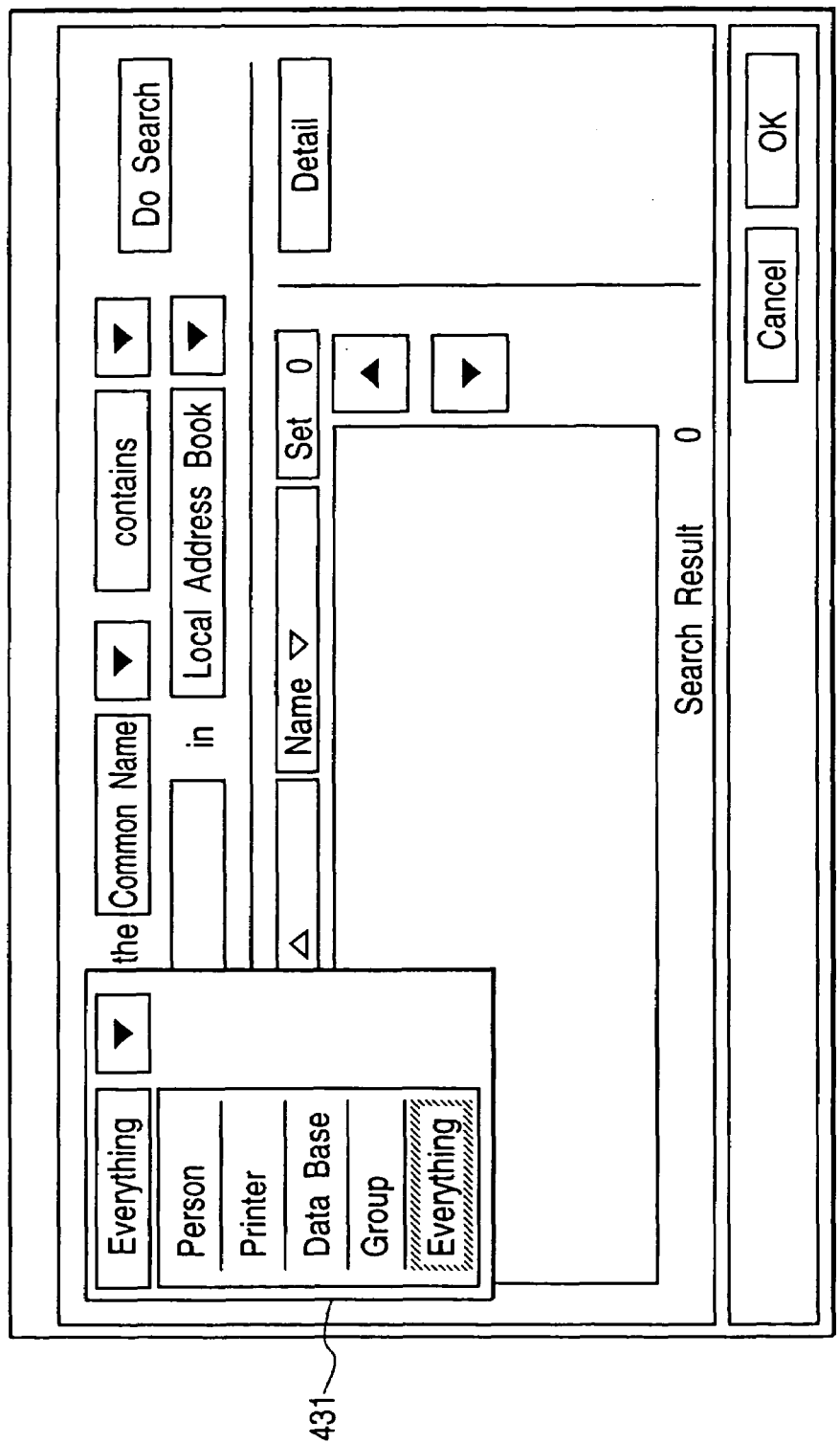
FIG. 29 is a diagram for explaining a search object class list on the address book screen.

When a search object class set button 417 is depressed, the search object class list 431 in FIG. 29 is displayed. After a desired search object class has been selected from the list 431, it is displayed in a search object class display box 416.

Figure 30:
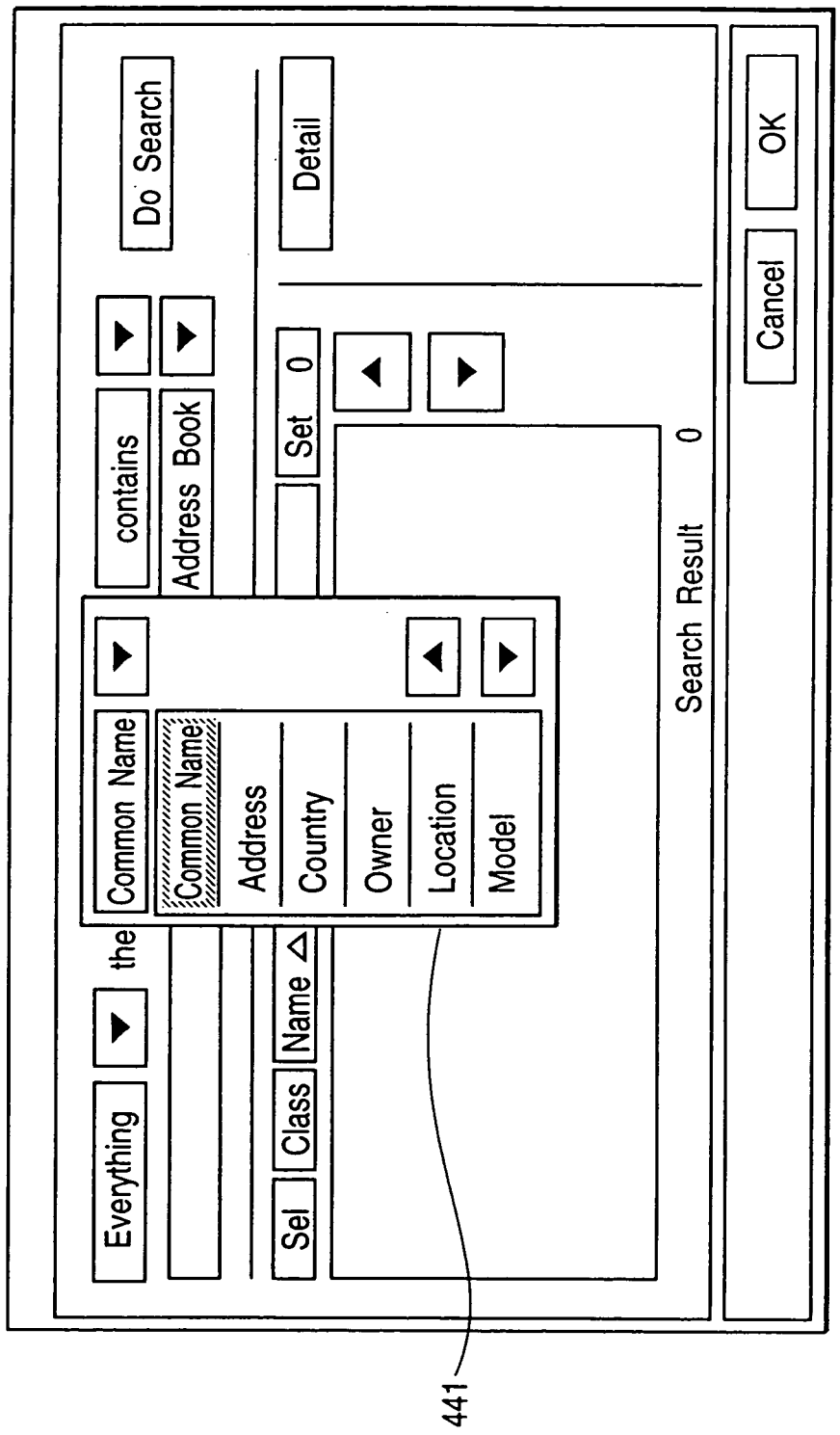
FIG. 30 is a diagram for explaining a search object attribute list on the address book screen.

Upon the depression of a search object attribute setting button 419, the search object class attribute list 441 in FIG. 30 is displayed. The attributes included in the list 441 are changed as follows in accordance with the search object class displayed in the search object class display box 416.

Common Name•Address•Country (Class: Person)

Common Name•Owner•Location•Model•Type•Resolution•Color•Finisher (Class: Printer)

Common Name•Member (Class: Group)

All the attributes (Class: Everything)

Figure 31:
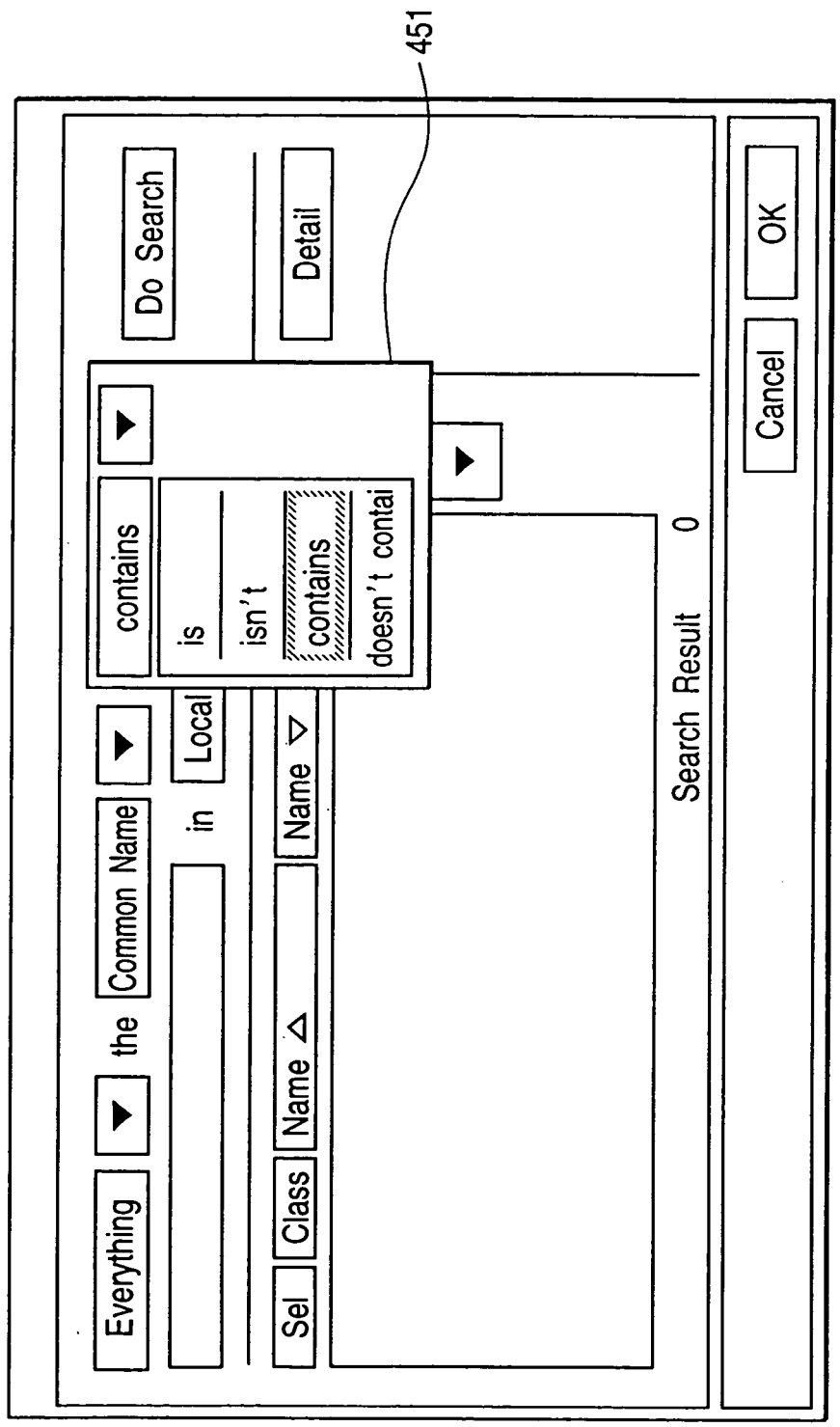
FIG. 31 is a diagram for explaining a search object condition list on the address book screen.

When a search object condition set button 421 is depressed, the search object condition list 451 in FIG. 31 is displayed. After a desired condition has been selected from the list 451, it is displayed in the search object condition display box 420.

Figure 32:
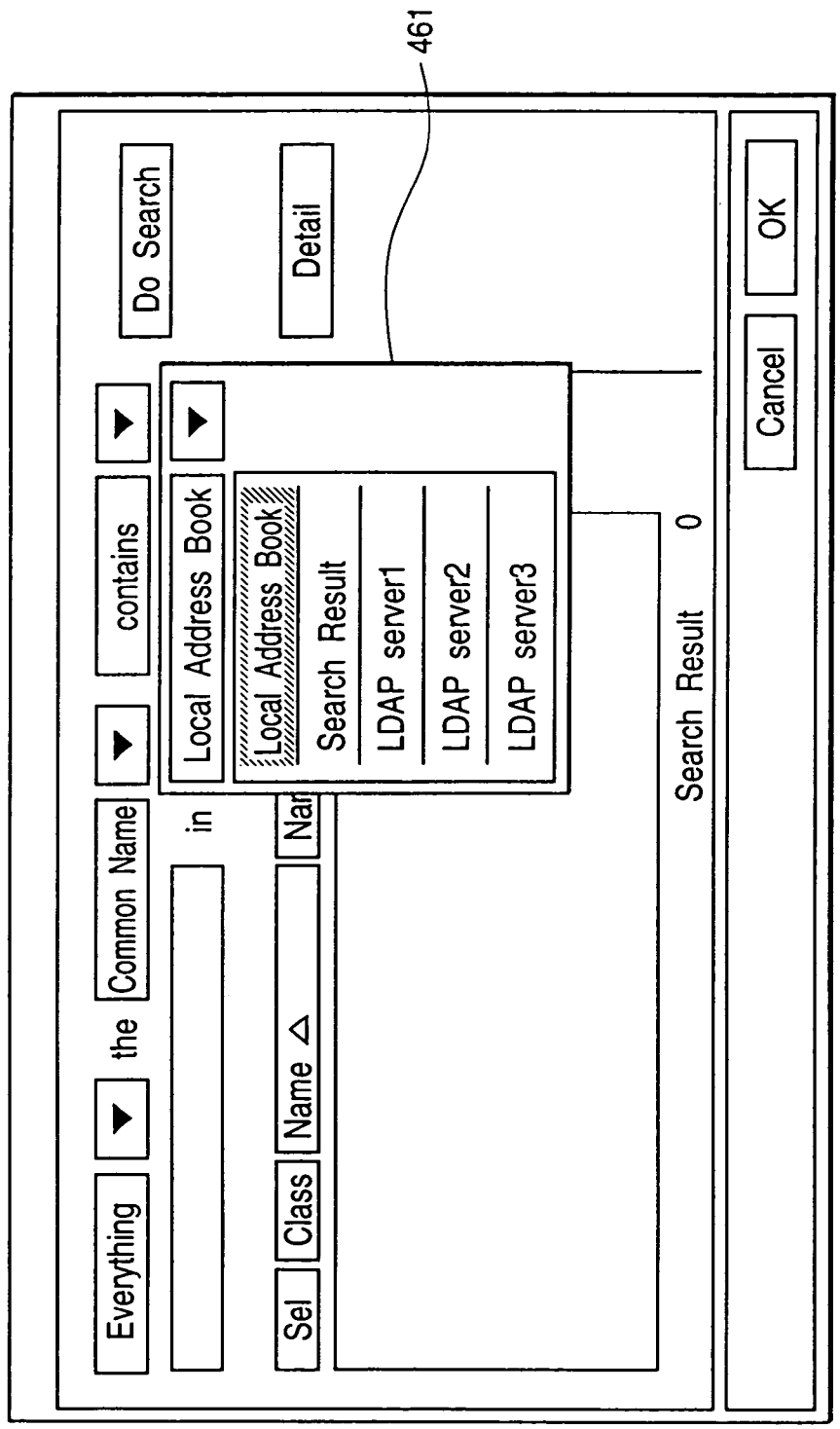
FIG. 32 is a diagram for explaining a search object address book list on the address book screen.

Upon the depression of a search object address book set button 424, the search object address book list 461 in FIG. 32 is displayed. After a desired address book has been selected from the list 461, it is displayed in the search object address book display box 423.

Therefore, the currently selected search conditions are displayed in the search object class display box 416, the search object attribute display box 418, the search object condition display box 420, and the search object address book display box 423.

When a search object attribute value input box 422 is selected, the full keyboard 381 in FIG. 25 is displayed for the entry of a value.

Upon the depression of a search execution button (Do Search) 425, a search is initiated in accordance with the various search conditions that have been selected. The search results are displayed in a search result display box 412 on the screen 471 in FIG. 33, and the number of search result entries is displayed in a search result count display box 415.

Figure 33:
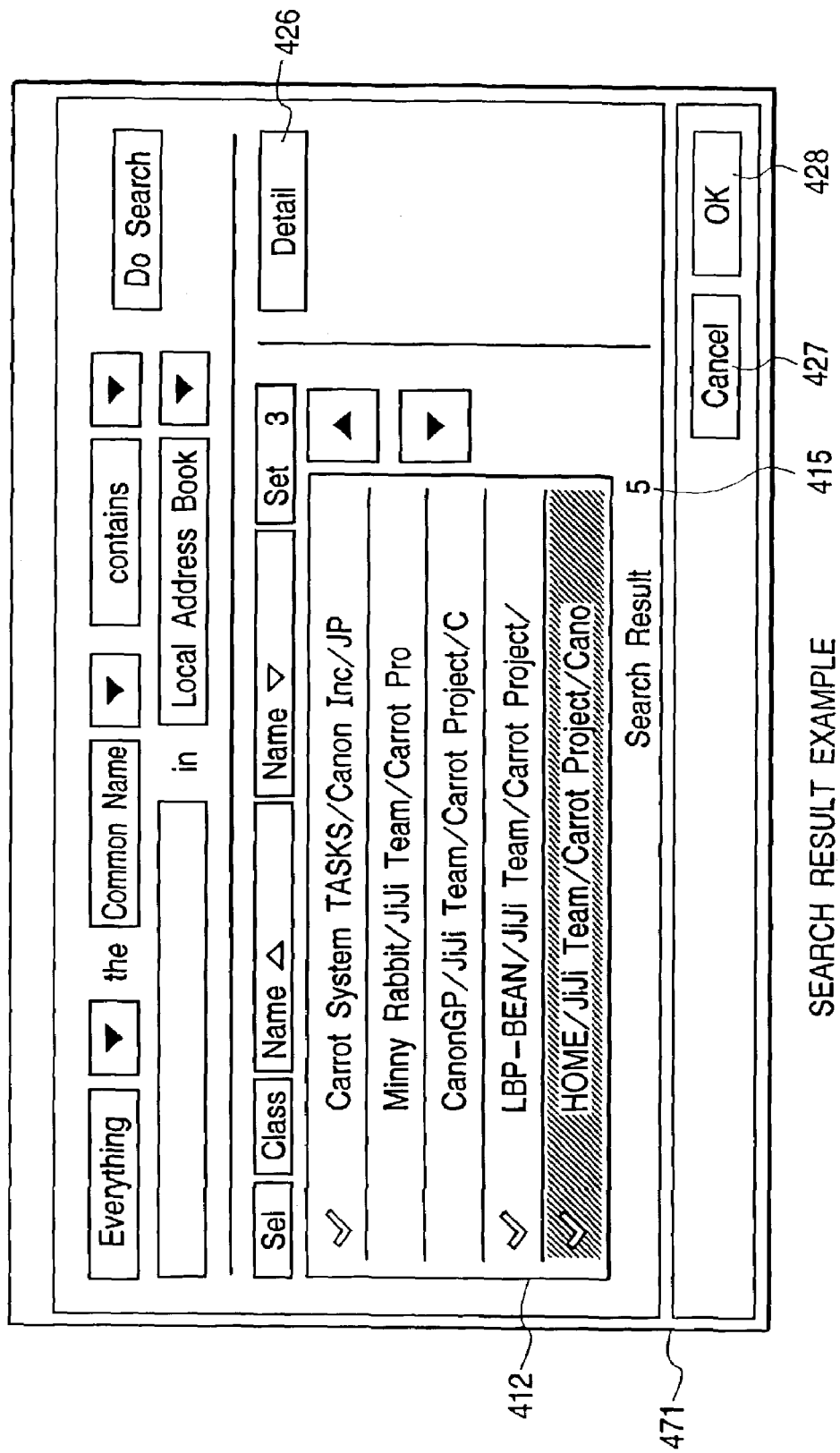
FIG. 33 is a diagram for explaining search results displayed on the address search screen.

When one of the search result items in the search result display box 412 is selected and the detailed information button (Detail) 426 is depressed, the detailed information sub-screen 401 in FIG. 27 is displayed for the selected item. If a specific search result item that is displayed is to be added as an address, as shown in FIG. 33, a select check mark is added to the desired item and an OK button 428 is depressed. Then, the search sub-screen 471 (411) is closed, the SEND main screen 351 in FIG. 23 again appears, and the item with the select check mark is added as an address. However, if a cancel button 427 is depressed, the search sub-screen 471 (411) is closed and the SEND main screen 351 in FIG. 23 again appears, but the address list is not changed.

{Detailed Address Sub-Screen}

Figure 34:
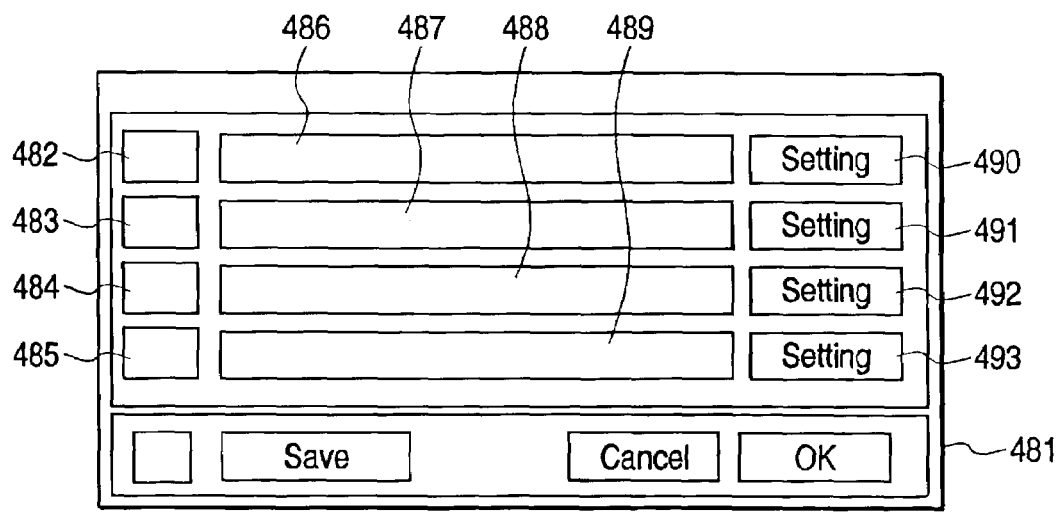
FIG. 34 is a diagram for explaining a detailed address (New) screen on the SEND main screen.

When the New button 359 is depressed on the SEND main screen 351 in FIG. 23, the detailed address screen (New) 481 in FIG. 34 is displayed.

The detailed address screen (New) 481 can be used to enter a new address.

On the detailed address screen (New) 481, first, a transmission method select button 482 to 485 that corresponds to a transmission method (E-mail, facsimile, printer or ETP) is depressed to select a transmission method for a new address. Then, one of the detailed address input boxes 486 to 489 that corresponds to the transmission method select button 482 to 485 is selected. The number-key pad 501 in FIG. 35 or the full keyboard in FIG. 25 is thereafter displayed for the entry of address details.

When a detailed address input box 487 (corresponding to facsimile) is selected, the number-key pad 501 is displayed. But when one of the other detailed bvbaddress input boxes 486, 488 and 489 is depressed, the full keyboard 381 is displayed.

The buttons 490 to 493 that correspond to the transmission method select buttons 482 to 485 are used for transmission options for the individual transmission methods.

Figure 36:
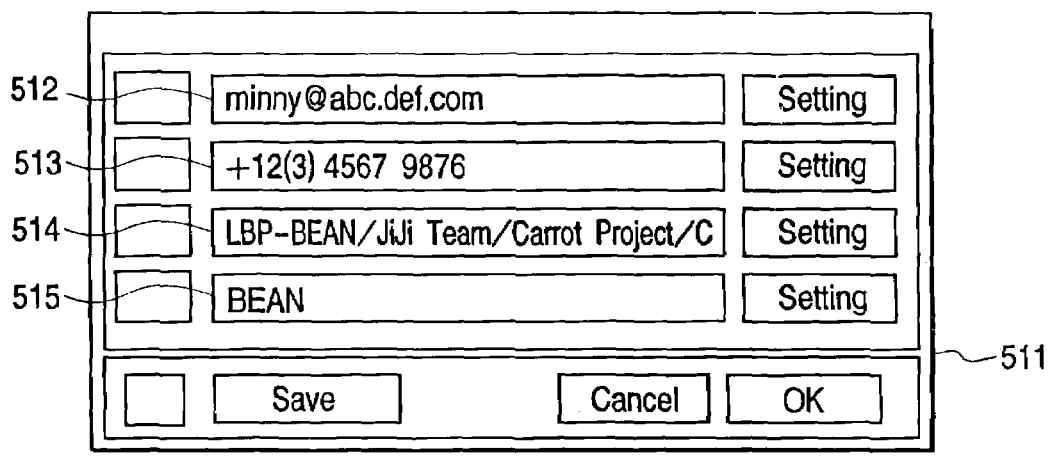
FIG. 36 is a diagram for explaining a detailed address (Person) on the SEND main screen.

When the address class "Person" is selected on the SEND main screen 351 in FIG. 23 and the edit button 360 is depressed, the detailed address (Person) class screen 511 in FIG. 36 is displayed.

The details of the selected address are displayed in one of display boxes 512 to 515 that corresponds to the detailed address input box 486 to 489 (see FIG. 34) on the detailed address (Person) class screen 511. The address can be edited using the number-key pad 501 in FIG. 35, or the full keyboard 381 in FIG. 25 in the same manner as it was used to make the entries in the detailed address input boxes 486 to 489.

Figure 37:
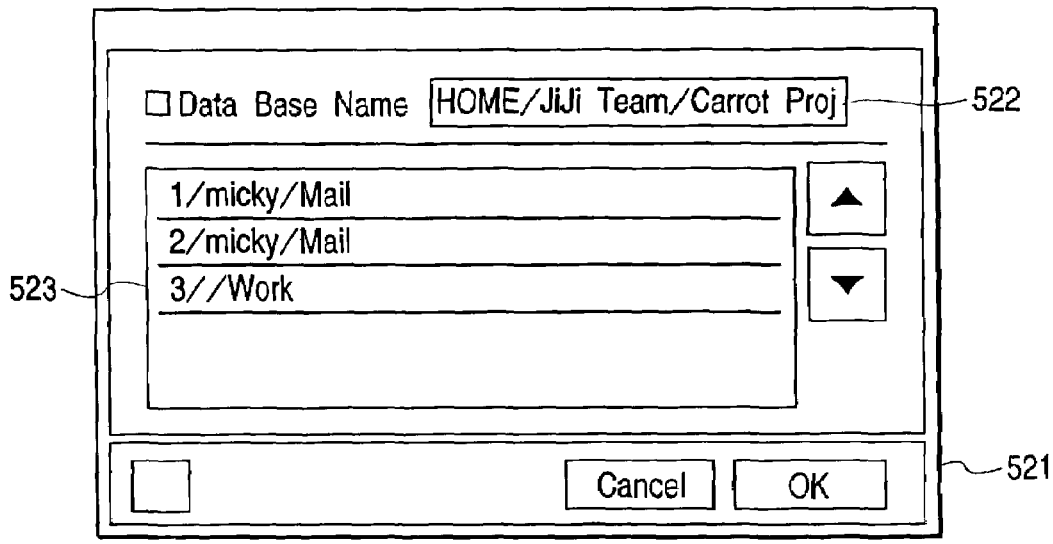
FIG. 37 is a diagram for explaining a detailed address (Database) on the SEND main screen.

When the "DataBase" address class 369 is selected on the SEND main screen 351 in FIG. 23, and the edit button 360 is depressed, the detailed address (DataBase) class screen 521 in FIG. 37 is displayed.

On the detailed address (DataBase) class screen 521, the database name is displayed in a box 522, and a folder list is displayed in a box 523.

Figure 38:
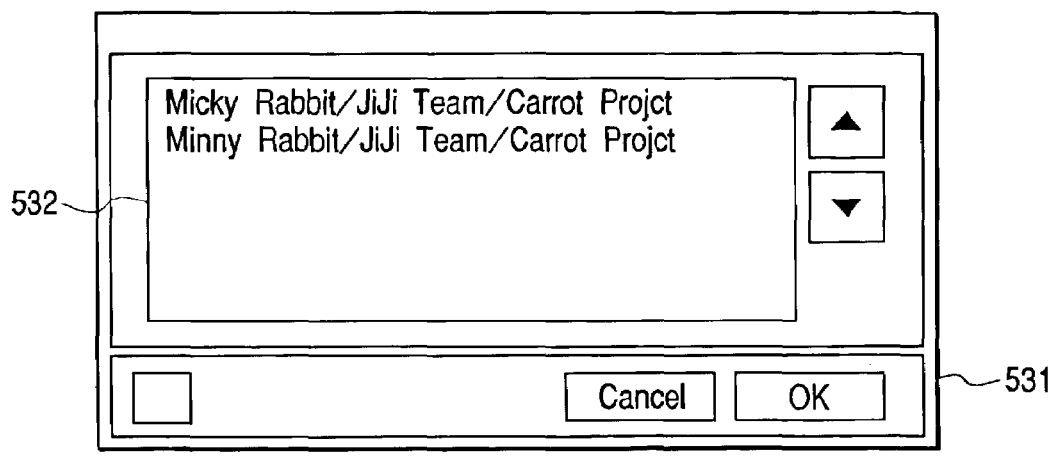
FIG. 38 is a diagram for explaining a detailed address (Group) on the SEND main screen.

When the "Group" class address 367 is selected on the SEND main screen 351 in FIG. 23 and the edit button 360 is depressed, the detailed address (Group) class screen 531 in FIG. 38 is displayed.

On the detailed address (Group) class screen 531, group members are displayed in a box 532.

{HD Setting Sub-Screen}

Figure 39:
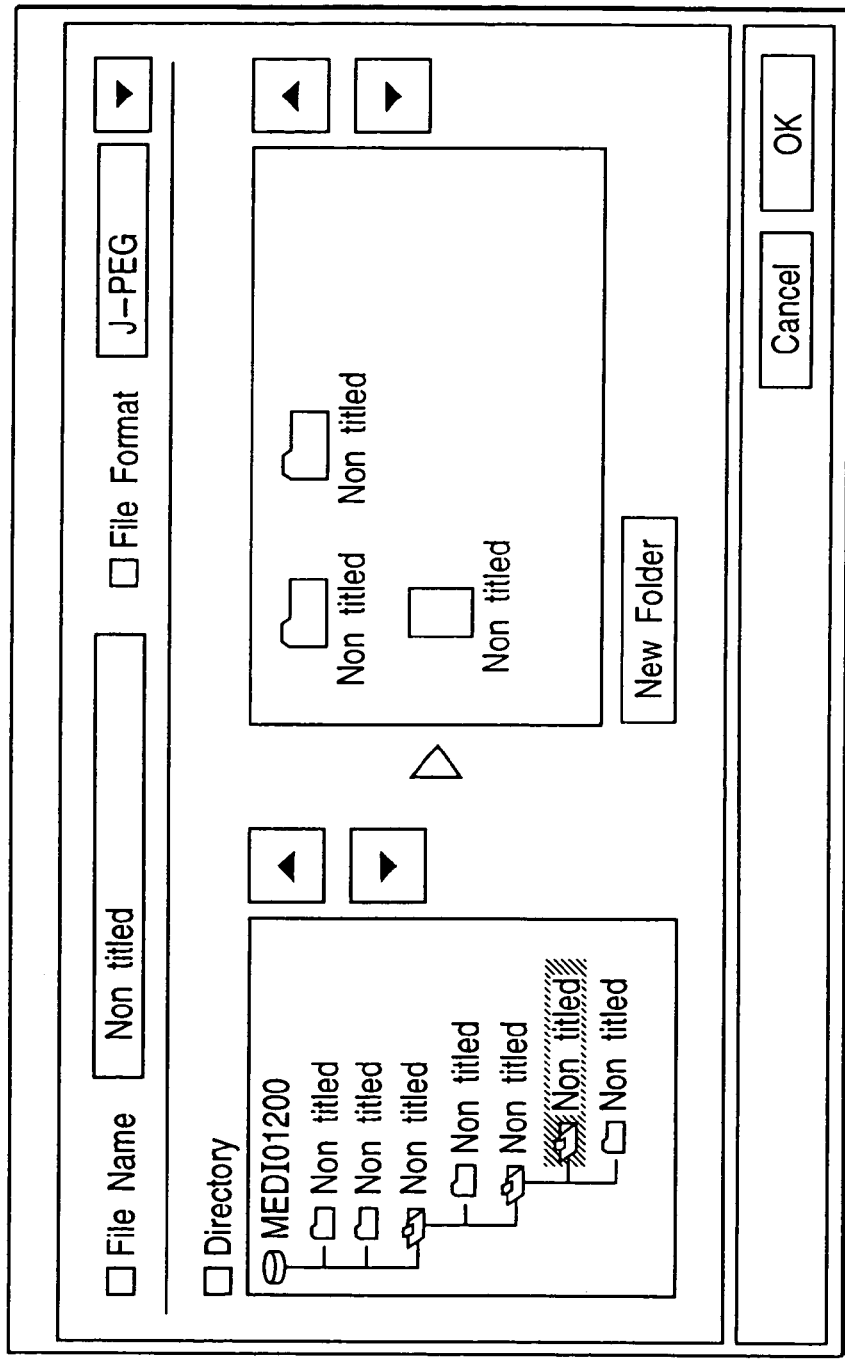
FIG. 39 is a diagram for explaining a hard disk setting screen on the SEND main screen.

Upon the depression of the HD check button 363 on the SEND main screen 351 in FIG. 23, the hard disk setting screen 541 in FIG. 39 is displayed.

This hard disk setting screen 541 can be used to designate the setup to be used for transmitting data to the hard disk.

{Print Out Sub-Screen}

Figure 40:
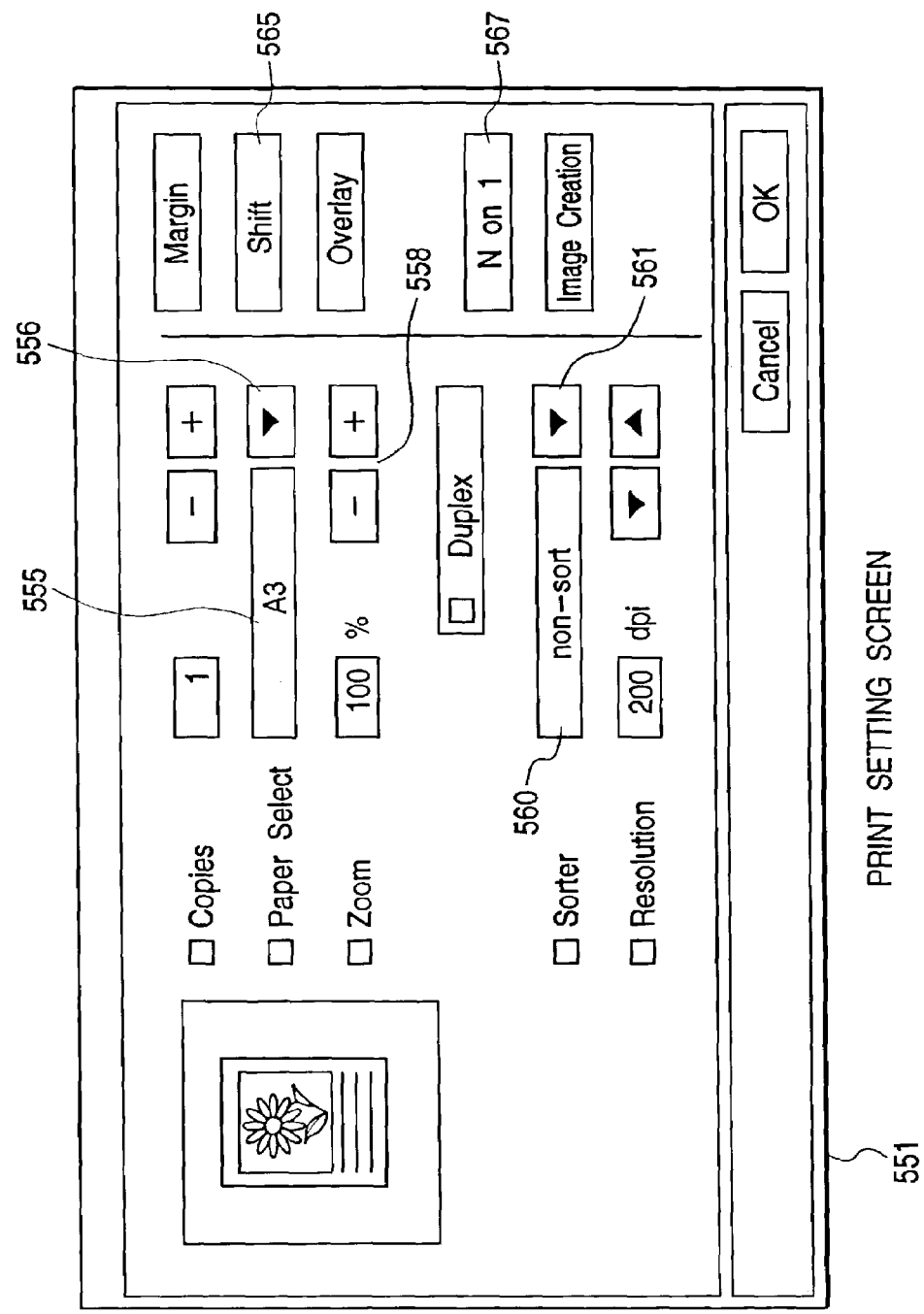
FIG. 40 is a diagram for explaining a print setting screen on the SEND main screen.

When the print out check button 364 is depressed on the SEND main screen 351 in FIG. 23, the print set screen 551 in FIG. 40 is displayed.

The number of copies, the paper size, the scale ratio, double-sided printing, the sorting and the resolution can be designated using the print setting screen 551.

Figure 41:
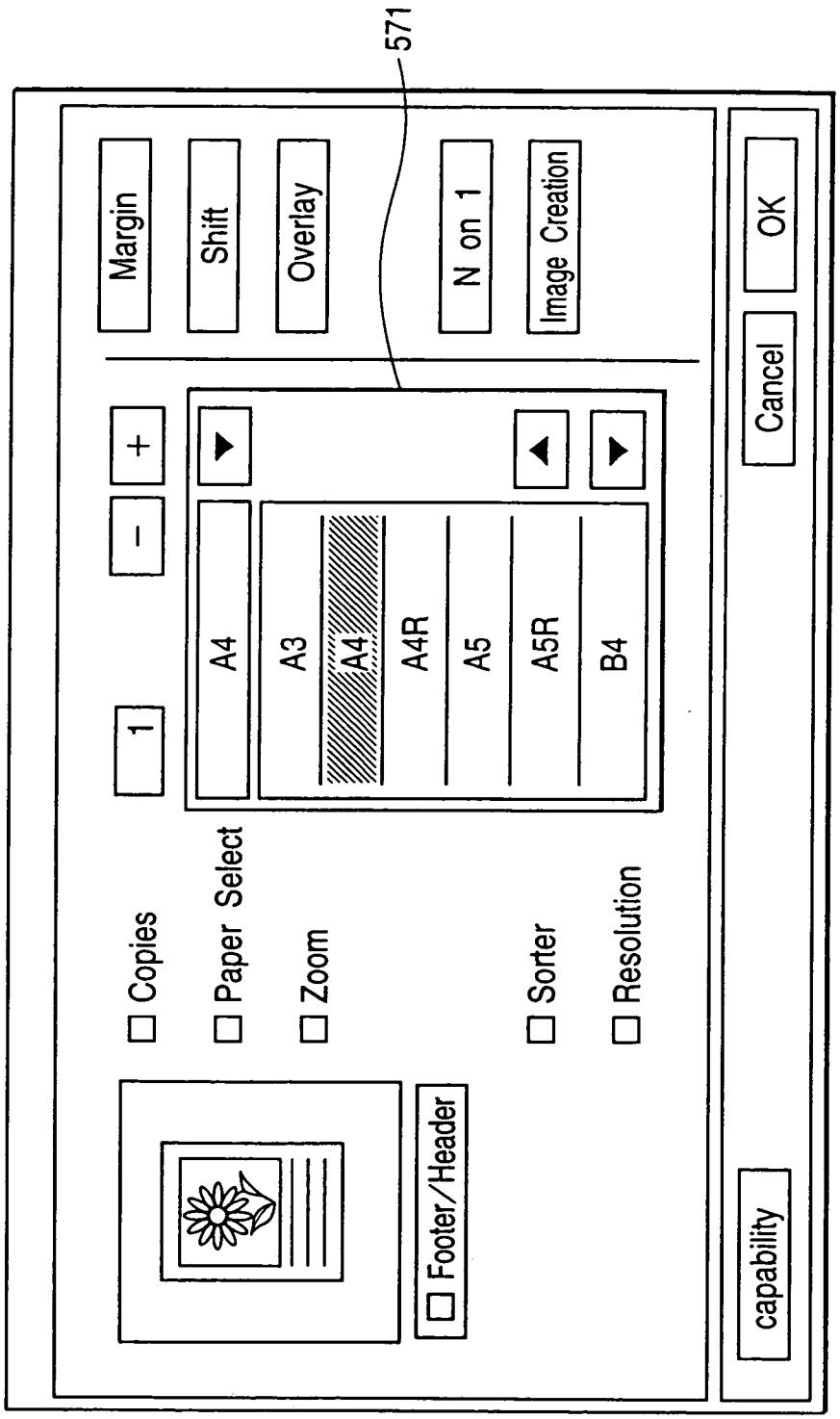
FIG. 41 is a diagram for explaining a paper size list on the print setting screen.
Figure 42:
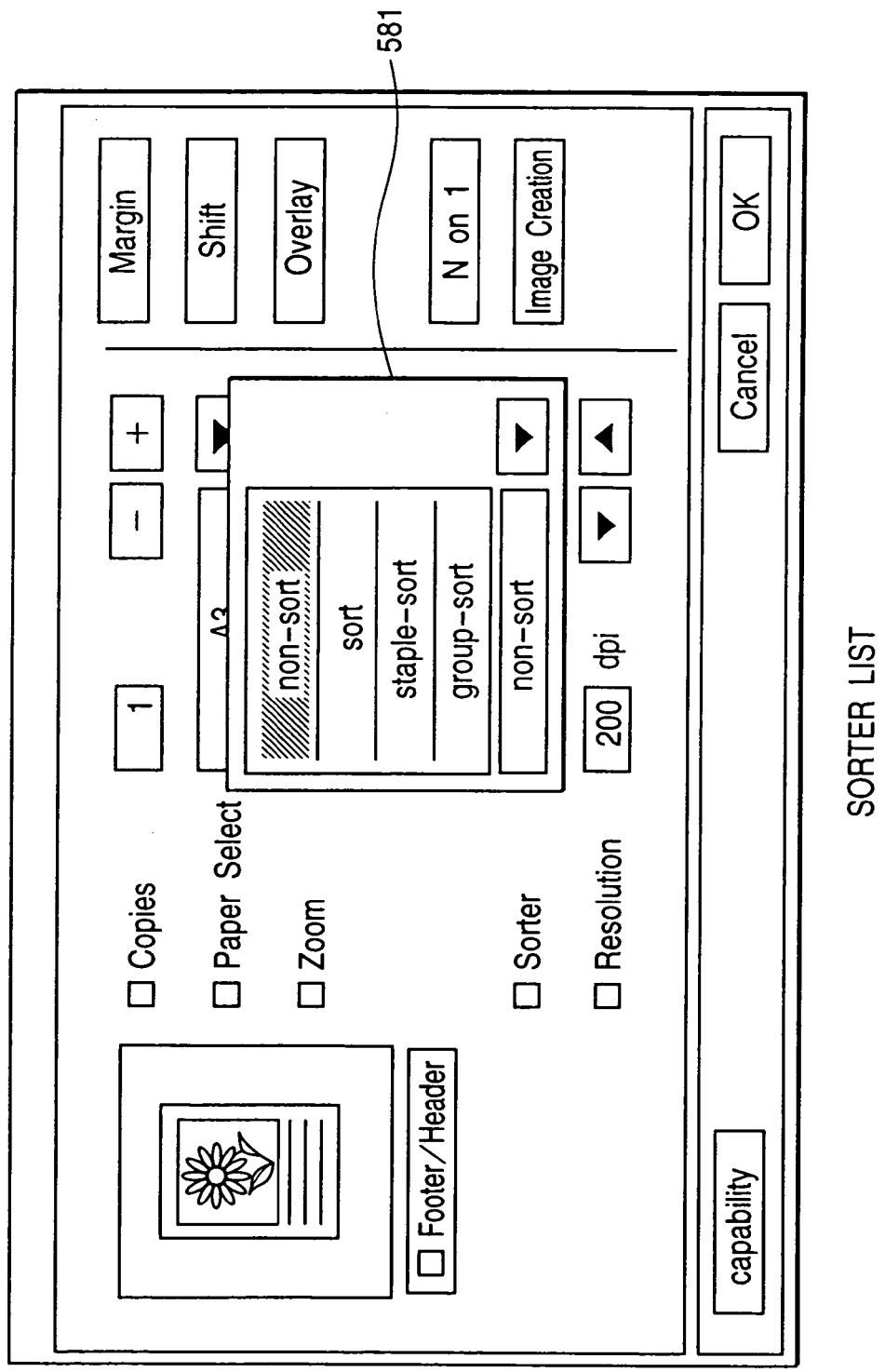
FIG. 42 is a diagram for explaining a sorter list on the print setting screen.

When, for example, a paper size select button 556 is depressed, as shown in FIG. 41 a paper size list 571 is displayed. A desired paper size is selected from the list 571 and is displayed in a paper size display box 555, as shown in FIG. 40. When a sorter select button 561 is depressed, the sorter list 581 in FIG. 42 is displayed. A desired sorter is selected from the list 581 and is displayed in a sorter display box 560, as shown in FIG. 40.

{Scan Setting Sub-Screen}

Figure 43:
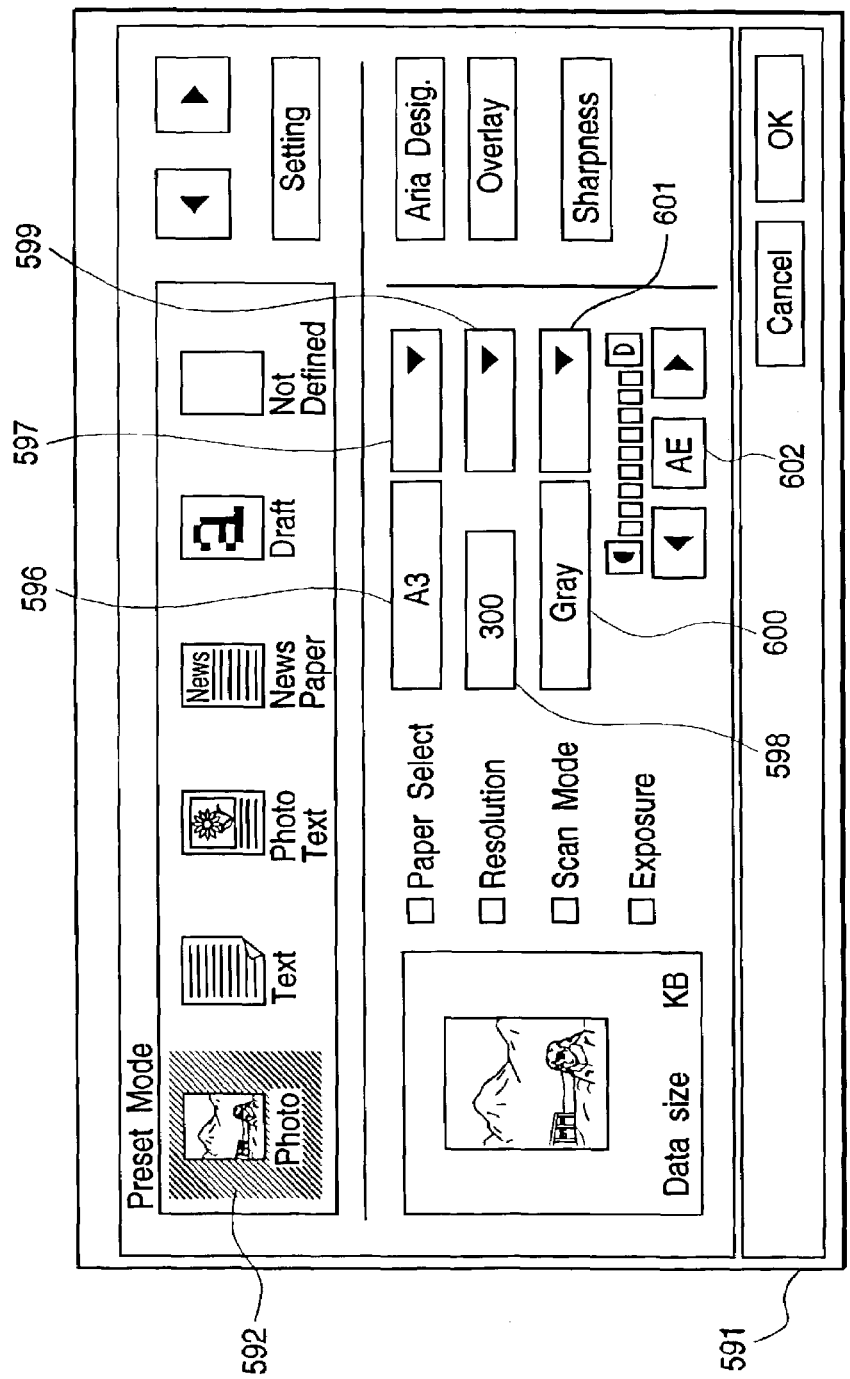
FIG. 43 is a diagram for explaining a scan setting screen on the SEND main screen.

When the scanner check button 365 is depressed on the SEND main screen 351 in FIG. 23, the scan setting screen in FIG. 43 is displayed.

On the scan setting screen 591, a desired mode is selected from those displayed in a preset mode select box (Preset Mode) 592 ("Photo" mode in FIG. 43), and the resolution, the scan mode and the density that are set in advance and that correspond to the selected mode are respectively displayed in display boxes 598, 600 and 602. These values that are set in advance can be changed manually.

Figure 44:
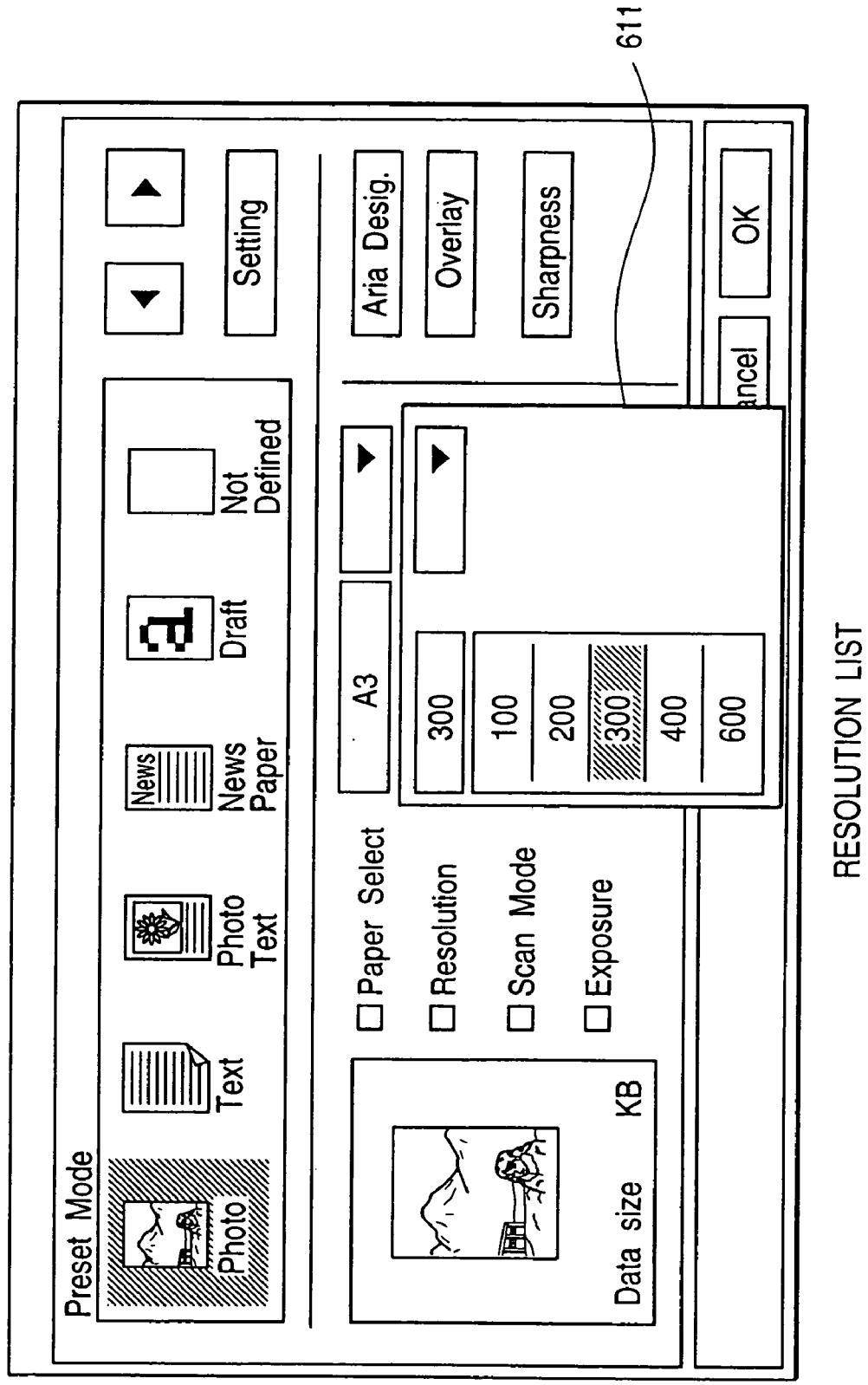
FIG. 44 is a diagram for explaining a resolution list on the scan setting screen.

Upon the depression, for example, of a resolution select button 599, the resolution list 611 in FIG. 44 is displayed. When a desired resolution has been selected from the list 611, the resolution is set and is displayed in the resolution display box 598, as shown in FIG. 43.

Figure 45:
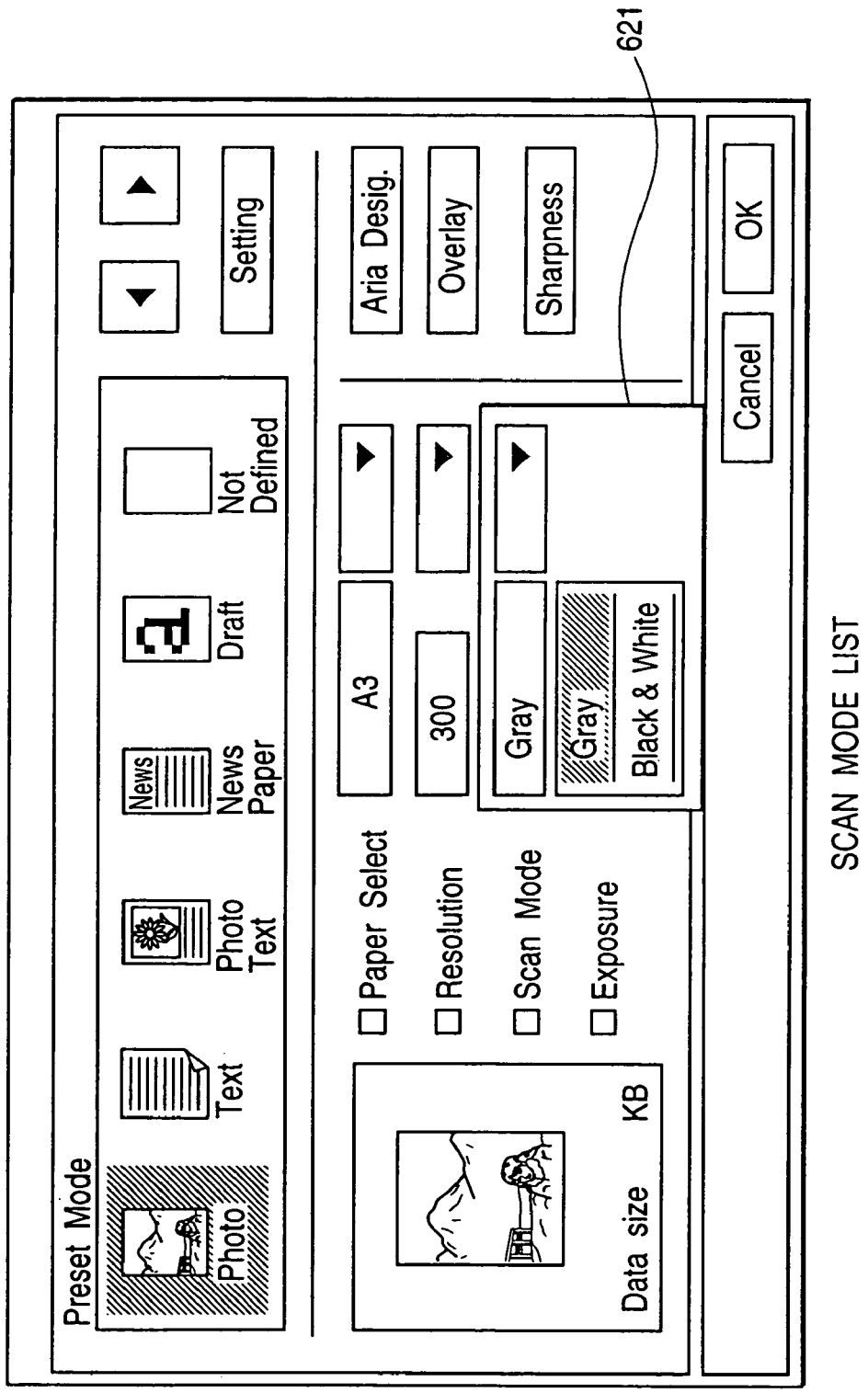
FIG. 45 is a diagram for explaining a scan mode list on the scan setting screen.

Similarly, upon the depression of the mode select button 601, the scan mode list 621 in FIG. 45 is displayed. When a desired scan mode has been selected from the list 621, that scan mode is set and is displayed in the scan mode display box 600.

Figure 46:
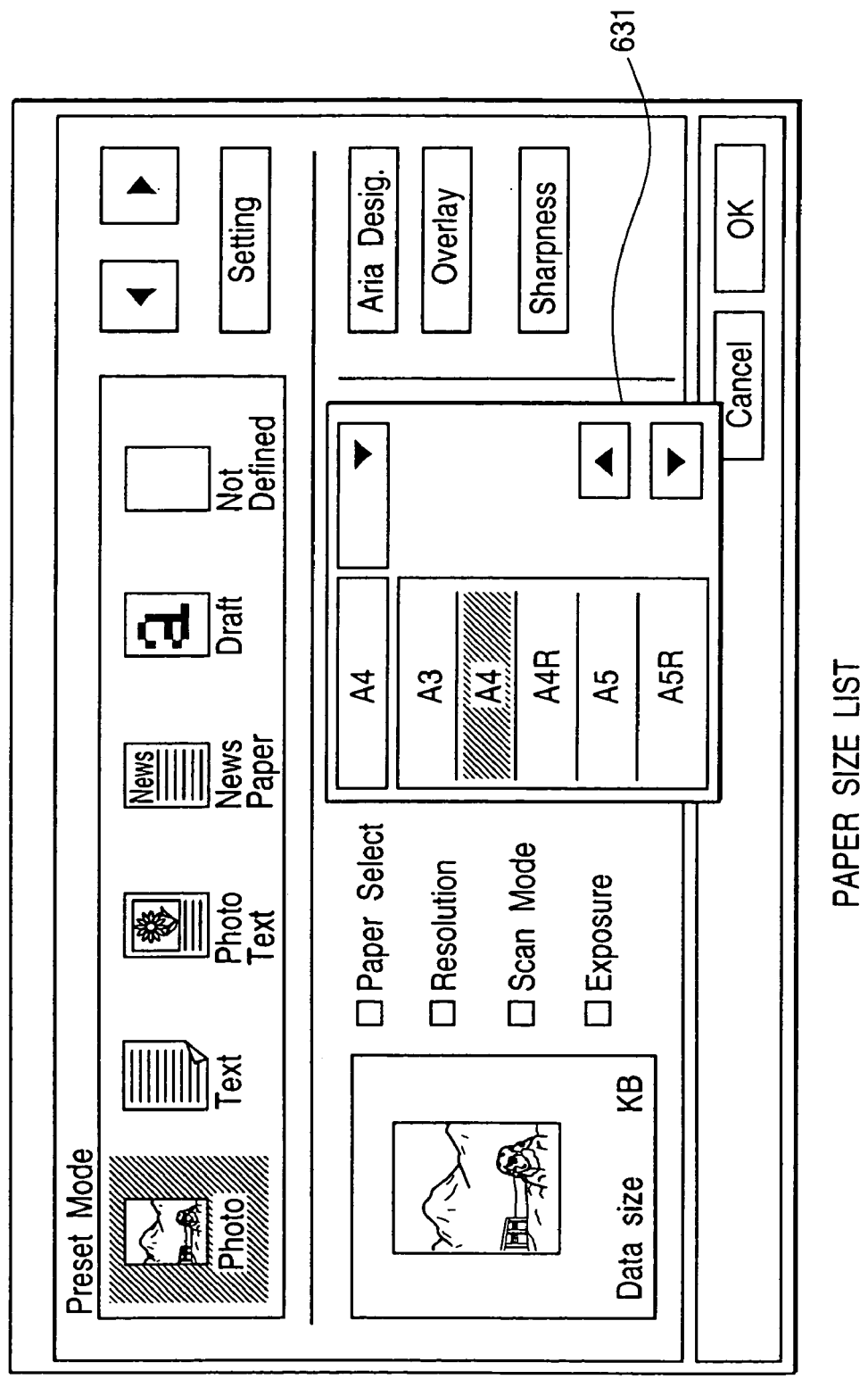
FIG. 46 is a diagram for explaining a paper size list on the scan setting screen.

Upon the depression of a paper size button 597, the paper size list 611 in FIG. 46 is displayed as a pull-down menu. A paper size and a paper direction are selected from the list 631, and are displayed in the paper size display box 596, as shown in FIG. 43.

{RETRIEVE Screen}

Figure 47:
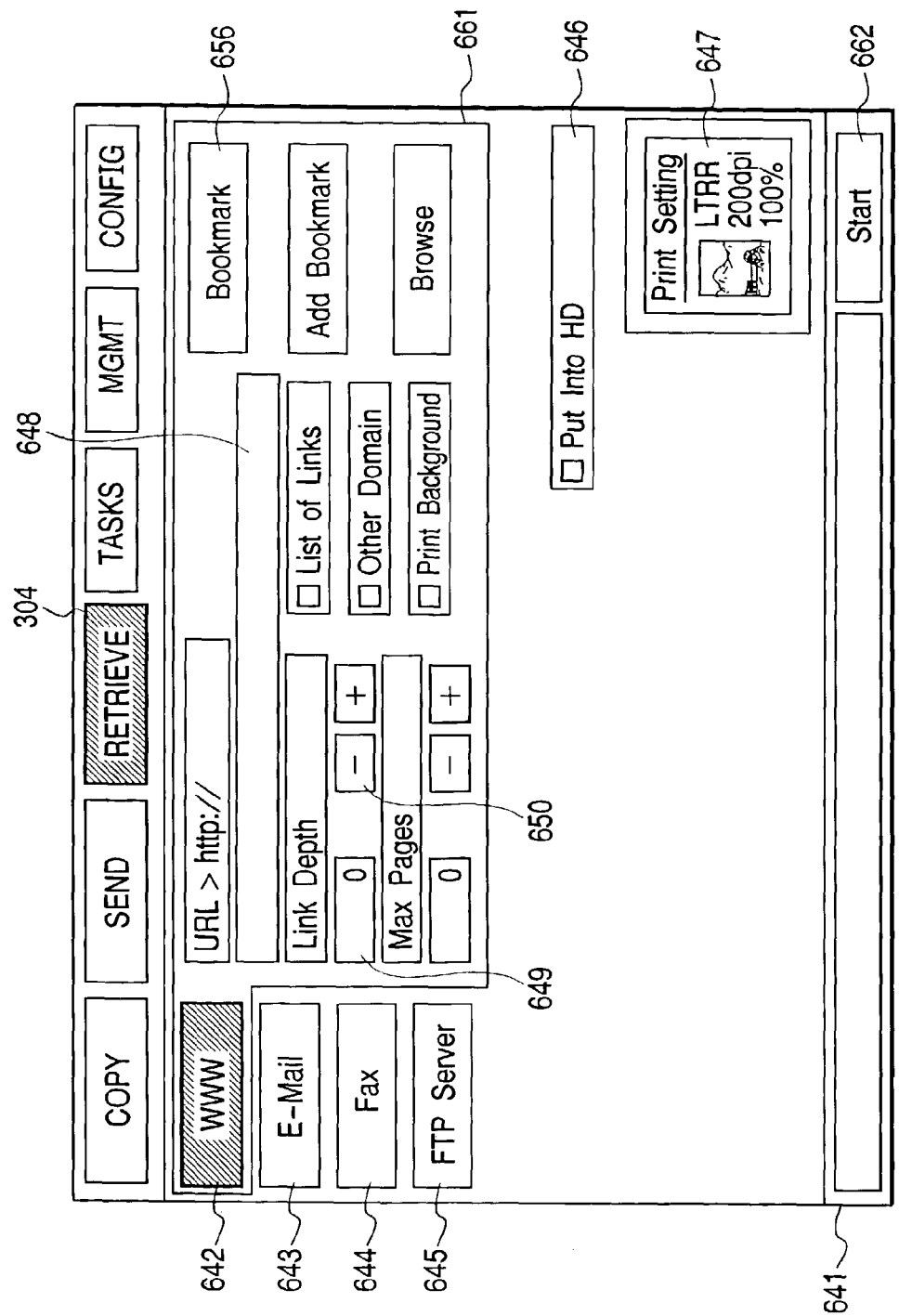
FIG. 47 is a diagram for explaining a RETRIEVE main screen (WWW sub-screen) displayed by the LCD display device.

FIG. 47 is a diagram showing the RETRIEVE main screen 641 that is displayed upon the depression of the main tab "RETRIEVE" 304.

The RETRIEVE main screen 641 includes WWW, E-Mail, FAX and FTP sub-tab buttons 642 to 645, and an HD check button 646 and a print out check button 647, which are used in common for each sub-category.

When one of the sub-buttons 642 to 645 is depressed, the WWW, E-Mail, FAX or FTP sub-screen is displayed, which will be described later.

At the time of initialization, including resetting, the WWW sub-screen is displayed.

{WWW Sub-Screen}

When the WWW sub-tab 642 is depressed on the RETRIEVE main screen 641 in FIG. 47, a WWW sub-screen 661 in FIG. 47 is displayed.

Figure 35:
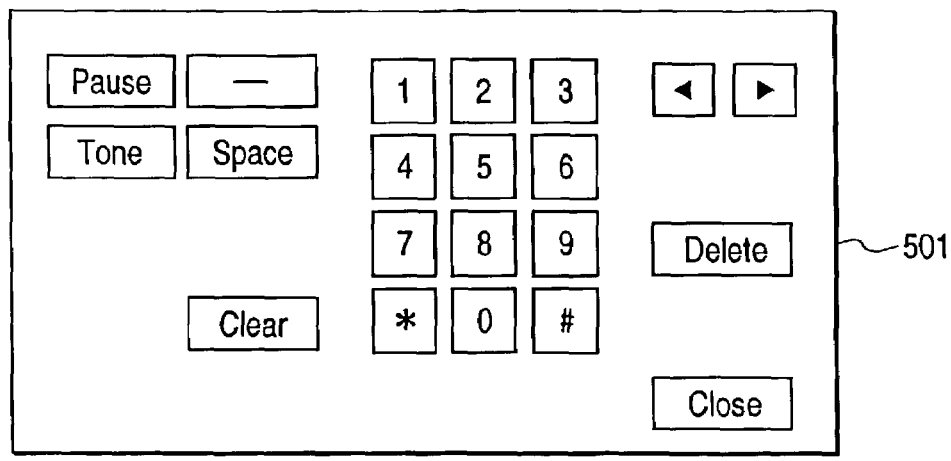
FIG. 35 is a diagram for explaining a 10-key pad on each screen displayed by the LCD display device.

Upon the selection of a URL input box 648 on the WWW sub-screen 661, the full keyboard 381 in FIG. 25 is displayed, and can be used to enter a URL. When "Link Depth" and "Max Pages" input boxes 649 and 651 are selected, the number-key pad 501 in FIG. 35 is displayed for the entry of individual values.

When the URL and the values have been entered in the URL input box 648 and the "Link Depth" and "Max Pages" input boxes 649 and 651, and a start button 662 is depressed, in accordance with the setup a home page is printed.

It should be noted that when nothing is displayed in the URL input box 648 and the "Link Depth" and "Max Pages" input boxes 649 and 651, i.e., when nothing has been designated, no function is initiated upon the depression of the start button 662.

{Bookmark Sub-Screen}

Figure 48:
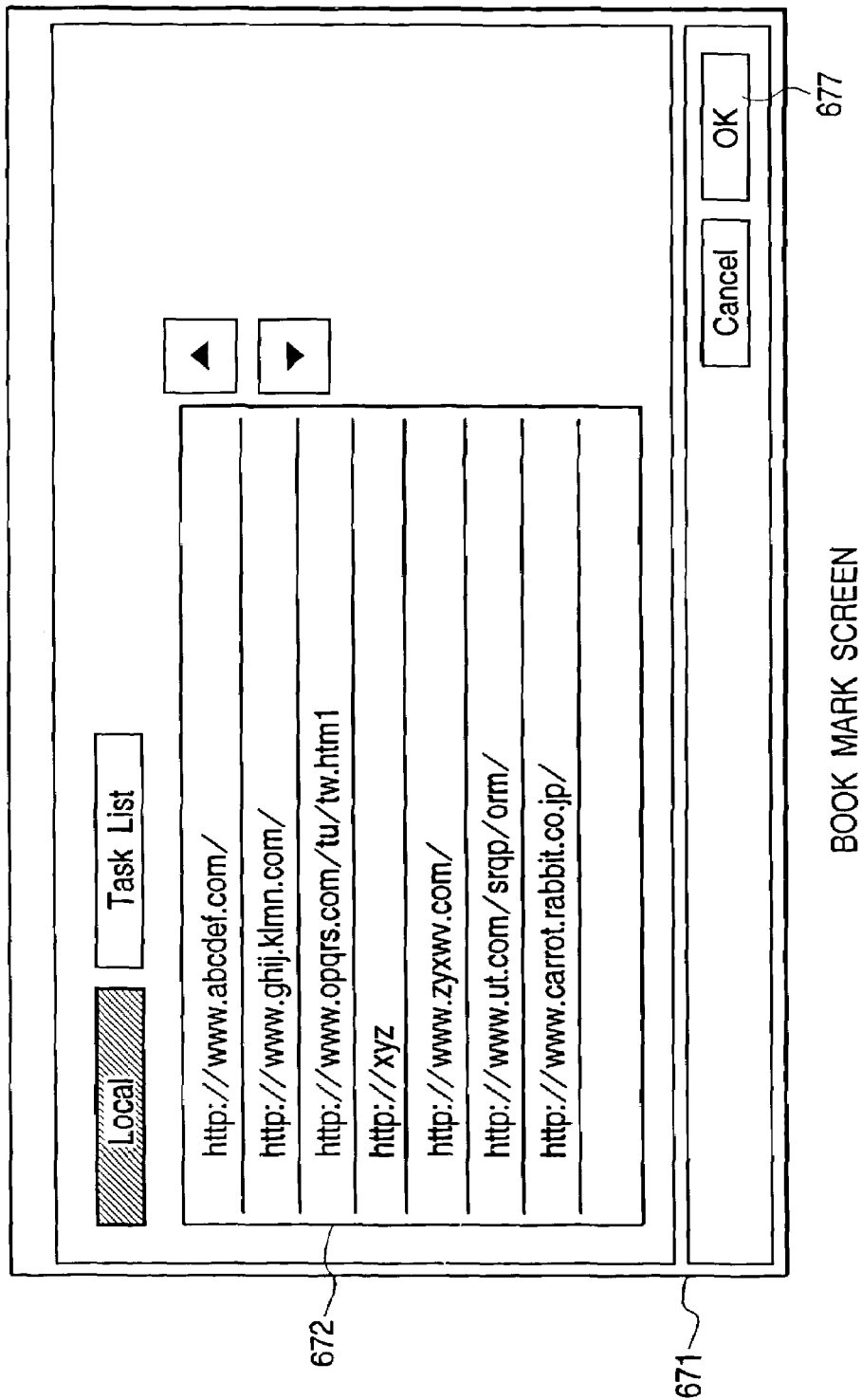
FIG. 48 is a diagram for explaining a book mark sub-screen on the WWW sub-screen.

When a bookmark button (Bookmark) 656 is depressed on the WWW sub-screen 661 in FIG. 47, the bookmark sub-screen 671 in FIG. 48 is displayed.

A book mark list is displayed in a bookmark display box 672 on the bookmark sub-screen 671. When the row occupied by a desired bookmark in the list is depressed, the bookmark is selected. Upon the depression of an OK button 677, the bookmark sub-screen 671 is closed, and the selected bookmark is displayed in the URL input box 648 on the WWW sub-screen 661 in FIG. 47.

{E-Mail Sub-Screen}

Figure 49:
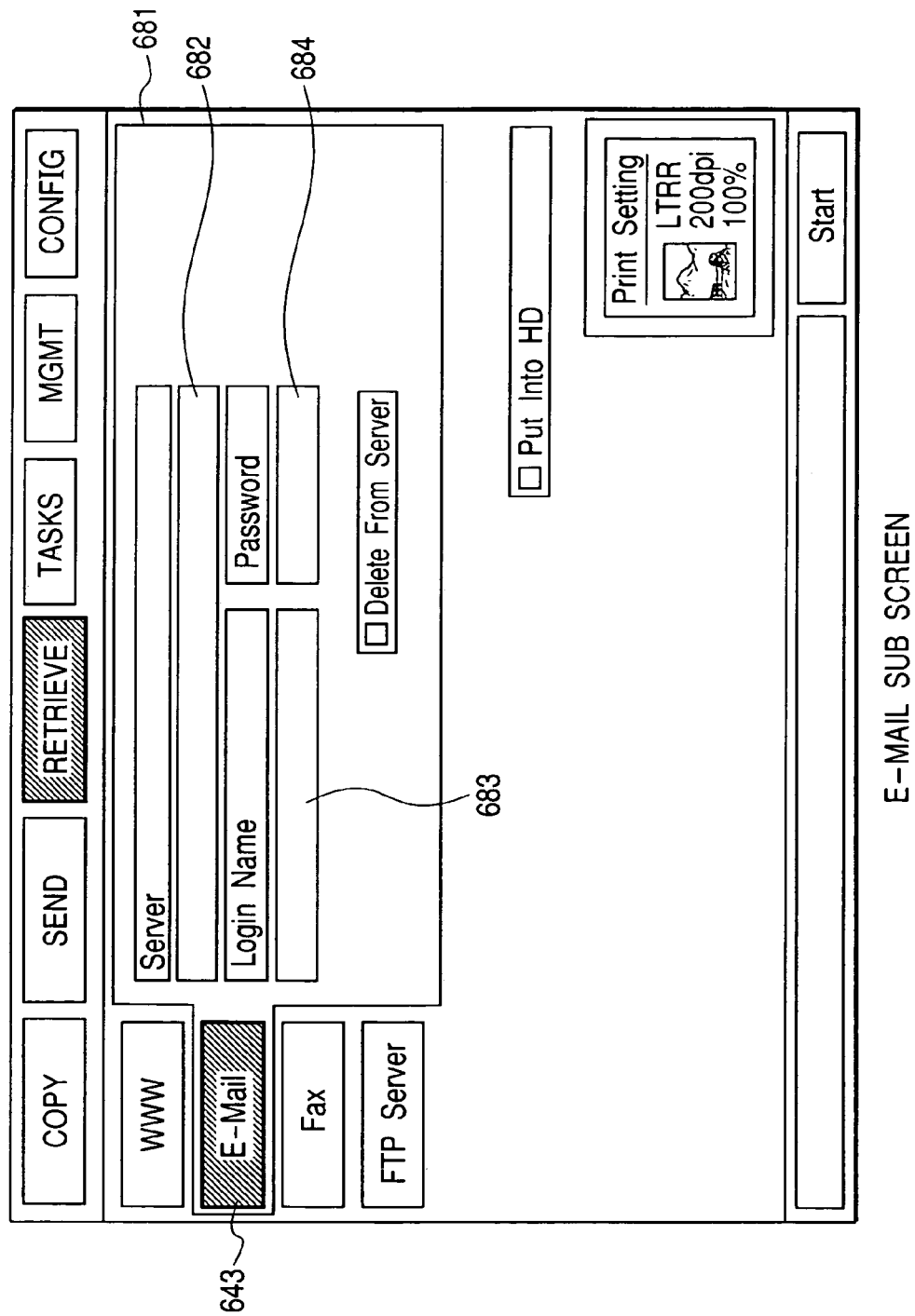
FIG. 49 is a diagram for explaining an E-Mail sub-screen on the RETRIEVE main screen.

When the E-Mail sub-tab 643 is depressed on the RETRIEVE main screen 641 in FIG. 47, the E-Mail sub-screen 681 in FIG. 49 is displayed.

When a server input box (Server) 682, a login name input box (Login Name) 683 and a password input box (Password) 684 are selected, the full keyboard 381 in FIG. 25 is displayed for the entry of a server, a login name and a password so that E-mail can be received from the server.

{FAX Sub-Screen}

Figure 50:
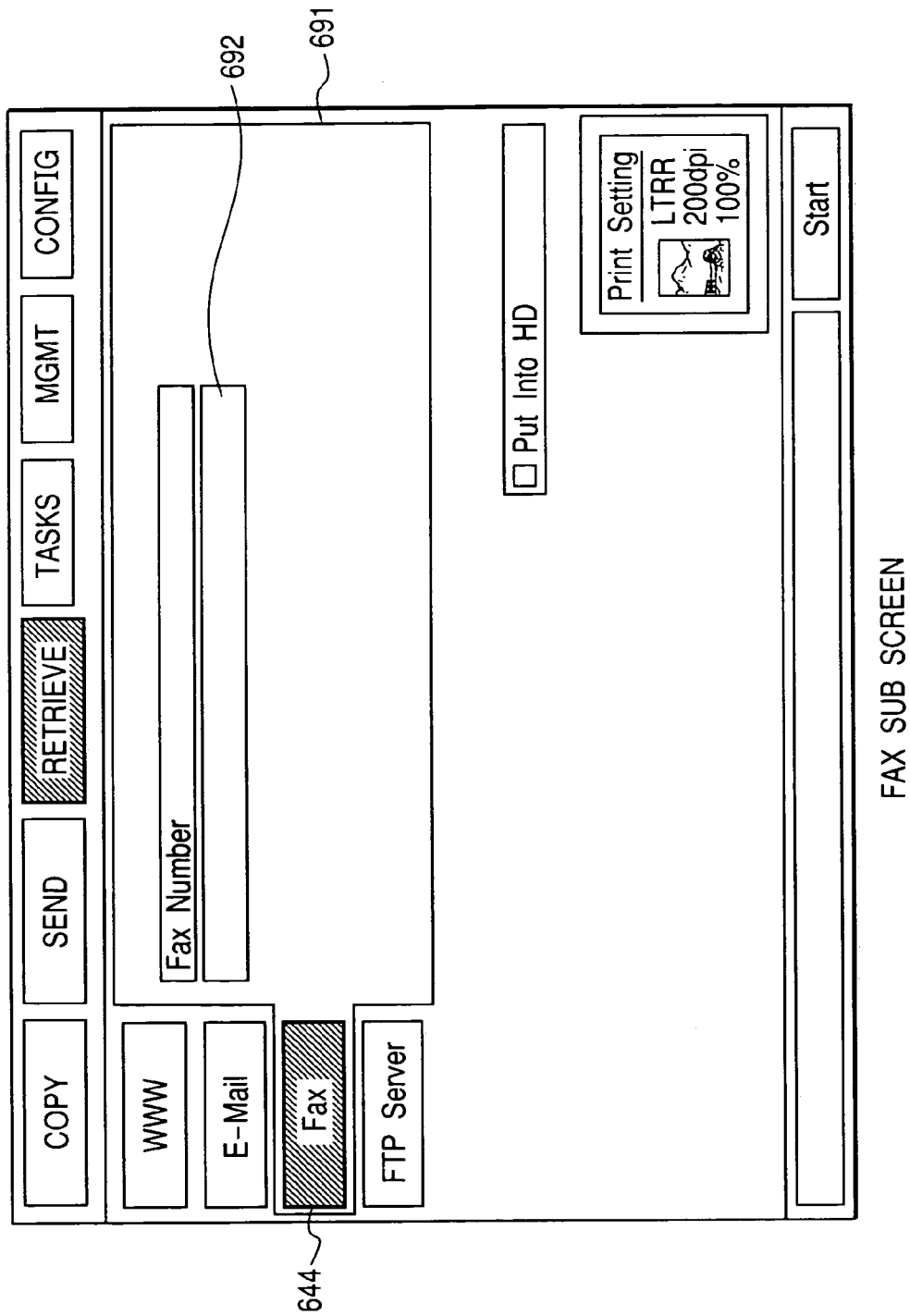
FIG. 50 is a diagram for explaining a FAX sub-screen on the RETRIEVE main screen.

When the FAX sub-tab 644 is depressed on the RETRIEVE main screen 641 in FIG. 47, the FAX sub-screen 691 in FIG. 50 is displayed.

Upon the selection of a facsimile number input box 692 on the FAX sub-screen 691, the number-key pad 501 in FIG. 35 is displayed for the entry of the facsimile number.

{FTP Sub-Screen}

Figure 51:
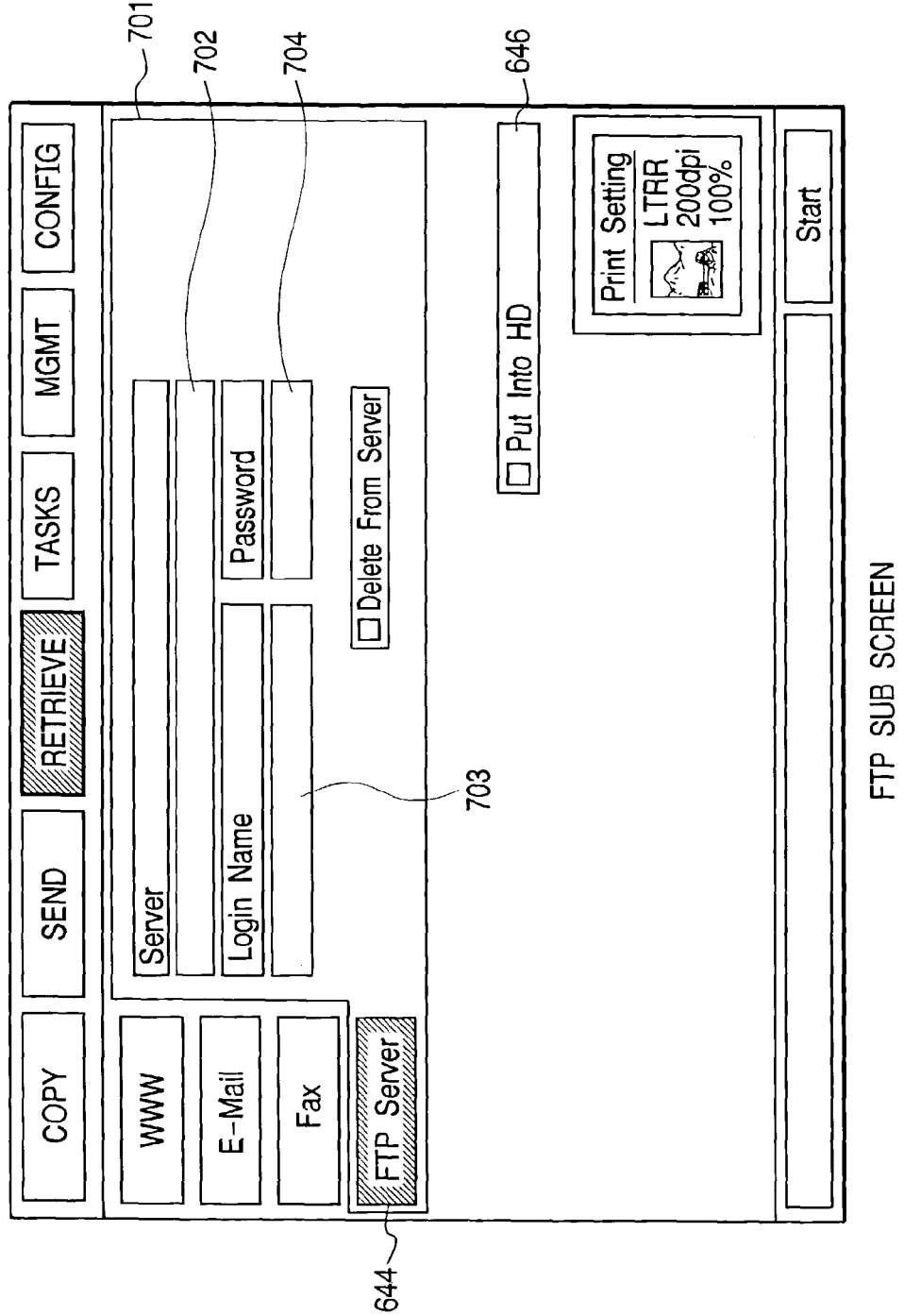
FIG. 51 is a diagram for explaining an FTP sub-screen on the RETRIEVE main screen.

Upon depression of the FTP sub-tab 645 on the RETRIEVE main screen 641 in FIG. 47, the FTP sub-screen 701 in FIG. 51 is displayed.

When a server input box (Server) 702, a login name input box (Login Name) 703 and a password input box (Password) 704 are selected on the FTP sub-screen 701, the full keyboard 381 in FIG. 25 is displayed for the entry of a server, a login name and a password so that data can be received from the server.

{HD Setting Sub-Screen}

Upon the depression of the HD check button 646 that is used in common for the WWW, E-Mail, FAX and FTP categories, the hard disk setting screen 541 in FIG. 39 is displayed.

As is described above, this hard disk setting screen 541 can be used to designate the setup to be used for transmitting data to the hard disk.

{Print Setting Sub-Screen}

Figure 52:
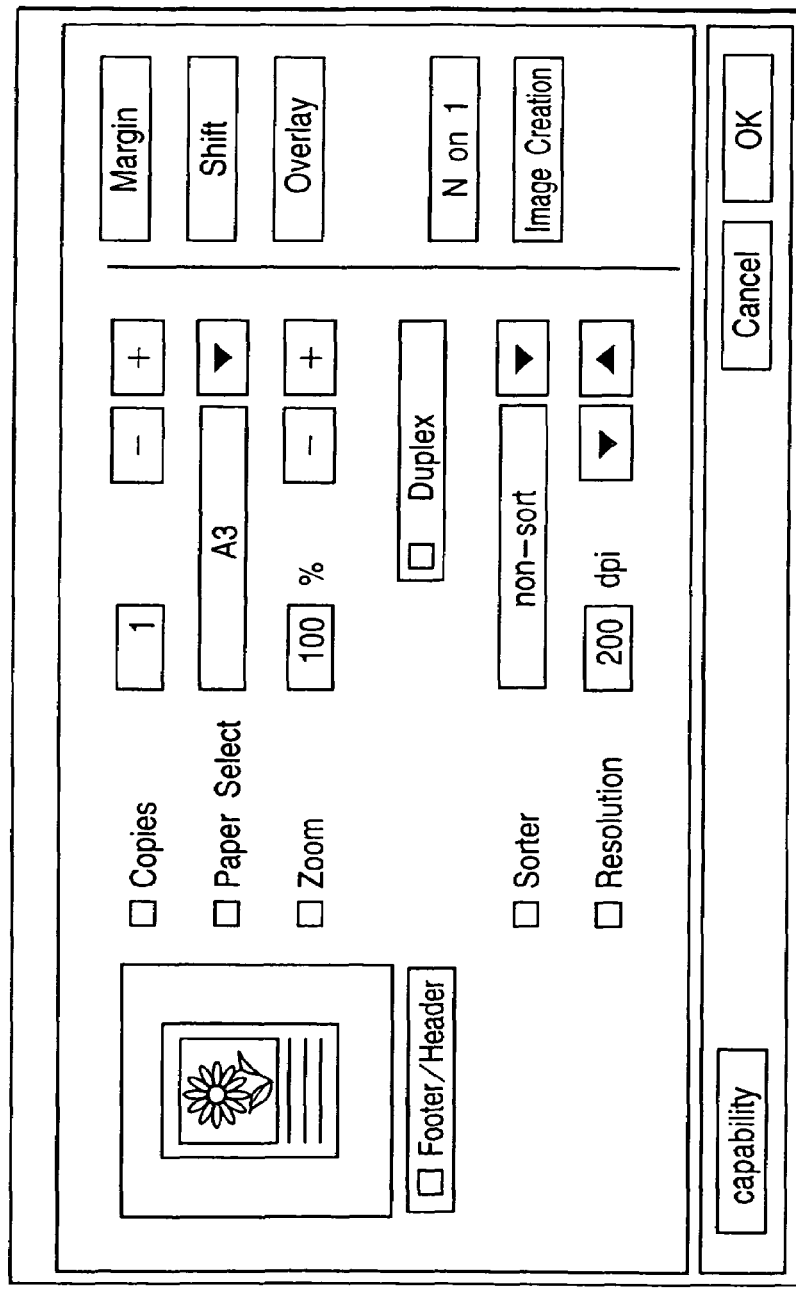
FIG. 52 is a diagram for explaining a print setting screen on the WWW, E-Mail, FAX and FTP sub-screens.

Upon the depression of the print out check button 647 that is used in common for the WWW, E-Mail, FAX and FTP categories, the print setting screen 711 in FIG. 52 is displayed.

The print setting screen 711 has the same functions as the print setting screen 551 in FIG. 40, and with it a setup can be designated for the printing of data.

{TASKS Screen}

Figure 53:
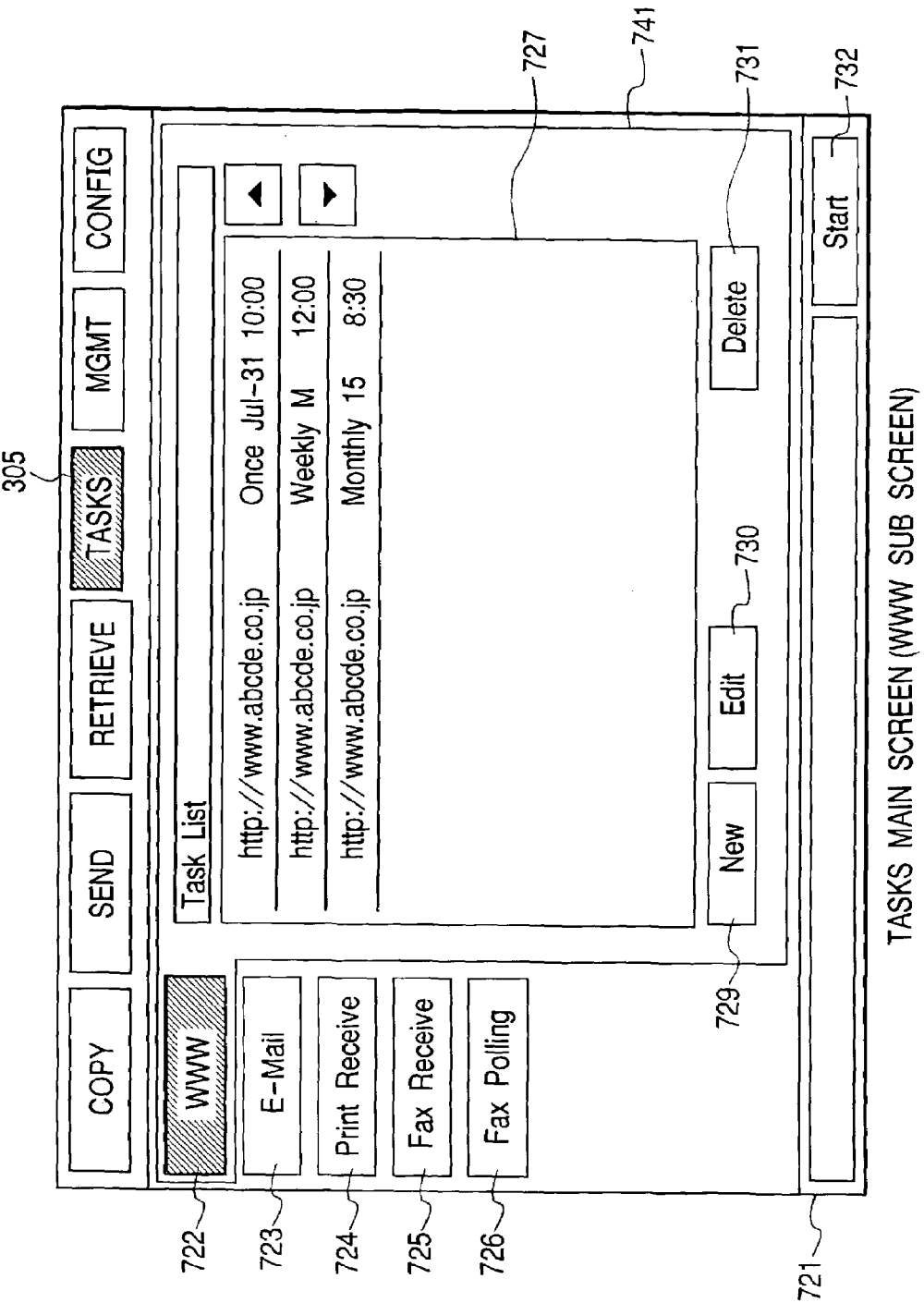
FIG. 53 is a diagram for explaining a TASKS main screen (WWW sub-screen) displayed by the LCD display device.

FIG. 53 is a diagram showing the TASKS main screen 721 that is displayed upon the depression of the main tab "TASKS" 305.

The TASKS main screen 721 includes WWW, E-Mail, Print Receive, Fax Receive and Fax polling sub-tabs 722 to 726.

When a start button 732 is depressed while the TASKS main screen 721 is displayed, an operation for automatically processing externally received document data and for periodically printing (retrieving) the data is performed in accordance with the parameters that are designated on the screen 721.

{WWW Sub-Screen}

Upon the depression of the WWW sub-tab 722 on the TASKS main screen 721 in FIG. 53, the WWW sub-screen 741 in FIG. 53 is displayed.

At the time of initialization, including resetting, the WWW sub-screen 741 is displayed.

Tasks that are stored in the apparatus 100 are displayed, in the order that they were input, in a WWW task list display box 727 on the WWW sub-screen 741. A select check mark is provided for the displayed task that is actually to be executed.

Thus, a task to which the select check mark has been added is executed. A task for which no select check mark has been provided is stored in the apparatus 100 and is not executed.

Figure 54:
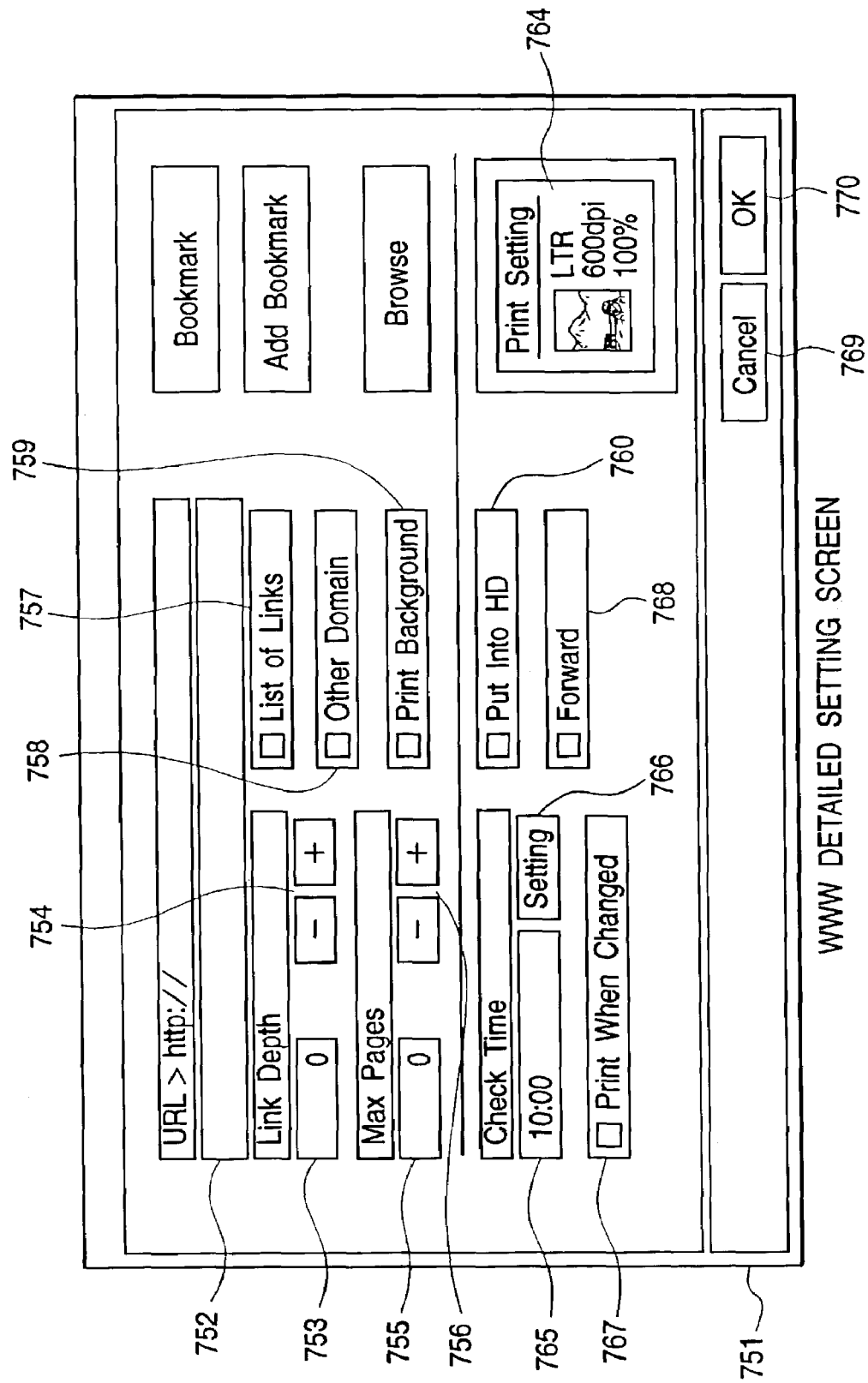
FIG. 54 is a diagram for explaining a WWW detailed setting screen on the WWW sub-screen.

Upon the depression of a new button (New) 729, the WWW detailed setting screen 751 in FIG. 54 is displayed, which will be described in detail later. A new task can be entered on the WWW detailed setting screen 751.

When one task in the WWW task list 727 is selected and an edit button (Edit) 730 is depressed, the WWW detailed setting screen 751 in FIG. 54, in which information for the selected task is included, is displayed. The settings on the WWW detailed setting screen 751 of the information for the selected task can be edited.

When a task in the WWW task list 727 is selected and a delete button (Delete) 731 is depressed, that task is deleted.

{WWW Detailed Setting Screen}

The WWW detailed setting screen 751 includes, as shown in FIG. 54, the RETRIEVE main screen 641 in FIG. 47 and components 752 to 764, a check time display box 765, a check time setting button 766, a print change check button (Print When Changed) 767, a transmission check button 768, an OK button 770 and a cancel button 769, all of which are employed in common with the WWW sub-screen 661.

The check time display box 765 is blank when the WWW detailed setting screen 751 is displayed following the depression of the new button 729. When the screen 751 is displayed following the depression of the edit button 730, a designated task execution time is displayed. Further, immediately after the setting is performed on the check time sub-screen, which will be described later, the designated task execution time is displayed.

Upon the depression of the check time setting button 766, the check time sub-screen that will be described later is displayed. On this screen, the time for executing a task can be set.

{Check Time Sub-Screen}

Figure 55:
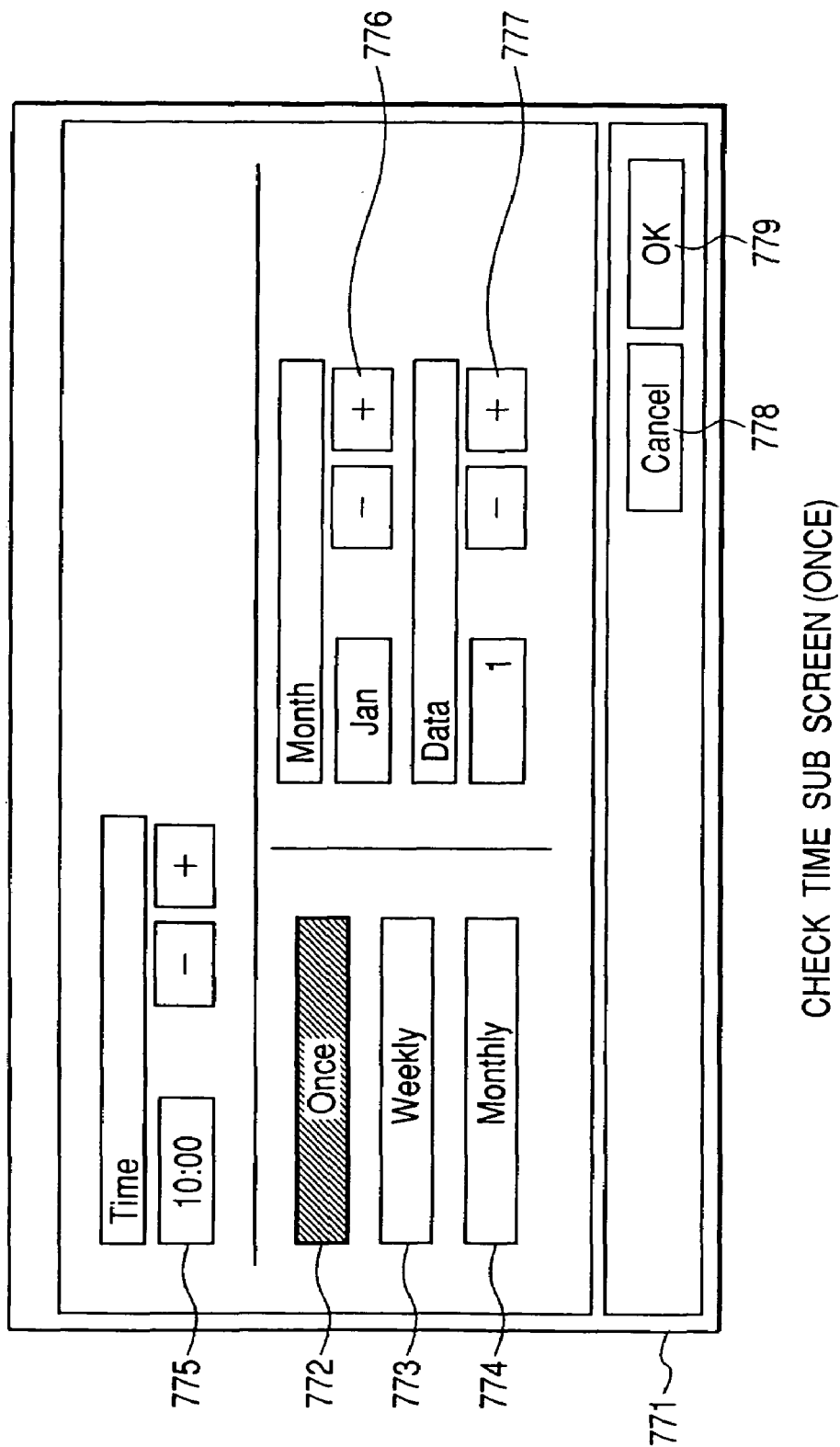
FIG. 55 is a diagram for explaining a check time sub-screen (Once) on the WWW detailed setting screen.

When the check time setting button 766 is depressed on the WWW detailed setting screen 751 in FIG. 54, the check time sub-screen 771 in FIG. 55 is displayed.

The check time sub-screen 771 includes schedule mode setting buttons 772 to 774, a time input box 775, an OK button 779 and a cancel button 778.

In FIG. 55 is shown the screen display when the "Once" button 772, of the three schedule mode setting buttons 772 to 774, is selected and depressed. In this case, a "month" input box 776 and a "date" input box 777 are displayed. Upon the selection of these input boxes 776 and 777, the number-key pad 501 in FIG. 35 is displayed for the entry of the date on which the task is to be executed.

Figure 56:
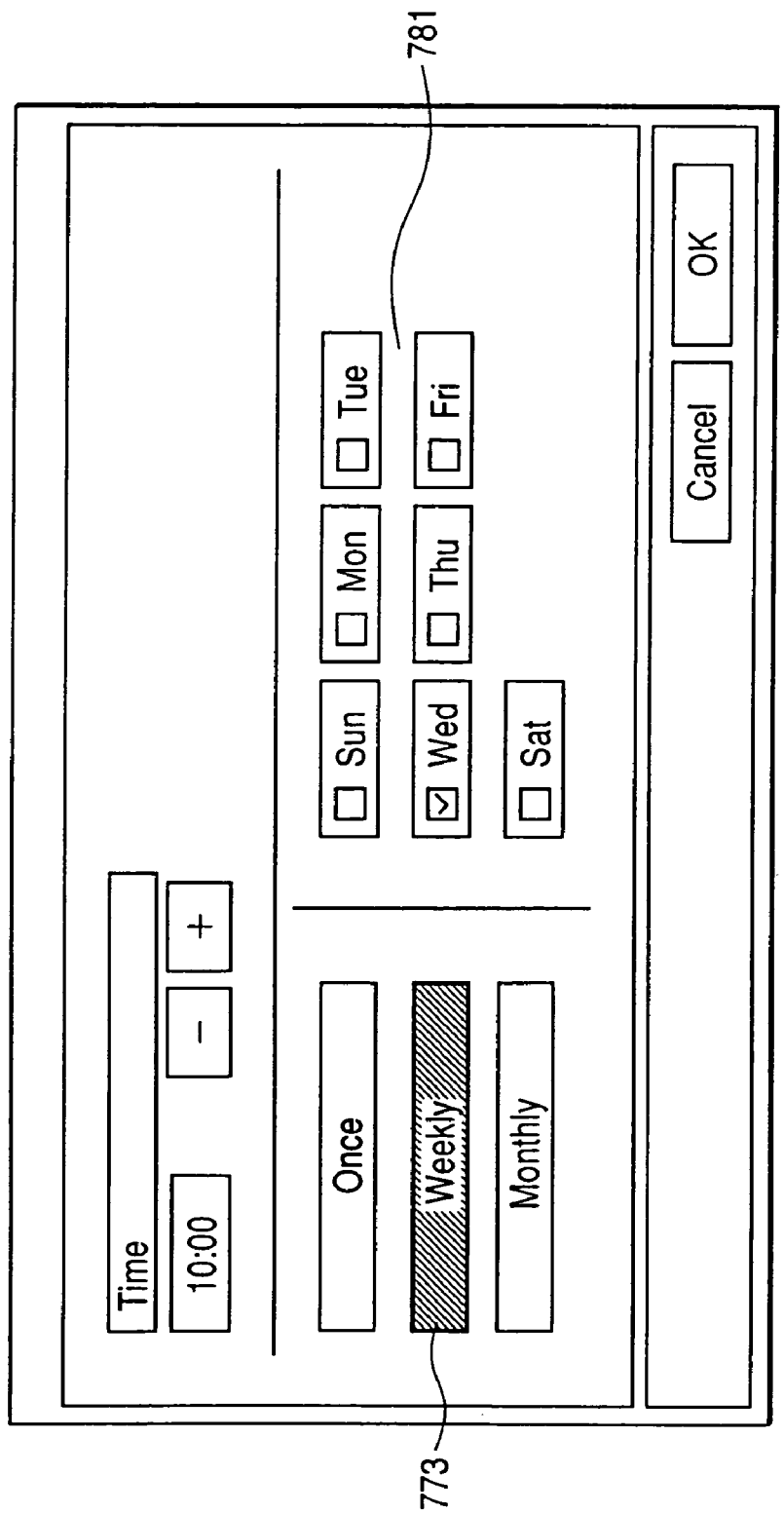
FIG. 56 is a diagram for explaining a check time sub-screen (Weekly) on the WWW detailed setting screen.

Upon the depression of the "Weekly" button 773, day setting buttons 781 are displayed, as shown in FIG. 56. With the day setting buttons 781, the day of the week a task is to be executed can be entered. It should be noted that in a week a plurality of days can be designated.

Figure 57:
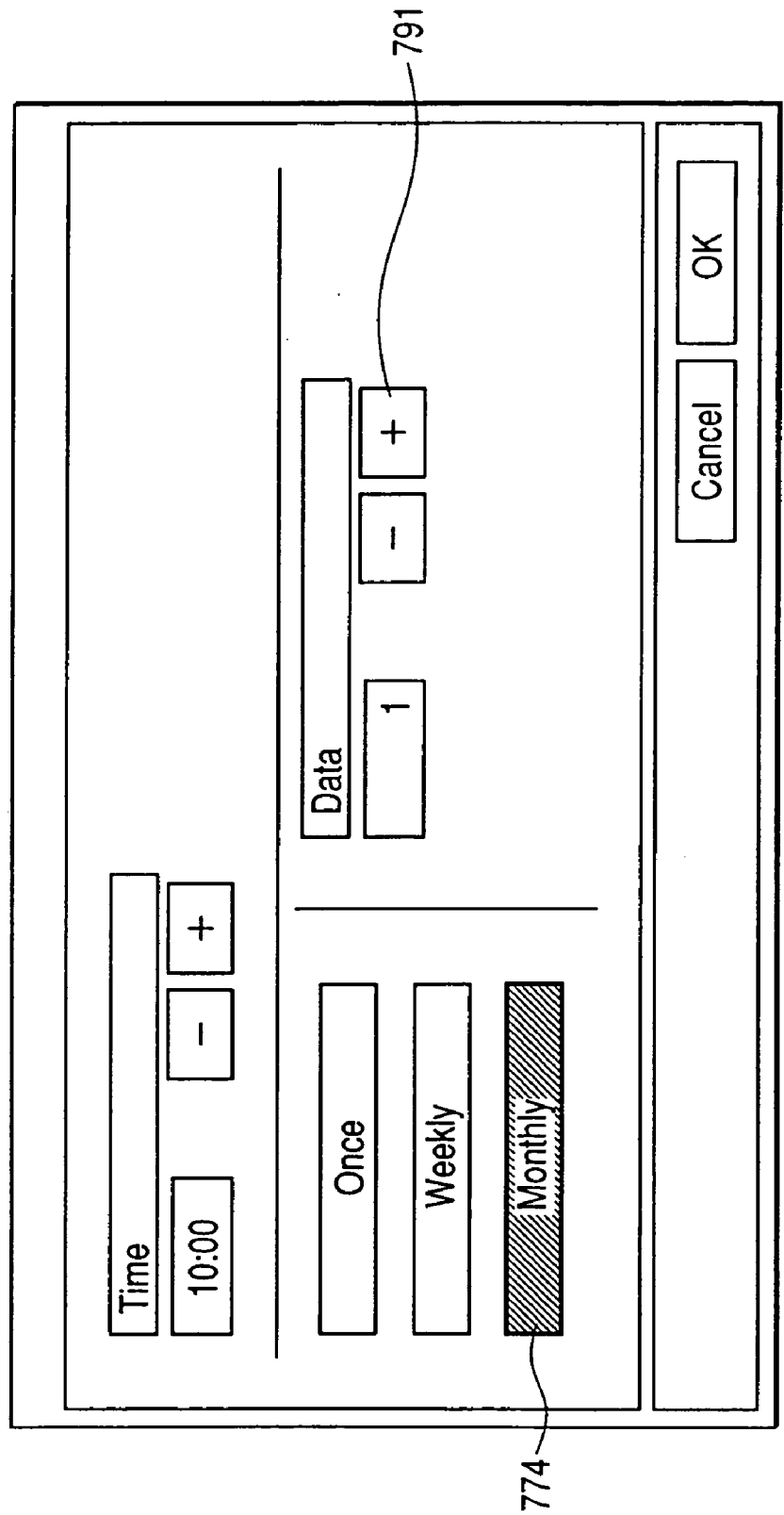
FIG. 57 is a diagram for explaining a check time sub-screen (Monthly) on the WWW detailed setting screen.

Upon the depression of the "Monthly" button 774, a "month" input box 791 is displayed, as shown in FIG. 57. When the input box 791 is selected, the number-key pad 501 in FIG. 35 is displayed for the entry of the month a task is to be executed.

{MGMT Screen}

Figure 58:
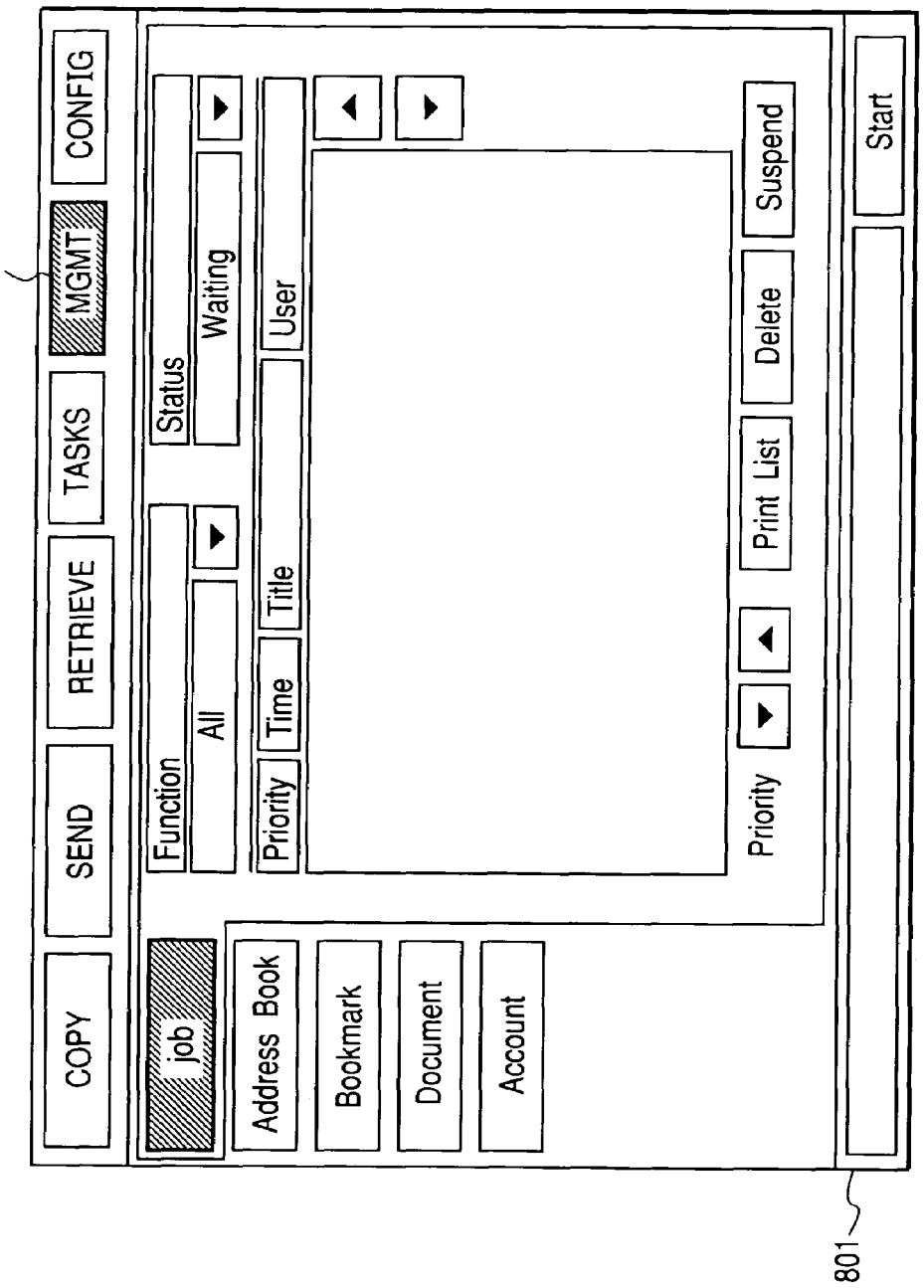
FIG. 58 is a diagram for explaining a Management main screen displayed by the LCD display device.

FIG. 58 is a diagram showing the management main screen 801 that is displayed upon the depression of the main tab "MGMT" 306.

{CONFIG Screen}

Figure 59:
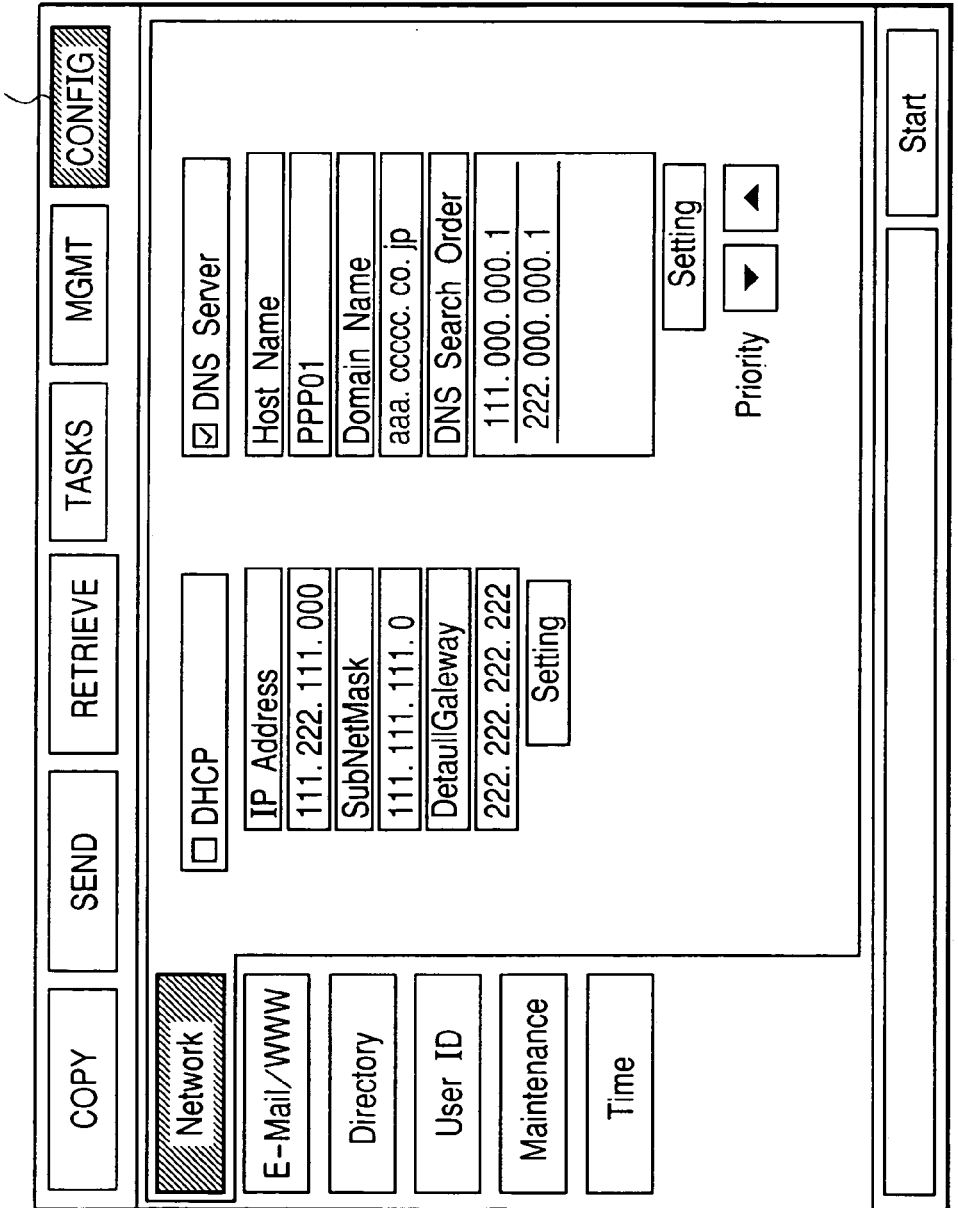
FIG. 59 is a diagram for explaining a Configuration main screen displayed by the LCD display device.

FIG. 59 is a diagram showing the configuration main screen 811 that is displayed upon the depression of the main tab "CONFIG" 307.

{Full Keyboard}

As is described above, the full keyboard 381 in FIG. 25 is displayed when a character input box on a screen is selected.

Characters can be entered by depressing the keys on the keyboard 381. The full keyboard 381 is especially arranged so that the characters "www" can be entered by depressing the "www" key, and so that the characters "com" can be entered by depressing the "com" key.

{Number-Key Pad}

As is described above, the number-key pad 501 in FIG. 35 is displayed when a numerical value input box or the month and date input boxes on a screen are selected.

{Error Screen}

Figure 60:
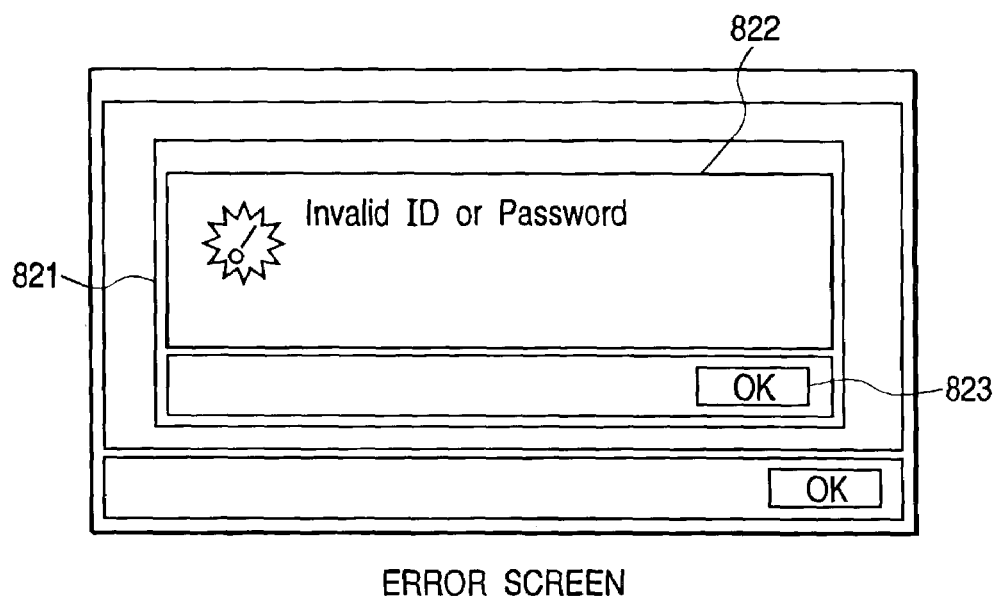
FIG. 60 is a diagram for explaining an error screen displayed by the LCD display device.

When an error occurs during the manipulation of devices on the above screens, the error screen 821 in FIG. 60 is displayed.

The error screen 821 includes a message display box 822 in which an error message is displayed using text, and an OK button 823 for closing the error screen 821.

This completes the explanation given for the screen structures of the LCD display device 171 of the operation unit 132 of the image processing apparatus 100, the manipulation of devices on the screens, and associated processes.

An explanation will now be given for a device information service (hereinafter referred to as "DIS") employed by the image processing apparatus 100, and associated scan processing and printing processing.

{DIS}

In the image processing apparatus 100, the control unit 110 defines, as "DIS", the database (see FIGS. 1 and 12) and an interface (I/F) for the database. In the database, a setup value for a job (the scanning or the printing operation), the function and the status of a device (the scanner 133, the printer 134, etc.) and accounting information are stored as a data form that conforms to the control API 268.

Figure 61:
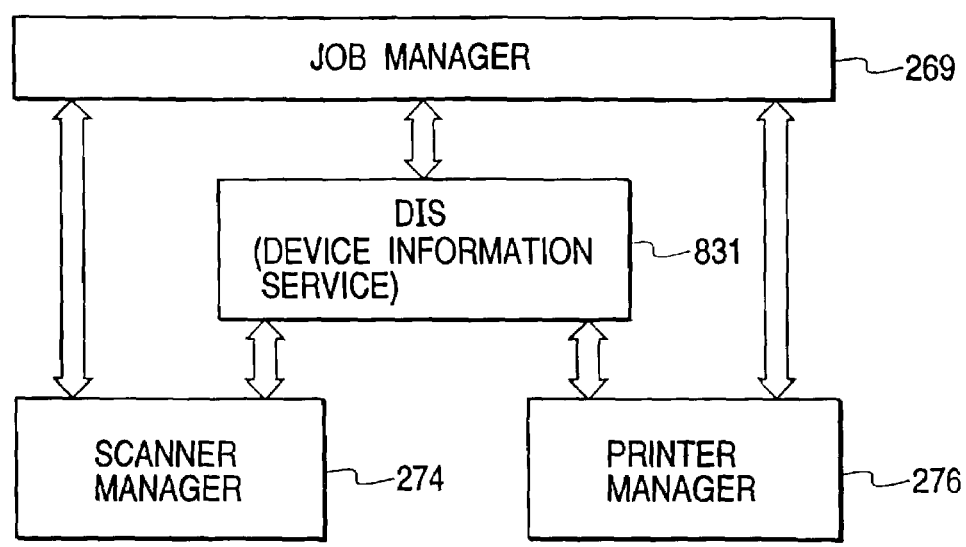
FIG. 61 is a diagram for explaining the exchange of data by a job manager, a scanner manager and a printer manager via a DIS in the image processing apparatus.

FIG. 61 is a diagram showing the exchange of data by a job manager 269 and a DIS 831, by the job manager 269 and a scanner manager 274 or a printer manager 276, and by the DIS 831 and the scanner manager 274 or the printer manager 276.

Essentially, dynamic information, such as an instruction for starting the scanning operation or the printing operation (job) is directly transmitted by the job manager 269 to the scanner manager 274 or the printer manager 276 (document manager). Static information, such as the function of the scanner 133 or the printer 134 and the contents of the scanning or the printing operation (job), is obtained from the DIS 831.

The static information or the dynamic information output by the scanner manager 274 or the printer manager 276, and event information are transmitted via the DIS 831 to the job manager 269.

When the scanner manager 274 or the printer manager 276 sets data in, or obtains data from the database of the DIS 831, since the data form in the DIS 831 conforms to the control API 268, mutual conversion is performed between the data form conforming to the control API 268 and the data form that the scanner manager 274 and the printer manager 276 can understand.

For example, to store status data in the database of the DIS 831, the scanner manager 274 and the printer manager 276 interpret the device inherent data, convert them into the data form defined by the control API 268, and write the resultant data in the database of the DIS 831.

It should be noted that when the job manager 269 stores data in or obtains data from the database of the DIS 831 no data are exchanged by the two.

The DIS 831 updates event data in accordance with various event information received from the scanner manager 274 and the printer manager 276.

Figure 62:
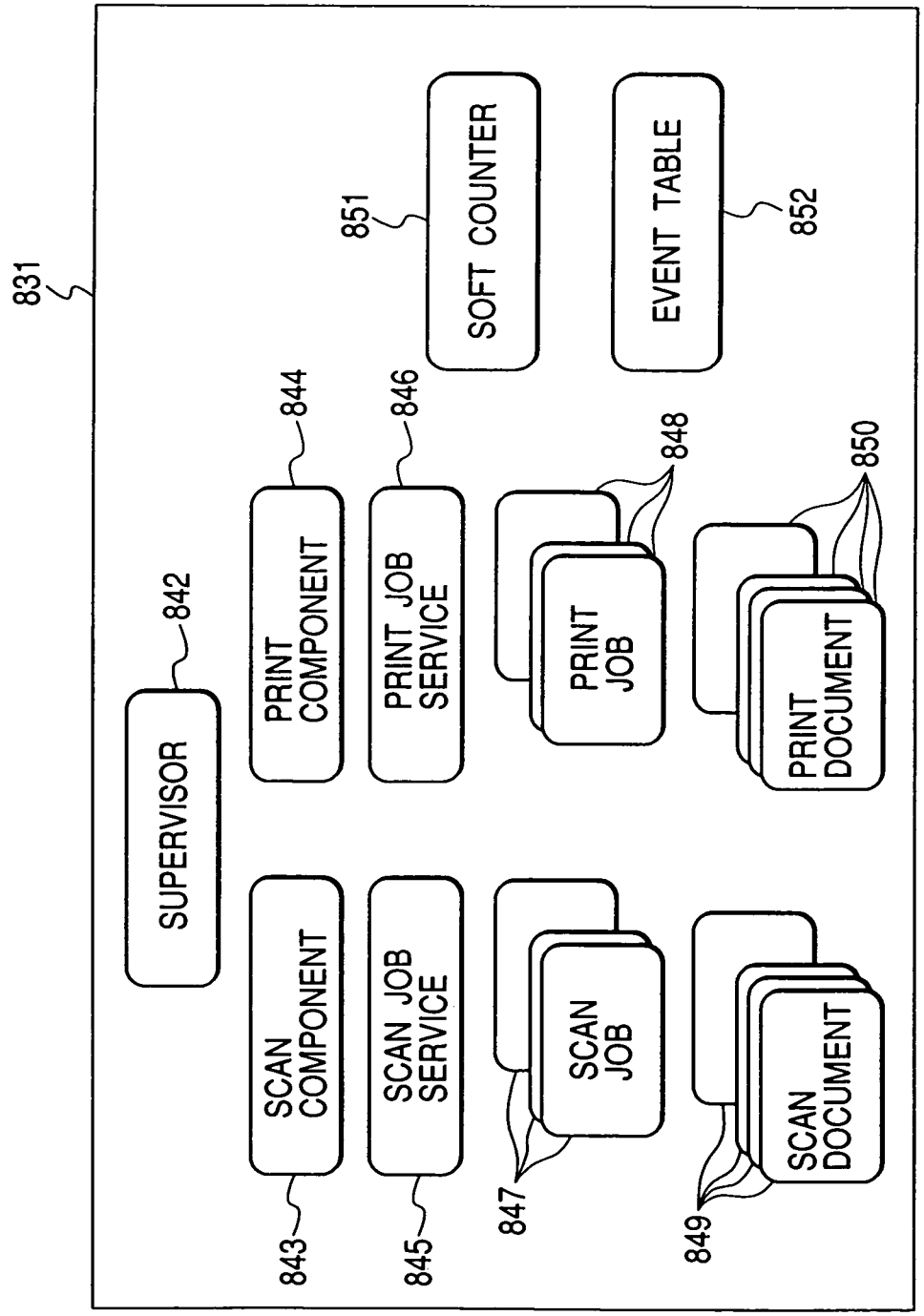
FIG. 62 is a diagram for explaining a database held in the DIS.

FIG. 62 is a diagram showing various databases stored in the DIS 831.

In FIG. 62, first, a supervisor DB 842 is used to store the status and user information for the apparatus 100. Among the information stored in the supervisor DB 842, information, such as a user ID and a password, that requires a backup is stored in nonvolatile memory, such as an HDD or a backup memory.

A scan component DB 843 and a print component DB 844 are provided for corresponding components that are present (in this case, the scanner 133 and the printer 134).

For an apparatus including only a printer, for example, only the print component DB 844 is provided, while for an apparatus including only a facsimile machine, only a FAX component DB is provided.

At the time of initialization, the scanner manager 274 and the printer manager 276 store the functions and statuses of the scanner 133 and the printer 134 in the scan component DB 843 and the print component DB 844, respectively.

Similarly, upon initialization, the scanner manager 274 and the printer manager 276 store the functions available with the scanner 133 and the printer 134, and the support statuses in a scan job service DB 845 and a print job service DB 846, as well as in the scan component DB 843 and the print component DB 844.

Each time a scanner job, a print job, and associated document information is generated, a scan job DB 847, a print job DB 848, a scan document DB 849 and a print document DB 850 are dynamically obtained and initialized by the scanner manager 274 and the printer manager 276, and the setting up of necessary items is performed.

Before the scanning process or the printing process is started, the scanner manager 274 or the printer manager 276 reads necessary data from the individual DBs. When the process is completed, the individual DBs are released.

It should be noted that since a job includes, at the least, the information for one document, a plurality of document DBs may be obtained for a specific job.

A soft counter 851 is used to store event information received from the scanner manager 274 and the printer manager 276.

An event table 852 is a counter table for recording the number of times the scanning operation and the printing operation have been performed.

In the DIS 831, an ID (event ID) for event information received from the scanner manager 274 or the printer manager 276 is determined in advance.

Specifically, the event information transmitted by the scanner manager 274 includes the state shift of the scanner 133, the scanning end, and various error information items. The event information transmitted by the printer manager 276 includes the state shift of the printer 134, the printing end, and error information, such as a paper jam and an open paper cassette. The event ID is determined in order to identify these types of event information.

When the event information is received from the scanner manager 274, the DIS 831 registers detailed data associated with the event information in the event table 852, as needed. When the release of event information is designated by the scanner manager 274, the DIS 831 deletes, from the event table 852, the event ID and detailed data for the event information that has been designated.

When event polling is performed by the scanner manager 274, the DIS 831 refers to the event table 852 and returns, to the scanner manager 274, the event ID and the detailed data for an current event. When there is no currently occurring event, a message to that effect is transmitted to the scanner manager 274.

When event information indicating the scanning end is received from the scanner manager 274, the DIS 831 updates a count value held by the soft counter 851 for the scanning operation. The counting process is performed by using software, and the count value is updated in nonvolatile memory, such as a backup memory or an HDD, in order to prevent the loss of the count value in the event of a sudden, unexpected shutdown.

Since the same process that is performed for the scanner manager 274 is performed upon the receipt of the event information and the release of the event information from the printer manager 276, no detailed explanation for this process will be given.

{Scanning Processing}

Figure 63:
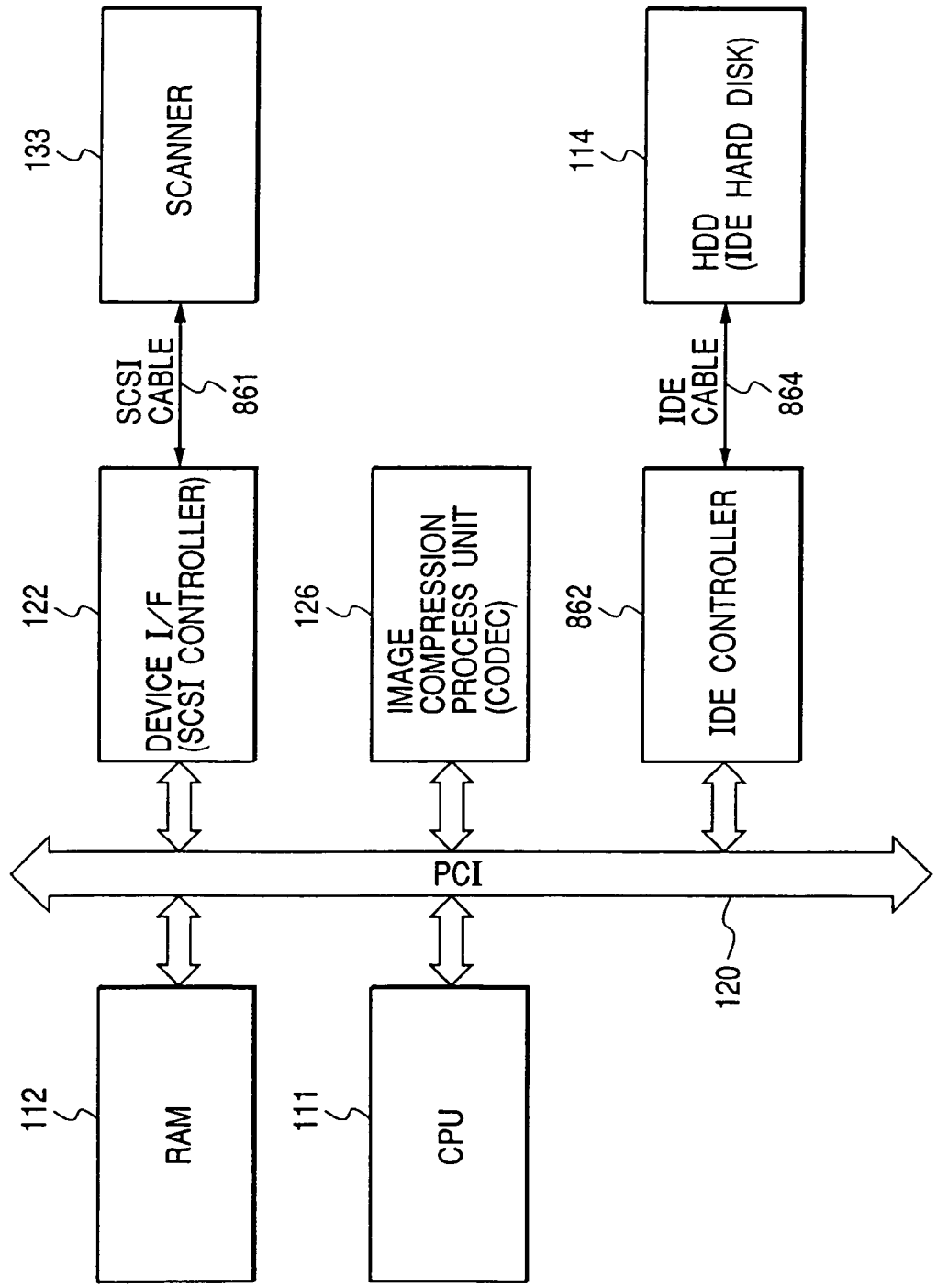
FIG. 63 is a block diagram illustrating the arrangement of devices employed for the scanning operation performed by the image processing apparatus.

FIG. 63 is a diagram showing the arrangement of a section in the image processing apparatus 100 in FIG. 1 that is related to the scanning processing.

As shown in FIG. 63, during the scanning processing data are exchanged via the image bus 120 by the RAM 112, the CPU 111, the scanner 133, the image compression processor 126 and the HDD 114.

To simplify the explanation, the image bus I/F 115 (see FIG. 1), which is provided between the image bus 120 and the system bus 119 that connects the CPU 111, the RAM 112 and the HDD 114, is not shown in FIG. 63.

In FIG. 63, the scanner 133 is a scanner function unit, for the image processing apparatus 100, having a composite function that includes the scanner function and the printer function. However, the apparatus may include only the scanner function.

A PCI bus is employed as the image bus 120, and the HDD 114 conforms to the IDE (Integrated Device Electronics) standards.

A SCSI I/F is employed as the device I/F 122. Thus, the scanner 133 is connected to the device I/F 122 by a SCSI cable 861.

Since the HDD 114 conforms to the IDE standards, it is connected via an IDE controller 862 to the image bus 120. The HDD 114 and the IDE controller 862 are connected together by an IDE cable 864.

With the above arrangement, the scanning processing is initiated when the CPU 111 executes a program having the software structure shown in FIG. 64.

In FIG. 64, the job manager 269 employs the functions explained while referring to FIGS. 12 and 61 to sort and store a request received from an application. The DIS 831 also employs the function explained while referring to FIG. 61 to store parameters required for the scanning process at an application level. The job manager 269 and the DIS 831 store a request received from the application, and the parameters in the RAM 112.

A scan operation management unit 871 obtains information required for a scan operation from the job manager 269 and the DIS 831.

Figure 65A:
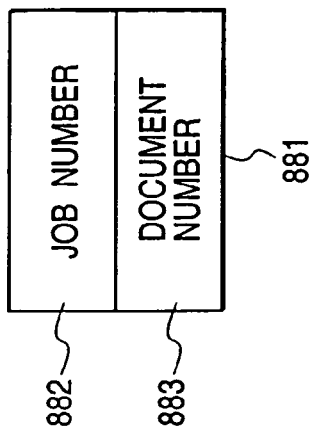
FIGS. 65A and 65B are diagrams for explaining the contents of the data used to manage the scanning operation.
Figure 65B:
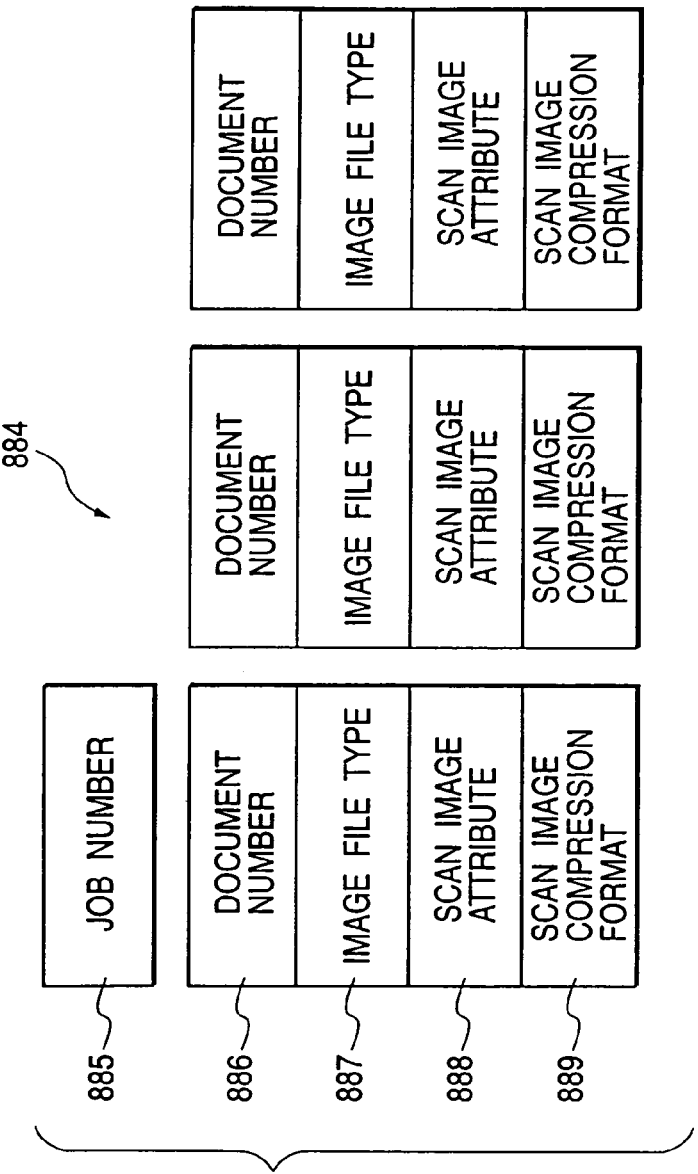

Specifically, the scan operation management unit 871 receives, from the job manager 269, table data 881 that includes a job number 882 and a document number 883, as shown in FIG. 65A. Then, based on the job number 882 and the document number 883, the scan operation management unit 871 receives scan parameter data 884 from the DIS 831. As shown in FIG. 65B, the scan parameter data 884 includes a job number 885, and a document number 886 and its associated scan parameters, such as an image file type 887, a scan image attribute 888 and a scan image compression format 889. As a result, the scanning process is performed based on the scanning condition requested by the application.

The scan operation management unit 871 transmits the obtained scan parameter data 884 to a scan sequence control unit 872 in order, and in correspondence with the document numbers.

The scan sequence control unit 872 controls the device I/F 122 (SCSI I/F) in accordance with the contents of the scan image attribute 888 that is included in the scan parameter data 884 received from the scan operation management unit 871.

Therefore, a SCSI control command is transmitted by the device I/F 122 (SCSI I/F), which is connected to the image bus 120, to the scanner 133 via the SCSI cable 861. In accordance with the received SCSI control command, the scanner 133 scans a document positioned in the previously described manner. The image data (document data) obtained by scanning are transmitted via the SCSI cable 861 to the device I/F 122 (SCSI I/F), and are stored in the RAM 112 via the image bus 120 (PCI bus).

When the scanning by the scanner 133 and the storing of image data in the RAM 112 are completed, the scan sequence control unit 872 issues a request to a compression/decompression control unit 873 for the compression, in accordance with the scan image compression format 889 that is included in the scan parameter data 884, of image data stored in the RAM 112.

Upon receipt of the request from the scan sequence control unit 872, the compression/decompression control unit 873 employs the image compression processor 126 (CODEC) connected to the image bus 120 (PCI bus) to compress the image data in the RAM 112 in accordance with the contents of the scan image compression format 889.

The compression/decompression control unit 873 stores again the obtained image data in the RAM 112.

When the compression by the compression/decompression control unit 873 and storing of compressed image data in the RAM 112 are completed, the scan sequence control unit 872 issues a request to a file system 874 to file the compressed image data in the RAM 112 in accordance with the image file type 887 included in the scan parameter data 884.

Upon receiving the request from the scan sequence control unit 872, the file system 874 transmits the image data in the RAM 112, via the IDE controller 862, to the HDD (IDE HDD) 114 that is connected to the image bus 120. Thus, the image data are filed in accordance with the image file type 887.

When the filing by the file system 874 (transmission of image data to the HDD 114) is completed, the scan sequence control unit 872 ascertains that the scanner 133 has scanned one sheet of the document.

At this time, if there is still a document sheet to be scanned by the scanner 133 and if there is still an application request from the job manager 269, the scan operation management unit 871 again receives the scan parameter data 884 from the DIS 831, and transmits them to the scan sequence control unit 872. Thus, the scanning of the second document sheet is performed in the same manner.

If there are no more document sheets to be scanned by the scanner 133, and if there is no remaining application request from the job manager 269, the scan sequence control unit 872 ascertains that all the document sheets positioned in the scanner 133 have been processed, and issues a scan end notification to the scan operation management unit 871.

{Printing Processing}

FIG. 66 is a diagram showing the arrangement of a section in the image processing apparatus 100 in FIG. 1 that is related to the printing processing.

As shown in FIG. 66, during the printing processing, data are exchanged via the image bus 120 by the RAM 112, the CPU 111, the printer 134 and the image compression processor 126.

To simplify the explanation, the image bus I/F 115 (see FIG. 1), which is provided between the image bus 120 and the system bus 119 that connects the CPU 111 and the RAM 112, is not shown in FIG. 66.

In FIG. 66, the printer 134 is a printer function unit for the image processing apparatus 100 that has a composite function, which includes the scanner function and the printer function. However, the apparatus may include only the printer function.

A PCI bus is employed as the image bus 120.

An engine I/F is employed as the device I/F 122. Thus, the printer 134 is connected to the device I/F 122 by an engine I/F cable 891.

The engine I/F includes a DPRAM on the board. Thus, the device I/F 122 that employs the engine I/F employs the DPRAM to set the parameters for the printer 134, to read the state of the printer 134, and to exchange control commands with the printer 134.

The engine I/F also includes a video controller on the board. Thus, the device I/F that employs the engine I/F transmits document data (image data) developed on the image bus 120 (PCI bus) via the engine I/F cable 891 to the printer 134, in synchronization with a VCLK (Video Clock) and an HSYNC that are transmitted by the printer 134 via the engine I/F cable 891.

An explanation will now be given for the setting of the parameters at the printer 134 via the DPRAM in the device I/F 122 (the engine I/F).

First, as is described above (see FIG. 61), when the CPU 111 issues a printing instruction to the control API 268, the control API 268 transmits it as a job to the job manager 269 at a controller level. The job manager 269 stores the received job to the DIS 831, and instructs the printer manager 276 to start the job.

Upon receiving the job from the job manager 269, the printer manager 276 reads, from the DIS 831, the information required for the execution of the job. At this time, the printer manager 276 sets the obtained information in the printer 134 via the device I/F (engine I/F) 122 and the internal DPRAM.

Figure 67:
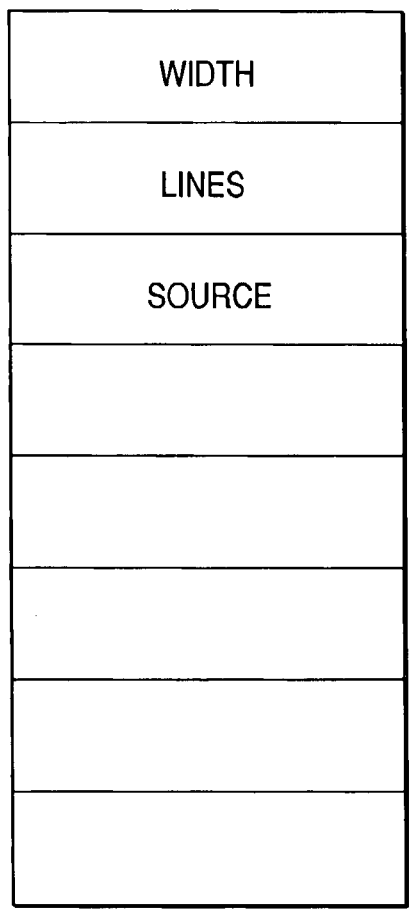
FIG. 67 is a diagram for explaining setup entries when an engine I/F serves as the device I/F.
Figure 68:
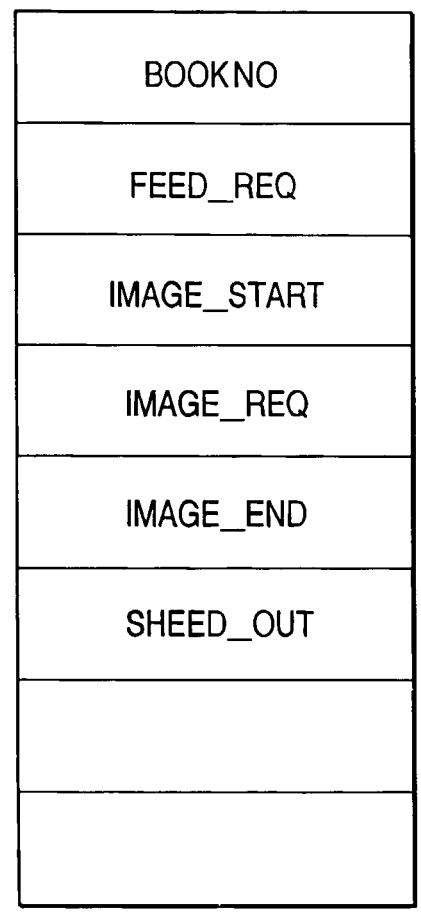
FIG. 68 is a diagram for explaining the entries in the DRAM in the engine I/F.

FIG. 67 is a diagram showing the items set for the device I/F 122 (engine I/F), and FIG. 68 is a diagram showing the items that are set in the internal DPRAM, a control command and a status command.

Specifically, assume that a current job is the printing of one copy of two pages of non-compressed binary images on letter size (11"×8.5") sheets, and that the printer 134 has a resolution of 600 dpi. First, when the job is received, the printer manager 276 obtains the number of bytes WIDTH (hereinafter referred to as an image width) for the width of an image (the width on the 8.5" side) by calculating:

$$WIDTH=8.5\times600/8\approx630(bytes).$$

Then, the printer manager 276 obtains the number of lines LINES by calculating $$LINES=11\times600=6600(lines).$$

The printer manager 276 sets, in the device I/F 122 (the engine I/F), the image width WIDTH, the line count LINES, and an address SOURCE on the image bus (PCI bus) 120 at which is stored image data for the first page, as shown in FIG. 67.

At this time, although the device I/F 122 (the engine I/F) is prepared to output image data, it does not output image data because the VCLK and the HSYNC are not output by the printer 134.

As shown in FIG. 68, the printer manager 276 sets a "1" in the address BookNo of the DPRAM in the device I/F 122 (the engine I/F). The BookNo reflects the number of output copies.

Similarly, the printer manager 276 sets a "1" at the address FEED-REQ in the DPRAM. The FEED-REQ indicates a request has been submitted to supply paper for the first page.

The printer manager 276 examines the address IMAGE_START in the DPRAM while waiting for a request for image data from the printer 134. A request command from the printer 134 for image data is set in the IMAGE_START.

When an image data request is received from the printer 134 via the DPRAM, the printer manager 276 sets to on a command for the start of the output of image data at the address IMAGE_START in the DPRAM, and sends a notification to that effect to the printer 134.

Upon receiving the notification, the printer 134 begins to output the HSYNC to the device I/F 122 (the engine I/F).

The device I/F 122, which has been waiting for the HSYNC, reads image data for the first page from the image bus 120 (PCI bus) in accordance with the address SOURCE set by the printer manager 276, and outputs the data to the printer 134.

The printer 134 prints the received image data on a prepared paper sheet. When the printer 134 detects the rear edge of the paper sheet, it sets to on a command indicating the end of the printing for the first page at the address IMAGE_END in the DPRAM, and sends a notification to that effect to the printer manager 276.

The printer 134 discharges the printed sheet for the first page, and sets to on a paper discharge command at the address SHEET OUT in the DPRAM.

Upon receiving from the printer 134 the print end notification for the first page via the DPRAM, the printer manager 276 calculates the image width WIDTH and the line count LINES for the second page. Then, the printer manager 276 sets, in the device I/F 122 (the engine I/F), the image WIDTH, the line count LINES and the address SOURCE on the image bus 120 (PCI bus) at which the image data for the second page are stored.

Thereafter, the image data for the second page are printed in the same manner as were the data for the first page.

Figure 69:
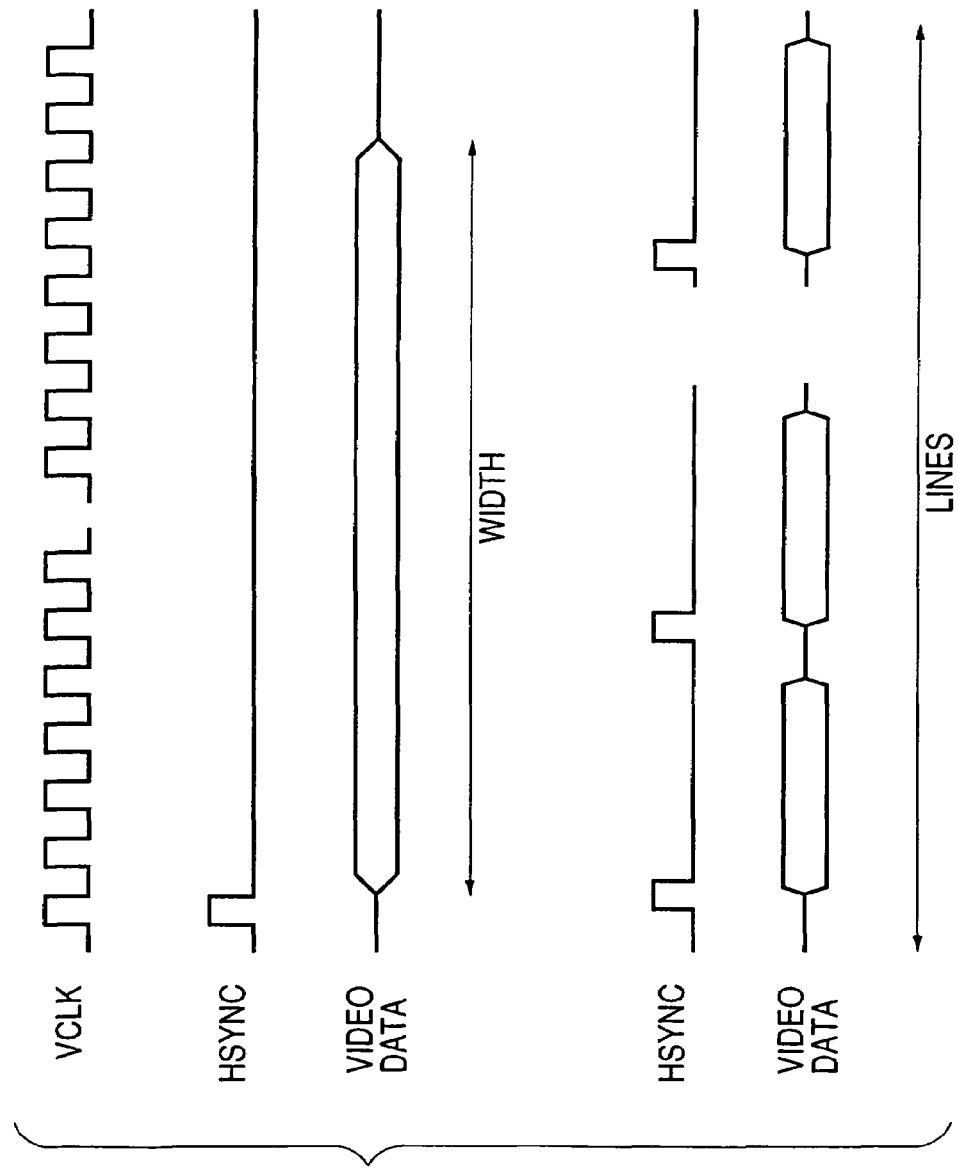
FIG. 69 is a diagram for explaining the timing of the printing operation.

The timing for the printing processing is shown in FIG. 69.

As shown in FIG. 69, the VCLK is constantly output by the printer 134.

The HSYNC is output in synchronization with the start of the printing of one line by the printer 134. That is, the HSYNC is output to the printer 134 by the printer manager 276 when the start of the output of image data is instructed.

The device I/F 122 (the engine I/F), which receives the VCLK and HSYNC, employs the internal video controller to read, from the image bus 120 (PCI bus), image data having the image width WIDTH set by the printer manager 276, in accordance with the address SOURCE that is also set by the printer manager 276. The device I/F 122 outputs the obtained image data as a video signal (Video Data) to the engine I/F cable 891.

The device I/F 122 (engine I/F) repeats the above process the number of times that is equivalent to the line count LINES, which is also set by the printer manager 276.

Thereafter, an interrupt is issued by the printer 134 for the printing end (IMAGE_END) for the first page.

This completes the explanation given for the DIS used for the image processing apparatus 100, and the associated scanning and printing processing.

The user authentication process that is the most important feature of the image processing apparatus 100 will now be described.

In order to simplify the explanation, the image processing apparatus 100 is defined as a local device on the transmission side, and apparatuses connected to the image processing apparatus 100 via a network, e.g., the printer 238 in FIG. 11 and the image processing apparatus 100', which has the printer function, are defined as remote devices on the reception side. An explanation will be given for an example where image data scanned by the local device are printed by the remote device.

Figure 70:
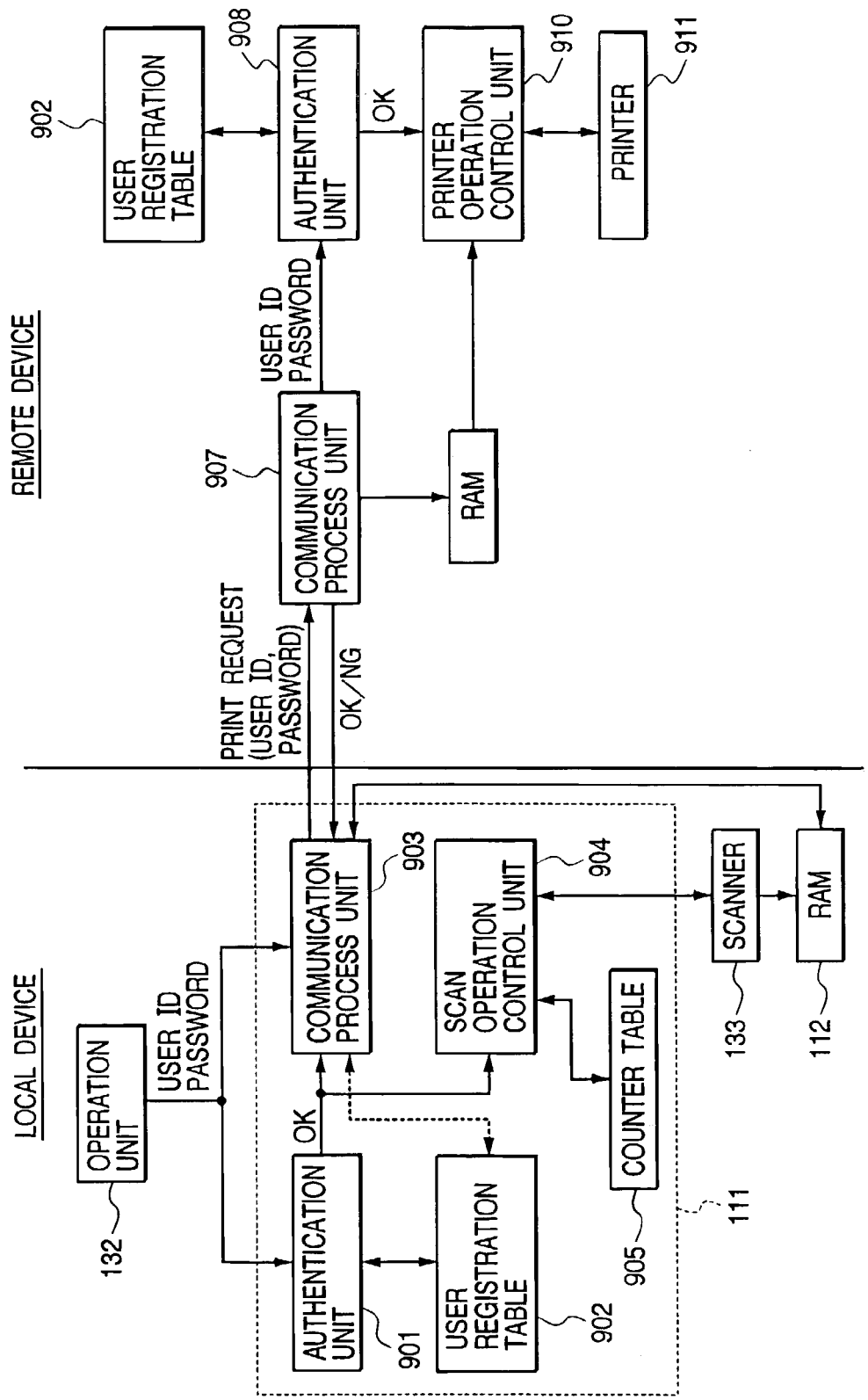
FIG. 70 is a block diagram illustrating the arrangement of the devices employed for the user authentication process performed by the image processing apparatus.

FIG. 70 is a diagram showing the essential portions of the local device and the remote device.

The same reference numerals as are in FIG. 1 are also used in FIG. 70 to denote corresponding components, and no detailed explanation for them will be given.

First, as shown in FIG. 70, a user registration table 902 is provided for both the local device and the remote device.

As shown in FIG. 71, the user registration table 902 includes an ID number field 921 for storing user ID numbers (user IDs); a password field 922 for storing passwords; a user name field 923 for storing user names using character string data; and an additional information field 924 for using character string data to store information concerning users.

A user ID is a combination of identification data for the division of an organization to which a user belongs and personal identification data. With the user ID, data totalization can be performed for each person or for each division.

The password is encrypted using a predetermined cryptography process to prevent the password from being easily obtained from the user registration table 902. Therefore, during user authentication processing, password data are decrypted or an input password is encrypted, as needed, in order to determine whether the two passwords match.

Only data for a user who is permitted to use a device are registered in the user registration table 902 by the manager of the pertinent device.

When, for example, a user desires to employ the local device or the remote device, the user submits his or her name and password to the manager of the pertinent device, and requests that the data be registered in a vacant data entry location in the user registration table 902. The manager registers the user data in a vacant data entry location in the table 902. If there is no vacancy in the user registration table 902, user data that is not required are deleted from the currently registered data in the user registration table 902, or the number of entries in the table 902 is increased, so as to register the user data.

A counter table 905 is provided for the local device. For each user registered in the user registration table 902, the counter table 905 includes a scanning counter for counting the number of scanning processes performed by the scanner 133, a printing counter for counting the number of printing processes performed by the remote device, and user device use information.

Figure 72:
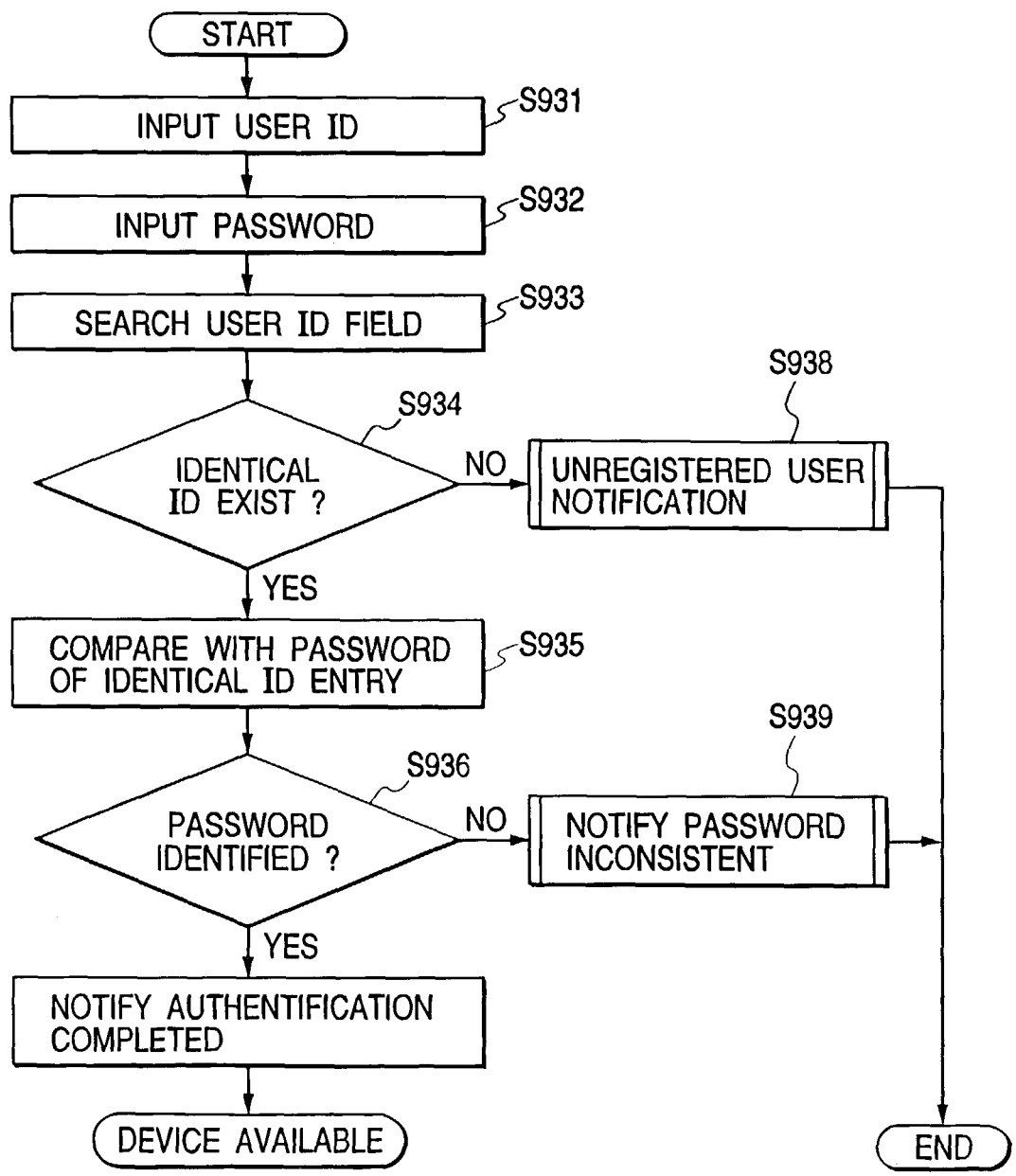

FIG. 72 is a flowchart showing the user authentication processing employed when the local device performs a log-on operation. The user authentication processing will now be described while referring to FIGS. 70 to 72.

First, the user of the local device confirms that the ID input screen 311 in FIG. 15 is displayed on the LCD display device 171 (see FIG. 3) of the operation unit 132, and that the log-on operation is enabled. Then, on the ID input screen 311, the user enters his or her ID and password (steps S931 and S932).

Subsequently, the CPU 111 determines that the user ID and password have been input by the user at steps S931 and S932.

The CPU 111 then employs an authentication unit 901 to obtain the input user ID from the ID number field 921 in the user registration table 902, and specifies the entry of the user (step S933).

Following this, the CPU 111 determines whether an ID that matches the user ID that was input is present in the ID number field 921 (step S934).

If a match for the user ID is not obtained, the CPU 111 ascertains that the user does not have permission to use the pertinent device, and displays the error screen 821 in FIG. 60 on the LCD display device 171 of the operation unit 132 to notify the user no match was found (step S938).

Thereafter, the CPU 111 terminates the processing, and again enables the log-on operation by displaying the ID input screen 311 on the LCD display device 171 of the operation unit 132.

If at step 934 (step S934) a match for the user ID is found, the CPU 111 employs the authentication unit 901 to compare the password that was input with a password in the password field 922 in the user entry that is specified at step S935 (step S935).

The CPU 111 then determines whether the passwords match (step S936).

If the passwords do not match, the CPU 111 ascertains that the user has not obtained permission to use the pertinent device, and to notify the user that no match was found, displays the error screen 821 in FIG. 60 on the LCD display device 171 of the operation unit 132 (step S939).

Thereafter, the CPU 111 terminates the processing, and again enables the log-on operation by displaying the ID input screen 311 on the LCD display device 171 of the operation unit 132.

If at step S936 a password match is found, the CPU 111 shifts the ID input screen 311 on the LCD display device 171 of the operation unit 132 to the operation screen 301 with which the device can accept normal entry from the user.

Therefore, the user can employ this device, and the log-on operation, including user authentication, is terminated.

Thereafter, on the operation unit 132, the user performs the following operation.

First, the ID input screen 311 is changed to the operation screen 301 on the LCD display device 171 of the operation unit 132.

The user depresses the main tab "SEND" 303 at the top of the operation screen 301 to transmit image data via the network to the remote device. Then, the SEND main screen 351 in FIG. 23 appears on the LCD display device 171 of the operation unit 132.

On the SEND main screen 351, the user designates an address for an object device (a remote device), inputs a message for the destination, and designates a transmission method.

If the address of the object device (the remote device) is not included in the address display portion 352 of the SEND main screen 351, the user depresses the address book button 358. Then, the address book screen 391 in FIG. 26 appears on the LCD display device 171 of the operation unit 132.

The user searches for or adds a destination to the address book screen 391. At this time, the destination can be deleted on the address book screen 391, or the detailed information screen 401 in FIG. 27 can be displayed.

The user depresses the scanner check button 365 on the SEND main screen 351 to set the condition for the scanning operation. Then, the scan setting screen 591 in FIG. 43 appears on the LCD display device 171 of the operation unit 132.

Icons corresponding to various images, such as a photographic image (Photo), a character (Text), a photograph and character mixture (Photo Text), a newspaper (Draft) and a default value (Not Defined), are displayed in the preset mode select display box 592 on the scan setting screen 591.

The user selects one optimal icon for a document to be scanned. As a result, the resolution and the optimal scan mode for the document (a binary reading mode or a multi-valued reading mode) are automatically designated.

To change the resolution and the scan mode that are automatically set, the user depresses the resolution select button 599 on the scan setting screen 591. Then, the resolution list 611 in FIG. 44 is displayed on the LCD display device 171 of the operation unit 132. Thereafter, the user selects a desired resolution from the list 611.

Furthermore, when the user depresses the mode select button 601 on the scan setting screen 591, the scan mode list 621 in FIG. 45 is displayed on the LCD display device 171 of the operation unit 132. Thereafter, the user selects a desired mode from the list 621.

As is described above, the user can designate the resolution and the scan mode separately.

Furthermore, to set the paper size for a document to be scanned, the user depresses the paper size select button 597 on the scan setting screen 591. Since the paper size list 631 in FIG. 46 is displayed on the LCD 171 of the operation unit 132, the user can select an appropriate paper size for the document.

In addition, to adjust the density, the user manipulates two buttons adjacent to the display box 602 on the scan setting screen 591, and sets a desired density.

Figure 73:
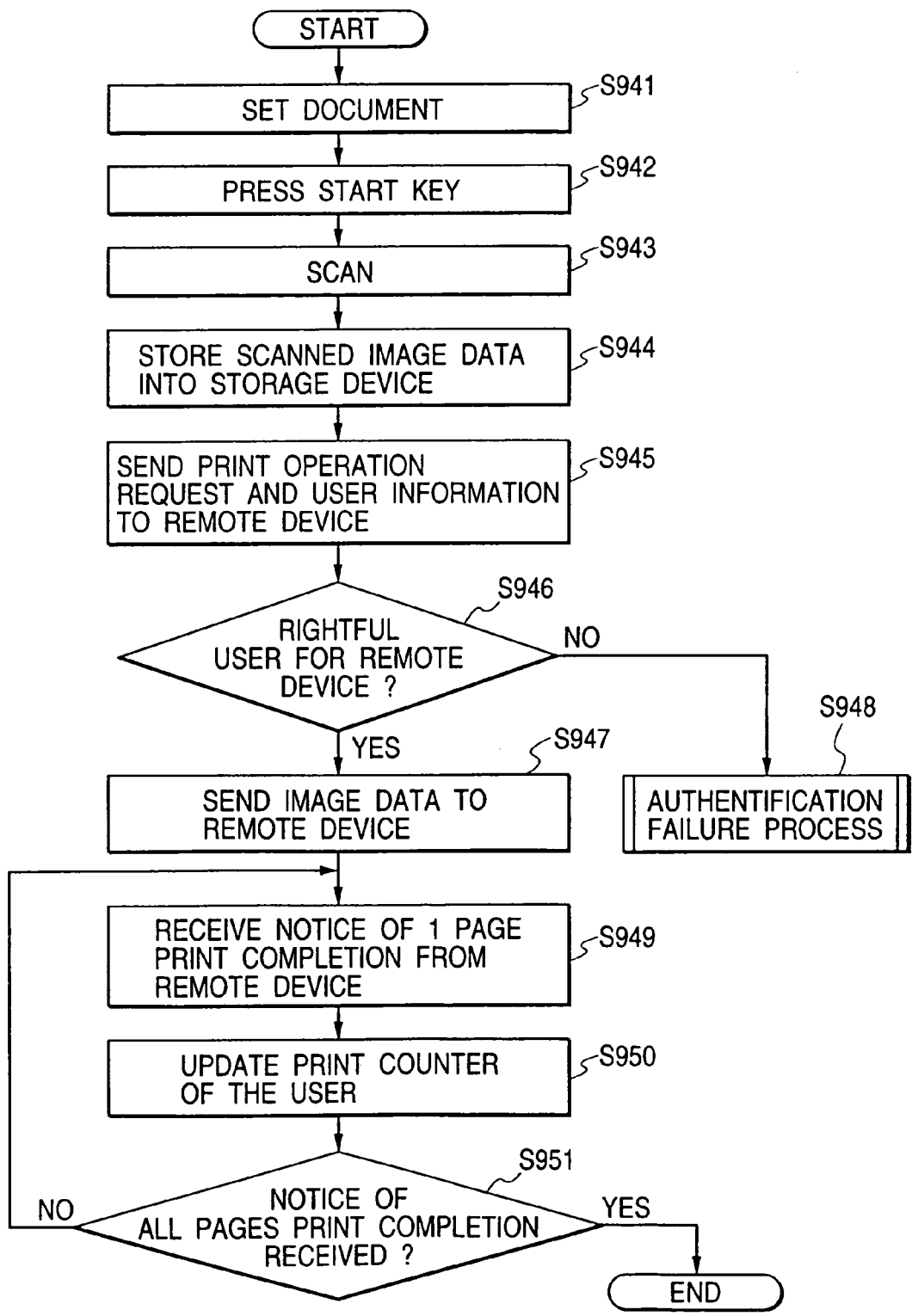
FIG. 73 is a flowchart for explaining the processing performed following a log-on, beginning with the scanning operation and ending with the printing operation.

FIG. 73 is a flowchart showing the processing performed after the user has set the information for a transmission destination device (a remote device) and information for the document to be scanned. In this example, the document that is scanned is printed by the remote device.

First, the user places a document on the document table or the automatic document feeder of the scanner 133 (step S941).

The user then depresses the start button 366 on the SEND main screen 351 (step S942).

When the CPU 111 detects the manipulations at steps S941 and S942, the CPU 111 permits the scan operation control 904 to instruct the scanner 133 to begin to scan the document (step S943).

Thus, the scanner 133 starts the scanning, and stores the obtained image data in the RAM 112 each time the scanning of one page of the document is completed (step S944).

At the same time, the CPU 111 permits the scan operation control unit 904 to search the counter table 905 and to obtain the scan counter corresponding to the user ID of the user who is employing the local device, and to update the value of the scan counter and the device use information related to the scan counter.

The CPU 111 permits the communication process unit 903 to issue a print request to the remote device (step S945).

The print request includes user information (information for a user who is employing the local device), such as a user ID and a password required for the user authentication at the remote device.

The user information included in the print request can also be read from the user registration table 902 and can be automatically added to the print request. When more correct user authentication is to be performed by the remote device, the input of the user information at the operation unit 132 can be requested of the user of the local device, and the input user information can be added to the print request.

Upon receipt of the print request, the remote device performs the user authentication process by using the user information in the print request and in the user registration table 902 of the remote device.

Specifically, since an authentication unit 908 in the remote device has the same function as the authentication unit 901 of the local device, the authentication unit 908 determines in the same manner as in FIG. 72 whether a user ID and a password that match those in the print request are present in the user registration table 902 (step S946).

If it is ascertained that the user who issued the print request at the local device can obtain permission to use the remote device, the remote device permits a communication process unit 907 to notify the local device that the print request is accepted.

If the user who issued the print request at the local device is not permitted to use the remote device, the remote device permits the communication process unit 907 to notify the local device that the print request was not accepted (step S948).

Only when the notification that the print request has been accepted is received, does the local device perform the following process.

The CPU 111 of the local device employs the communication process unit 903 to transmit, to the remote device, image data stored in the RAM 112 (step S947).

The remote device employs the communication process unit 907 to receive the image data from the local device, and temporarily stores them in a RAM 913. The remote device then employs a printer operation control unit 910 to print the image data in the RAM 913 using a printer 911. At this time, each time data for one page is printed by the printer 911, the remote device notifies the local device of the print end for one page. This notification includes, as additional information, the paper size used by the printer 911.

The CPU 111 of the local device employs the communication process unit 903 to receive, from the remote device, the notification of the print end for one page (step S949). A scan operation control unit 904 searches the counter table 905 and obtains the print counter that corresponds to the user ID of the user who is employing the local device, and updates the value of the print counter (step S950).

The print counter is provided for each of the various paper sizes, and the value of the print counter that corresponds to the paper size used by the remote device is updated.

The CPU 111 permits the communication process unit 903 to determine whether the print end notification for all the pages has been received from the remote device (step S951).

If the print end notification for all the pages has been received, the printing processing is terminated. If not, program control returns to step S949 and the above described processing is repeated.

Figure 74:
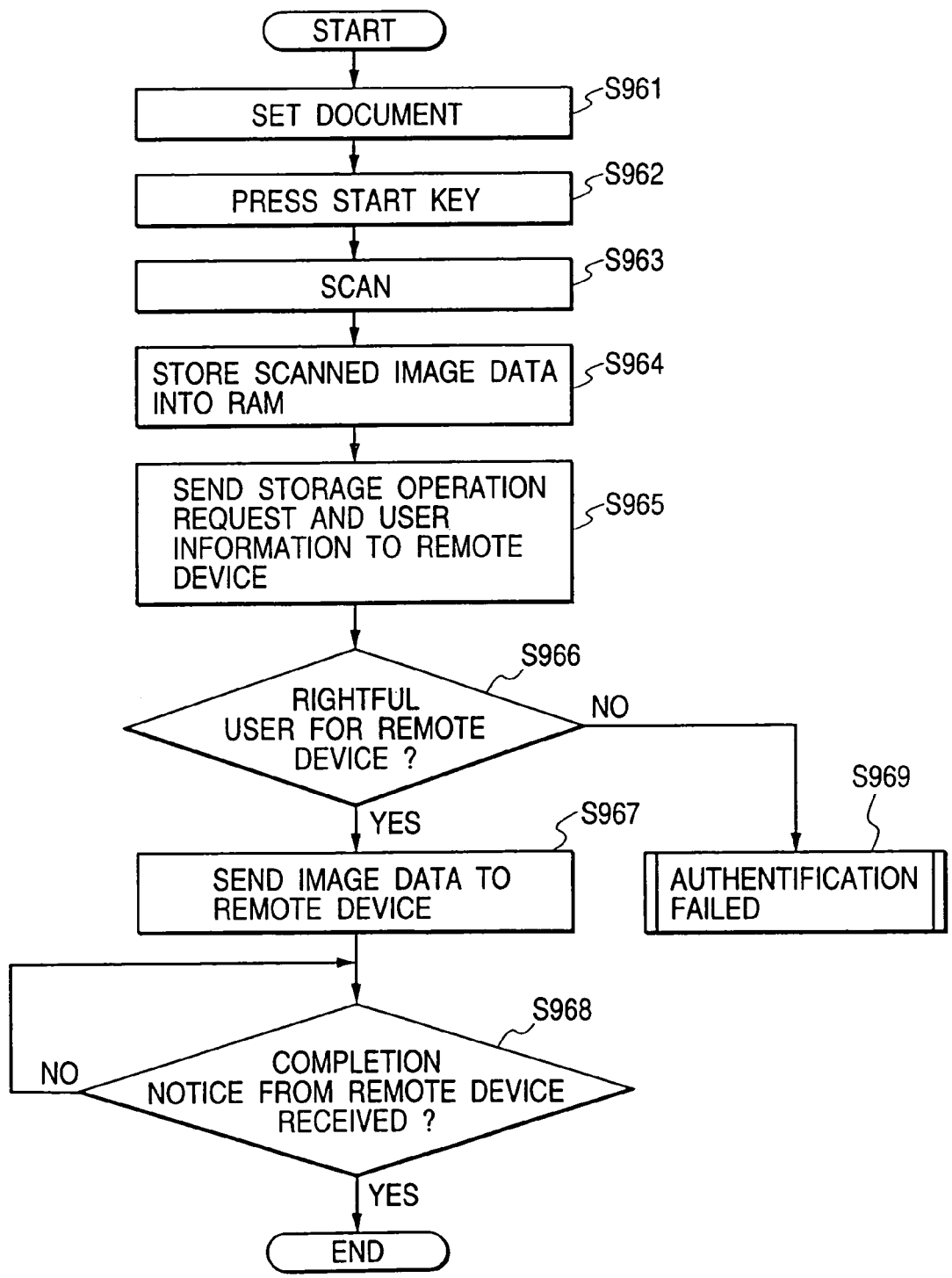
FIG. 74 is a flowchart for explaining the processing following a log-on, beginning with the scanning operation and ending with the storage operation.

FIG. 74 is a flowchart showing the processing performed after the user has set the information for a transmission destination device (remote device) and the information for the document to be scanned. In this example, the document that is scanned is stored in the storage area of the remote device.

First, the user places a document on the document table or in the automatic document feeder of the scanner 133 (step S961).

The user then depresses the start button 366 on the SEND main screen 351 (step S962).

When the CPU 111 detects the manipulations at steps S961 and S962, the CPU 111 permits the scan operation control 904 to instruct the scanner 133 to begin to scan the document (step S963).

Thus, the scanner 133 starts scanning and stores the obtained image data in the RAM 112 each time the scanning of one page of the document is completed (step S964).

At the same time, the CPU 111 permits the scan operation control unit 904 to search the counter table 905 and to obtain the scan counter that corresponds to the user ID of the user who is employing the local device, and to update the value of the scan counter and the device use information related to the scan counter.

The CPU 111 permits the communication process unit 903 to issue a storage request to the remote device (step S965).

The storage request includes user information (information for a user who is employing the local device), such as a user ID and a password required for the user authentication at the remote device. In addition, parameters can be designated for the transmission of data to the hard disk of the remote device that is selected on the hard disk setting screen 541.

The user information included in the storage request can also be read from the user registration table 902 and can be automatically added to the storage request. When more correct user authentication is to be performed by the remote device, the input of the user information at the operation unit 132 can be requested of the user of the local device, and the input user information can be added to the storage request.

Upon receipt of the storage request, the remote device performs the user authentication process by using the user information in the storage request and the user registration table 902 of the remote device.

Specifically, since the authentication unit 908 in the remote device has the same function as the authentication unit 901 of the local device, the authentication unit 908 determines in the same manner as in FIG. 72 whether a user ID and a password that match those in the storage request are present in the user registration table 902 (step S966).

If it is ascertained that the user who issued the storage request from the local device has obtained permission to use the remote device, the remote device permits the communication process unit 907 to notify the local device that the storage request has been accepted.

If the user who issued the storage request from the local device is not permitted to use the remote device, the remote device permits the communication process unit 907 to notify the local device that the storage request has not been accepted (step S969).

Only when the notification that the storage request is accepted is received, the local device performs the following process.

The CPU 111 of the local device employs the communication process unit 903 to transmit, to the remote device, image data stored in the RAM 112 (step S967).

The remote device employs the communication process unit 907 to receive the image data from the local device, and stores them in a designated area of the hard disk.

The CPU 111 permits the communication process unit 903 to determine whether the end notification of storage of image data is received from the remote device (step S968).

If the storage end notification is received, the printing processing is terminated. If not, program control returns to step S968 and the above described processing is repeated.

Figure 75:
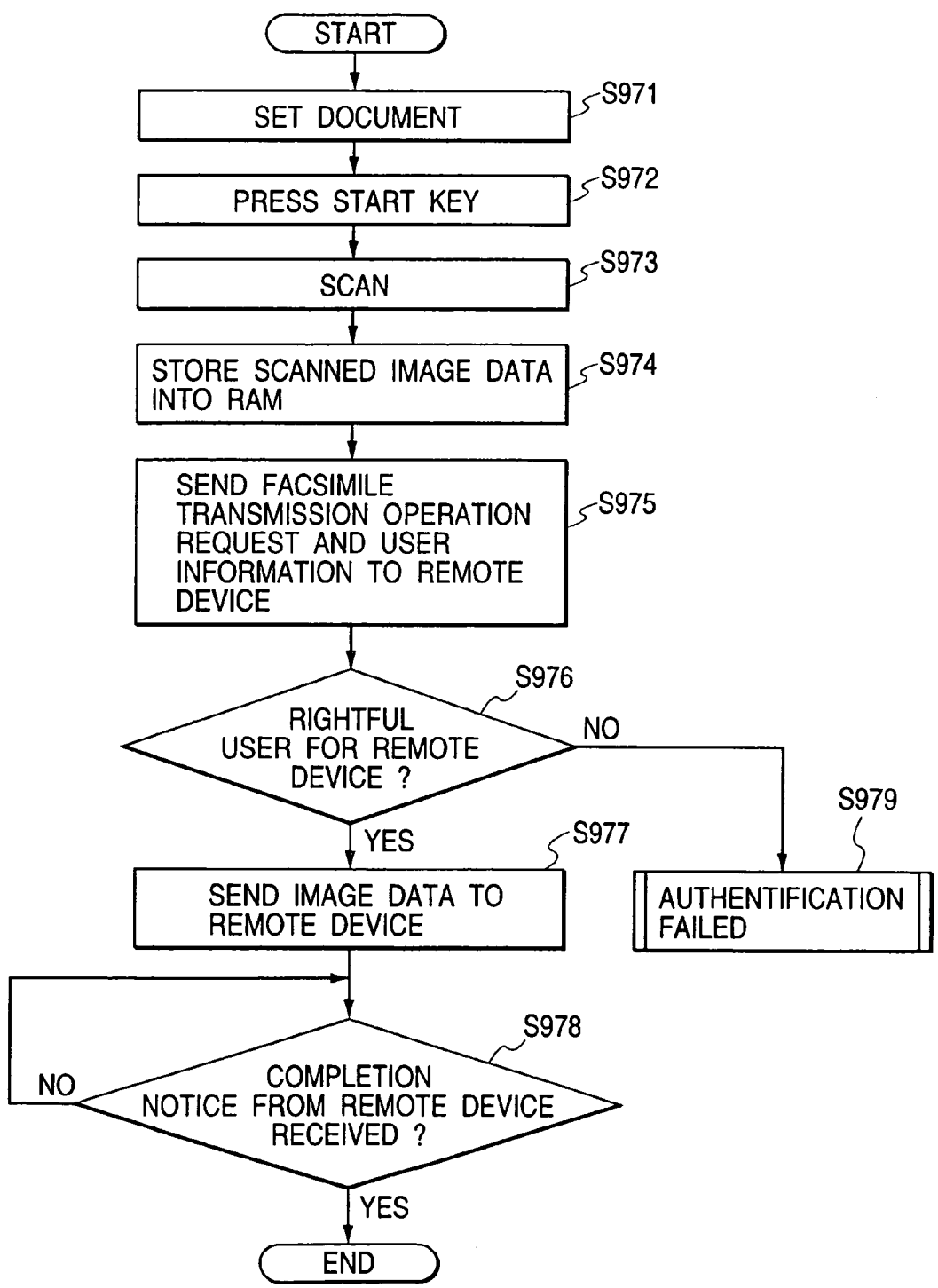
FIG. 75 is a flowchart for explaining the processing following a log-on, beginning with the scanning operation and ending with the facsimile transmission operation.

FIG. 75 is a flowchart showing the processing performed after the user has set the information for a transmission destination device (remote device) and information for the document to be scanned. In this example, the facsimile transmission function of the remote device is employed to transmit the obtained document data via the PSTN or the ISDN to an object facsimile machine.

First, the user places a document on the document table or the automatic document feeder of the scanner 133 (step S971).

The user then depresses the start 366 on the SEND main screen 351 (step S972).

When the CPU 111 detects the manipulations at steps S971 and S972, the CPU 111 permits the scan operation control 904 to instruct the scanner 133 to begin to scan the document (step S973).

Thus, the scanner 133 starts scanning, and stores obtained image data in the RAM 112 each time one page of the document is scanned (step S974).

At the same time, the CPU 111 permits the scan operation control unit 904 to search the counter table 905 and obtain the scan counter that corresponds to the user ID of the user who is employing the local device, and to update the value of the scan counter and the device use information concerning the scan counter.

The CPU 111 permits the communication process unit 903 to issue a facsimile transmission request to the remote device (step S975).

The facsimile transmission request includes user information (information for a user who is employing the local device), such as a user ID and a password required for the user authentication at the remote device.

The user information included in the facsimile transmission request can also be read from the user registration table 902 and be automatically added to the facsimile transmission request. When more correct user authentication is to be performed by the remote device, the input of the user information at the operation unit 132 can be requested to the user of the local device, and the input user information can be added to the facsimile transmission request.

Upon receipt of the facsimile transmission request, the remote device performs the user authentication process by using the user information in the facsimile transmission request and the user registration table 902 of the remote device.

Specifically, since the authentication unit 908 in the remote device has the same function as the authentication unit 901 of the local device, the authentication unit 908 determines in the same manner as in FIG. 72 whether the user ID and the password that match those in the facsimile transmission request are present in the user registration table 902 (step S976).

If it is ascertained that the user who issued the facsimile transmission request from the local device obtains permission to use the remote device, the remote device permits the communication process unit 907 to notify the local device that the facsimile transmission request is accepted.

If the user who issued the facsimile transmission request from the local device is not permitted to use the remote device, the remote device permits the communication process unit 907 to notify the local device that the facsimile transmission request is not accepted (step S979).

Only when the notification that the facsimile transmission request is accepted is received, the local device performs the following process.

The CPU 111 of the local device employs the communication process unit 903 to transmit, to the remote device, image data stored in the RAM 112 (step S977).

The remote device employs the communication process unit 907 to receive the image data from the local device, and transmits them by facsimile to a device designated by the local device.

The CPU 111 permits the communication process unit 903 to determine whether the end notification of transmission of image data is received from the remote device (step S978).

If the transmission end notification is received, the printing processing is terminated. If not, program control returns to step S978 and the above described processing is repeated.

In the examples in FIGS. 73, 74 and 75, first the document is scanned by the scanner 133 and then the authentication process is performed by the remote device. However, the authentication process may be first performed by the remote device, and when it is ascertained that the pertinent user is authorized, the scanning process may be performed.

As is described above, according to the embodiment, in the network including a local device and remote devices, the local device performs the user authentication process by using the user ID and the password input by a user. In addition, the local device transmits an operation request to a desired remote device together with the input user ID and password.

Upon receipt of the request, the remote device performs the user authentication process by using the received user ID and password. Only when the user is authorized, the remote device accepts the request from the local device.

With this arrangement, only the authorized user is permitted to use the local device and the remote devices on the network.

The present invention is not limited to the above embodiment. That is, the present invention can be applied not only to a scanner that is a local device and a printer that is a remote device, but also to copiers that serve as the local device and the remote device, or a scanner and a copier, or a monochrome copier having a color scanner and a color printer.

The objective of the present invention can also be implemented in the following manner: a storage medium in which software program code to implement functions of the host and the terminal in the above embodiment is loaded to a computer (a CPU or an MPU) in an apparatus or in a system, and the program code is read by the computer in the system or the apparatus.

In this case, the software program code accomplishes the functions of the above described embodiment. And the program code and means for supplying the program code to the computer, e.g., a storage medium on which such program code is recorded, constitute the present invention.

A storage medium for supplying such program code can be, for example, a ROM, a floppy disk, a hard disk, an optical disk, a magneto-optical disk, a CD-ROM, a CD-R, a magnetic tape, or a nonvolatile memory card.

In addition, the present invention also includes not only a case where the functions in the previous embodiment can be performed when program code is read and executed by the computer, but also a case where, according to an instruction in the program code, an OS (Operating System) running on the computer, or another application software program, interacts with the program code to accomplish the functions in the above embodiment.

Furthermore, the present invention includes a case where program code, read from a storage medium, is written in a memory that is mounted on a function expansion board inserted into a computer, or in a function expansion unit connected to a computer, and in consonance with a program code instruction, a CPU mounted on the function expansion board or the function expansion unit performs one part, or all of the actual processing in order to implement the functions in the above described embodiment.

As is described above, according to this embodiment, the user authentication process is performed by using user information (user ID) input by a user and registered information. Only when it is ascertained that the user is authorized, the user information (the user ID and the password) is transmitted to a remote device (a device connected across the network), together with an operation request that is issued to the remote device by the user.

Therefore, the remote device can employ the received user information and predetermined information that is registered in advance for users who can employ the remote device, and can determine whether the user who issued the request to the remote device is an authorized user (user authentication process). Only when the user is authorized, the remote device accepts the operation request and performs the associated operation.

Furthermore, in the embodiment, the local device performs the user authentication process by using the user information (the user ID and the password), which is received together with an operation request from the remote device, and registered information.

As a result, only when the user who issued the operation request is an authorized user, the local device can accept the operation request and perform the associated operation.

Specifically, assume that image data are obtained by the local device (the first device) having the scanner function, and are printed by the remote device (the second device) that has the printing function and that is connected via the network. First, when the user inputs the user ID and the password to the local device, the local device performs the user authentication by using the user ID, the password and information that is prepared in advance. When it is ascertained that the user is an authorized user, the local device begins the scanning process in accordance with an instruction entered by the user. At the same time, the local device transmits, across the network to the remote device, the input user ID and password together with the operation request that is issued to the remote device by the user.

The remote device performs the user authentication process by using the user ID and password received from the local device, and information that is prepared in advance. When the user at the local device who issued the operation request to the remote device is an authorized user, the remote device accepts the operation request from the local device, and prints data in accordance with the request.

With this arrangement, the remote device does not unconditionally accept the operation request from the local device and perform the requested operation, and can perform the operation only upon the receipt of a request from an authorized user. Further, as is described above, when the local device ascertains that the user is an authorized user and when the user issues an operation request to the remote device, the local device (which already has information required for user authentication) requests the authentication by the remote device. As a result, the input of authentication information by the user and an instruction to perform the authentication process are not required.

In the above described communication between the local device and the remote device, the status of the device (the results of the user authentication process) may be transmitted. In addition, if the local device requests that the user input detailed user information other than the user ID and the password, a more accurate user authentication process can be performed.

Therefore, according to the present invention, various devices on the network can be efficiently and accurately managed.

What is claimed is:

1. An image processing apparatus that performs an image processing service provided by a first operating instruction about image processing and a second operating instruction about image processing for a different image processing apparatus, comprising:

registration means for registering registration information for a user who is authorized to use said image processing apparatus;

input means for entering user information and the first operating instruction for said image processing apparatus, wherein the first operating instruction is an instruction for performing a scanning operation, and the second operating instruction is an instruction for performing a printing operation;

first authentication means for employing the registration information registered by said registration means and the user information entered by said input means to determine whether the first operating instruction for scanning is authorized for the user;

transmission means for, based on results obtained by said first authentication means, transmitting to the different image processing apparatus the second operating instruction and the user information entered by said input means;

second authentication means for obtaining from the different image processing apparatus results of an authentication process, performed for the user information received from said transmission means, to determine whether the second operating instruction for printing is authorized for the user on the different image processing apparatus; and determination means for employing the results obtained by said second authentication means to determine whether the user is to be permitted to use said image processing apparatus in conjunction with the different image processing apparatus to perform the first and second operating instructions of the image processing service, wherein when (a) said first authentication means determines that the first operating instruction for scanning is authorized for the user, and (b) said determination means determines that the user is permitted to use the second operating instruction for printing, the first operating instruction for scanning is performed by said image processing apparatus and the second operating instruction for printing is performed by the different image processing apparatus after the first operating instruction is performed.

2. An image processing apparatus according to claim 1, wherein the registration information and the user information each include at least a user ID and a password.

3. An image processing apparatus according to claim 1, further comprising:

scanner means for reading a document, wherein the second operating instruction is an instruction for printing image data read by said scanner means using a printer function of the different image processing apparatus.

4. An image processing apparatus according to claim 1, further comprising:

scanner means for reading a document, wherein the second operating instruction further includes an instruction for storing, in a predetermined area, image data read by said scanner means using a storage function of the different image processing apparatus.

5. An image processing apparatus according to claim 1, further comprising:

scanner means for reading a document, wherein the second operating instruction further includes an instruction for transmitting, to a predetermined destination, image data read by said scanner means by using a facsimile transmission function of the different image processing apparatus.

6. An image processing apparatus that performs, in cooperation with a different image processing apparatus that performs a first operating instruction about image processing, an image processing service provided by a second operating instruction about image processing, comprising:

registration means for registering registration information for a user who is permitted to use said image processing apparatus;

reception means for receiving user information and the second operating instruction for said image processing apparatus from the different image processing apparatus, wherein the first operating instruction is an instruction for performing a scanning operation, and the second operating instruction is an instruction for performing a printing operation, wherein the user information is used for authenticating the first operating instruction;

authentication means for employing the registration information registered by said registration means and the user information received by said reception means to determine whether the user is an authorized user, wherein the second operating instruction is received after the first operating instruction for scanning is authenticated to be performed on the different image processing apparatus; and determination means for employing results obtained by said authentication means to determine whether the second operating instruction received by said reception means is to be accepted, wherein when (a) said authentication means determines that the first operating instruction for scanning is authorized for the user, and (b) said determination means determines that the user is permitted to perform the second operating instruction for printing, the first operating instruction for scanning is performed by the different image processing apparatus and the second operating instruction for printing is performed by said image processing apparatus after the first operating instruction is performed.

7. An image processing apparatus according to claim 6, wherein the registration information and the user information each include at least a user ID and a password.

8. An image processing apparatus according to claim 6, further comprising:

printing means for outputting data to a printer, wherein the second operating instruction is an instruction for employing said printing means to print image data read by a scanner function of the different image processing apparatus.

9. An image processing apparatus according to claim 6, further comprising:

storage means for storing data, wherein the second operating instruction further includes an instruction for employing said storage means to store image data read by a scanner function of the different image processing apparatus.

10. An image processing apparatus according to claim 6, further comprising:

facsimile transmission means for transmitting data by facsimile, wherein the second operating instruction further includes an instruction for employing said facsimile transmission means to transmit, to a predetermined destination, image data read by a scanner function of the different apparatus.

11. A communication system comprising at least a first image processing device that performs an image processing service in association with a second image processing device, wherein said first image processing device comprises:

first registration means for registering registration information for a user who is authorized to use said first image processing device;

input means for entering user information and a first operating instruction about image processing for said first image processing device, wherein the first operating instruction is an instruction for performing a scanning operation;

first authentication means for employing the registration information registered by said first registration means and the user information entered by said input means to determine whether the first operating instruction for scanning is authorized for the user;

transmission means for, based on results obtained by said first authentication means, transmitting to said second image processing device the user information and a second operating instruction about image processing entered by the user, wherein the second operating instruction is an instruction for performing a printing operation, and wherein said second image processing device comprises:

second registration means for registering registration information for a user who is permitted to use said second image processing device;

reception means for receiving the user information and the second operating instruction for said second image processing device from said first image processing device;

second authentication means for employing the information registered by said second registration means and the user information received by said reception means to determine whether the second operating instruction for printing is authorized for the user; and determination means for employing results obtained by said second authentication means to determine whether the second operating instruction received by said reception means is to be accepted, wherein when (a) said first authentication means determines that the first operating instruction for scanning is authorized for the user, and (b) said determination means determines that the user is permitted to perform the second operating instruction for printing, the first operating instruction for scanning is performed by said first image processing device and the second operating instruction for printing is performed by said second image processing apparatus after the first operating instruction is performed.

12. An image processing communication method of an image processing apparatus that performs an image processing service provided by a first operating instruction about image processing and a second operating instruction about image processing for a different image processing apparatus, comprising:

a registration step of registering registration information for a user who is authorized to use the image processing apparatus;

an input step of entering user information and the first operating instruction for the different image processing apparatus, wherein the first operating instruction is an instruction for performing a scanning operation, and the second operating instruction is an instruction for performing a printing operation;

a first authentication step of employing the user information entered and a registration table, in which the registration information is registered, to determine whether the first operating instruction for scanning is authorized for the user;

a transmission step of, based on results of said first authentication step, transmitting to the different image processing apparatus the second operating instruction and the user information entered;

a second authentication step of obtaining from the different image processing apparatus results of an authentication process, performed for the user information transmitted in said transmission step, to determine whether the second operating instruction for printing is authorized for the user; and a determination step of employing the results obtained in said second authentication step to determine whether the user is to be permitted to use the image processing apparatus in conjunction with the different image processing apparatus to perform the first and second operating instructions of the image processing service, wherein when (a) it is determined in said first authentication step that the first operating instruction for scanning is authorized for the user, and (b) it is determined in said determination step that the user is permitted to use the second operating instruction for printing, the first operating instruction for scanning is performed by the image processing apparatus and the second operating instruction for printing is performed by the different image processing apparatus after the first operating instruction is performed.

13. A communication method according to claim 12, wherein the registration information in the registration table and the user information each include at least a user ID and a password.

14. A communication method according to claim 12, further comprising:
a read step of employing a scanner to read a document, wherein the second operating instruction is an instruction for printing image data read by the scanner using a printer function of the different image processing apparatus.

15. A communication method according to claim 12, further comprising:
a read step of employing a scanner to read a document, wherein the second operating instruction further includes an instruction for storing, in a predetermined area, image data read by the scanner using a storage function of the different image processing apparatus.

16. A communication method according to claim 12, further comprising:
a read step of employing a scanner to read a document, wherein the second operating instruction further includes an instruction for transmitting, to a predetermined destination, image data read by the scanner by using a facsimile transmission function of the different image processing apparatus.

17. An image processing communication method in which an image processing apparatus connected to a network performs, in cooperation with a different image processing apparatus that performs a first operating instruction about image processing, an image processing service provided by a second operating instruction about image processing, comprising:
a registration step of registering registration information for a user who is permitted to use the image processing apparatus;
a reception step of receiving, from the different apparatus, user information and the second operating instruction for the image processing apparatus, wherein the first operating instruction is an instruction for performing a scanning operation, and the second operating instruction is an instruction for performing a printing operation, wherein the user information is used for authenticating the first operating instruction;
an authentication step of employing the user information and a registration table, in which the registration information is registered, to determine whether the user is an authorized user, wherein the second operating instruction for scanning is received after the first operating instruction for printing is authenticated to be performed on the different image processing apparatus; and
a determination step of employing results of said authentication step to determine whether the second operating instruction is to be accepted, wherein when (a) it is determined in said authentication step that the first operating instruction for scanning is authorized for the user, and (b) it is determined in said determination step that the user is permitted to perform the second operating instruction for printing, the first operating instruction for scanning is performed by the different image processing apparatus and the second operating instruction for printing is performed by the image processing apparatus after the first operating instruction is performed.

18. A communication method according to claim 17, wherein the registration information and the user information each includes at least a user ID and a password.

19. A communication method according to claim 17, further comprising:
an output step of outputting data to a printer, wherein the second operating instruction further includes an instruction for outputting, from the printer, image data read by a scanner function of the different image processing apparatus.

20. A communication method according to claim 17, further comprising:
a storage step of storing data in a storage device, wherein the second operating instruction further includes an instruction for storing, in the storage device, image data read by a scanner function of the different image processing apparatus.

21. A communication method according to claim 17, further comprising:
a transmission step of transmitting data by facsimile to a predetermined destination, wherein the second operating instruction further includes an instruction for transmitting, to the predetermined destination, image data read by a scanner function of the different image processing apparatus.

22. A communication method of a communication system, which includes at least a first image processing device that performs an image processing service in association with a second image processing device, comprising:
performing at the first image processing device:
a first registration step of registering registration information for a user who is authorized to use the first image processing device;
an input step of entering user information and a first operating instruction for the first image processing device, wherein the first operating instruction is an instruction for performing a scanning operation;
a first authentication step of employing the registration information registered at said first registration step and the user information entered at said input step to determine whether the first operating instruction for scanning is authorized for the user; and
a transmission step of, based on results obtained at said first authentication step, transmitting to the second image processing device the user information and a second operating instruction about image processing, wherein the second operating instruction is an operation for performing a printing operation, and
performing at the second image processing device:
a second registration step of registering registration information for a user who is permitted to use the second image processing device;
a reception step of receiving user information and a request for the operating instruction for the second device from the first device;
a second authentication step of employing the information registered in said second registration step and the user information received in said reception step to determine whether the second operating instruction for printing is authorized for the user; and
a determination step of employing results obtained in said second authentication step to determine whether the second operating instruction received in said reception step is to be accepted,
wherein when (a) it is determined in said first authentication step that the first operating for scanning is authorized for the user, and (b) it is determined in said determination step that the user is permitted to perform the second operating instruction for printing, the first operating instruction for scanning is performed by the first image processing device and the second operating instruction for printing is performed by the second image processing device after the first operating instruction is performed.

23. A storage medium storing a computer-readable program for implementing a communication method of an image processing apparatus that performs a service provided by a first operating instruction about image processing and a second operating instruction about image processing for a different image processing apparatus, wherein the method comprises:
- a registration step of registering registration information for a user who is authorized to use the image processing apparatus;
- an input step of inputting user information and the first operating instruction for the image processing apparatus, wherein the first operating instruction is an instruction for performing a scanning operation, and the second operating instruction is an instruction for performing a printing operation;
- a first authentication step of employing the user information inputted and a registration table, in which the registration information is registered, to determine whether the first operating instruction for scanning is authorized for the user;
- a transmission step of, based on results of said first authentication step, transmitting to the different image processing apparatus the second operating instruction and the user information inputted;
- a second authentication step of obtaining from the different image processing apparatus results of an authentication process, performed for the user information transmitted in said transmission step, to determine whether the second operating instruction for printing is authorized for the user; and
- a determination step of employing the results obtained in said second authentication step to determine whether the user is to be permitted to use the image processing apparatus in conjunction with the different image processing apparatus to perform the first and second operating instructions of the image processing service, wherein when (a) it is determined in said first authentication step that the first operating instruction for scanning is authorized for the user, and (b) it is determined in said determination step that the user is permitted to use the second operating instruction for printing, the first operating instruction for scanning is performed by the image processing apparatus and the second operating instruction for printing is performed by the different image processing apparatus after the first operating instruction is performed.

24. A storage medium storing a computer-readable program for implementing a communication method in which an image processing apparatus connected to a network performs, in cooperation with a different image processing apparatus that performs a first operating instruction about image processing, a service provided by a second operating instruction about image processing, the method comprising:
- a registration step of registering registration information for a user who is permitted to use the image processing apparatus;
- a reception step of receiving, from the different apparatus, user information and the second operating instruction for the image processing apparatus, wherein the first operating instruction is an instruction for performing a scanning operation, and the second operating instruction is an instruction for performing a printing operation, wherein the user information is used for authenticating the first operating instruction;
- an authentication step of employing the user information and a registration table, in which the registration information is registered, to determine whether the user is an authorized user, wherein the second operating instruction is received after the first operating instruction for scanning is authenticated to be performed on the different apparatus; and
- a determination step of employing results of said authentication step to determine whether the second operating instruction is to be accepted, wherein when (a) it is determined in said authentication step that the first operating instruction for scanning is authorized for the user, and (b) it is determined in said determination step that the user is permitted to perform the second operating instruction for printing, the first operating instruction for scanning is performed by the different image processing apparatus and the second operating instruction for printing is performed by the image processing apparatus after the first operating instruction is performed.

* * * * *